United States Patent [19]
Almquist et al.

[11] Patent Number: 5,651,934
[45] Date of Patent: Jul. 29, 1997

[54] RECOATING OF STEREOLITHOGRAPHIC LAYERS

[75] Inventors: Thomas A. Almquist, San Gabriel; Charles W. Hull, Santa Clarita; Borzo Modrek, Montebello; Paul F. Jacobs, La Crescenta; Charles W. Lewis, Sherman Oaks; Adam L. Cohen, Los Angeles; Stuart T. Spence, S. Pasadena; Hop D. Nguyen, Littlerock, all of Calif.

[73] Assignee: 3D Systems, Inc., Valencia, Calif.

[21] Appl. No.: 402,553

[22] Filed: Mar. 13, 1995

Related U.S. Application Data

[63] Continuation of Ser. No. 146,562, Nov. 2, 1993, abandoned, which is a continuation of Ser. No. 880,190, May 6, 1992, Pat. No. 5,258,146, which is a continuation of Ser. No. 515,479, Apr. 27, 1990, Pat. No. 5,174,931, which is a continuation-in-part of Ser. No. 249,399, Sep. 26, 1988, abandoned, and Ser. No. 265,039, Oct. 31, 1988, abandoned.

[51] Int. Cl.$^6$ .................... B29C 35/08; B29C 41/02
[52] U.S. Cl. .................... 264/401; 118/100; 118/120; 118/423; 118/429; 118/500; 118/620; 118/712; 156/272.8; 156/273.5; 156/275.5; 156/307.1; 156/379.6; 156/538; 250/432 R; 250/492.1; 264/308; 425/174.4; 427/356; 427/358; 427/510; 427/512; 427/553; 427/554; 427/555
[58] Field of Search .................... 264/22, 40.1, 40.2, 264/40.4, 236, 308, 401; 425/135, 140, 141, 147, 162, 174, 174.4; 156/64, 272.8, 273.3, 273.5, 275.5, 307.1, 378, 379.6, 538; 427/8, 356, 358, 430.1, 508, 510, 512, 553, 554, 555; 118/100, 120, 423, 429, 500, 620, 712; 73/293, 305, 319, 322.5; 250/432 R, 492.1, 577; 340/619, 623, 624; 364/468, 476; 365/106, 107

[56] References Cited

U.S. PATENT DOCUMENTS

| | | | |
|---|---|---|---|
| 2,621,808 | 12/1952 | Blakeney | 340/619 X |
| 2,682,887 | 7/1954 | Getz | 261/70 X |
| 3,957,015 | 5/1976 | Harris | 118/100 |
| 4,247,508 | 1/1981 | Housholder | 264/219 |
| 4,320,394 | 3/1982 | John, Jr. | 340/624 X |
| 4,354,180 | 10/1982 | Harding | 73/293 X |
| 4,508,970 | 4/1985 | Ackerman | 73/293 X |

(List continued on next page.)

FOREIGN PATENT DOCUMENTS

| | | | |
|---|---|---|---|
| 58056 | 8/1982 | European Pat. Off. | 73/293 |
| 52-124065 | 10/1977 | Japan . | |
| 55-146015 | 11/1980 | Japan | 73/293 |
| 55-164117 | 12/1980 | Japan | 264/40.2 |
| 56-106900 | 8/1981 | Japan . | |
| 56-118859 | 9/1981 | Japan . | |

(List continued on next page.)

OTHER PUBLICATIONS

E. Sachs, "Three Dimensional Printing: Rapid Tooling and Prototypes Directly From a CAD Model," Dec. 1989.
Translation of Japan 1-115,620 (Published May 8, 1989).

*Primary Examiner*—Leo B. Tentoni
*Attorney, Agent, or Firm*—Dennis R. Smalley; Anna M. Vradenburgh

[57] ABSTRACT

Apparatus and method for stereolithographically forming a three-dimensional object includes a vessel for holding a building material and a smoothing member for forming a uniform coating over a previously formed layer of the object. The smoothing member has a plurality of blades. The smoothing member is swept over a previously formed layer of the object, in at least two directions. Different clearances between the lower surface of the smoothing member and the upper surface of the previously formed layer are used to provide a uniform coating for a subsequent layer over the previously formed layer. The sweeping velocity of the smoothing member can be varied. Retractable needles are attached to the smoothing member for adjusting a blade gap between a lower surface of the smoothing member and the surface of the building material.

19 Claims, 21 Drawing Sheets

U.S. PATENT DOCUMENTS

| | | | |
|---|---|---|---|
| 4,658,149 | 4/1987 | Miranda et al. | 73/293 X |
| 4,719,071 | 1/1988 | Capelle | 425/140 X |
| 4,755,127 | 7/1988 | Becker | 425/140 |
| 4,809,201 | 2/1989 | Keklak | 364/518 |
| 4,942,060 | 7/1990 | Grossa | 427/553 |
| 4,942,066 | 7/1990 | Fan et al. | 427/553 |
| 4,943,928 | 7/1990 | Campbell et al. | 364/477 |
| 4,575,330 | 3/1986 | Hull | 425/174.4 |

FOREIGN PATENT DOCUMENTS

| | | | |
|---|---|---|---|
| 56-144478 | 11/1981 | Japan . | |
| 60-147615 | 8/1985 | Japan | 73/293 X |
| 60-247515 | 12/1985 | Japan . | |
| 61-114818 | 6/1986 | Japan | 425/174.4 X |
| 61-114817 | 9/1986 | Japan . | |
| 61-217219 | 9/1986 | Japan . | |
| 62-37109 | 2/1987 | Japan . | |
| 1004766 | 3/1983 | U.S.S.R. | 73/293 |

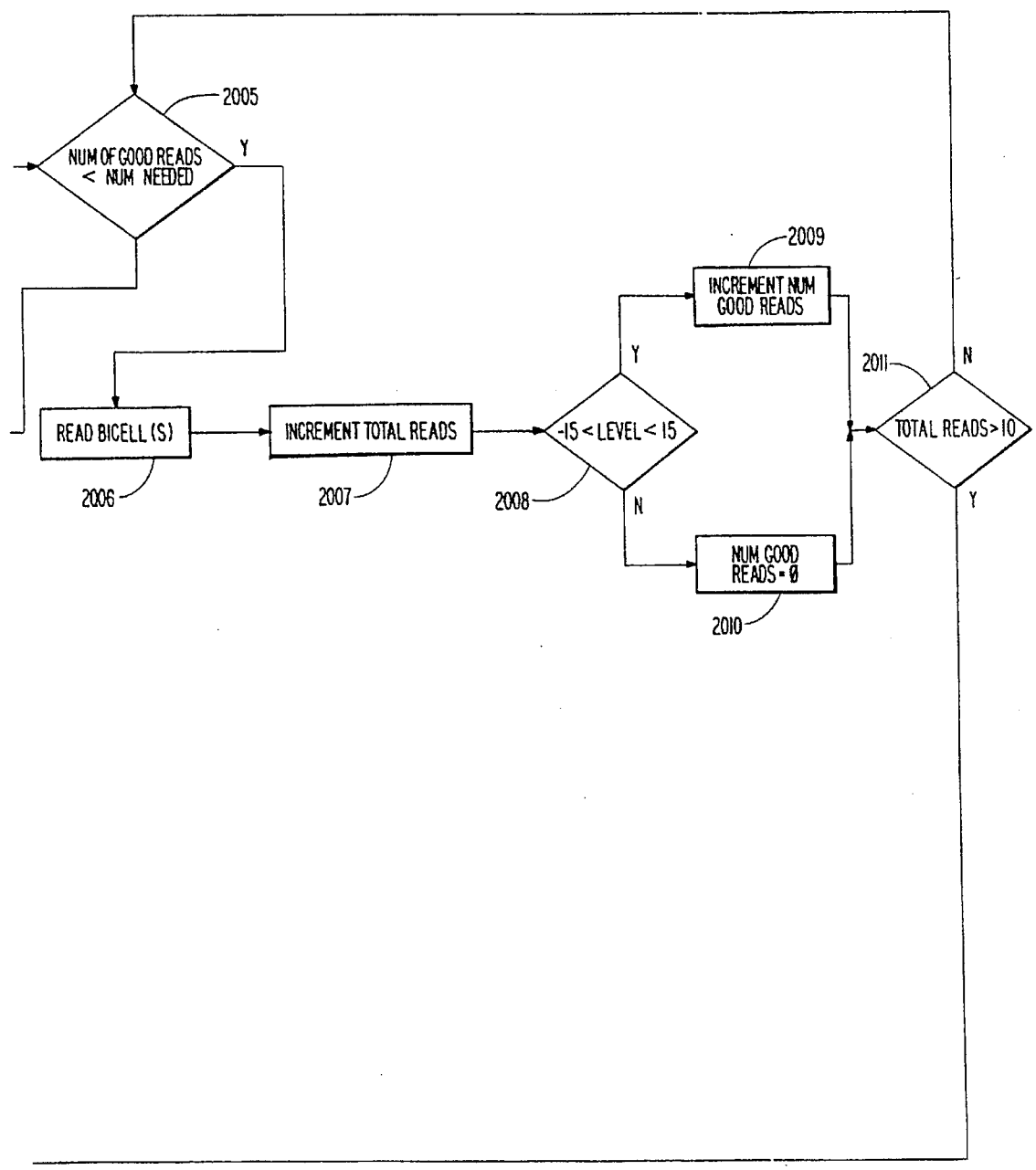
FIG. 30c".

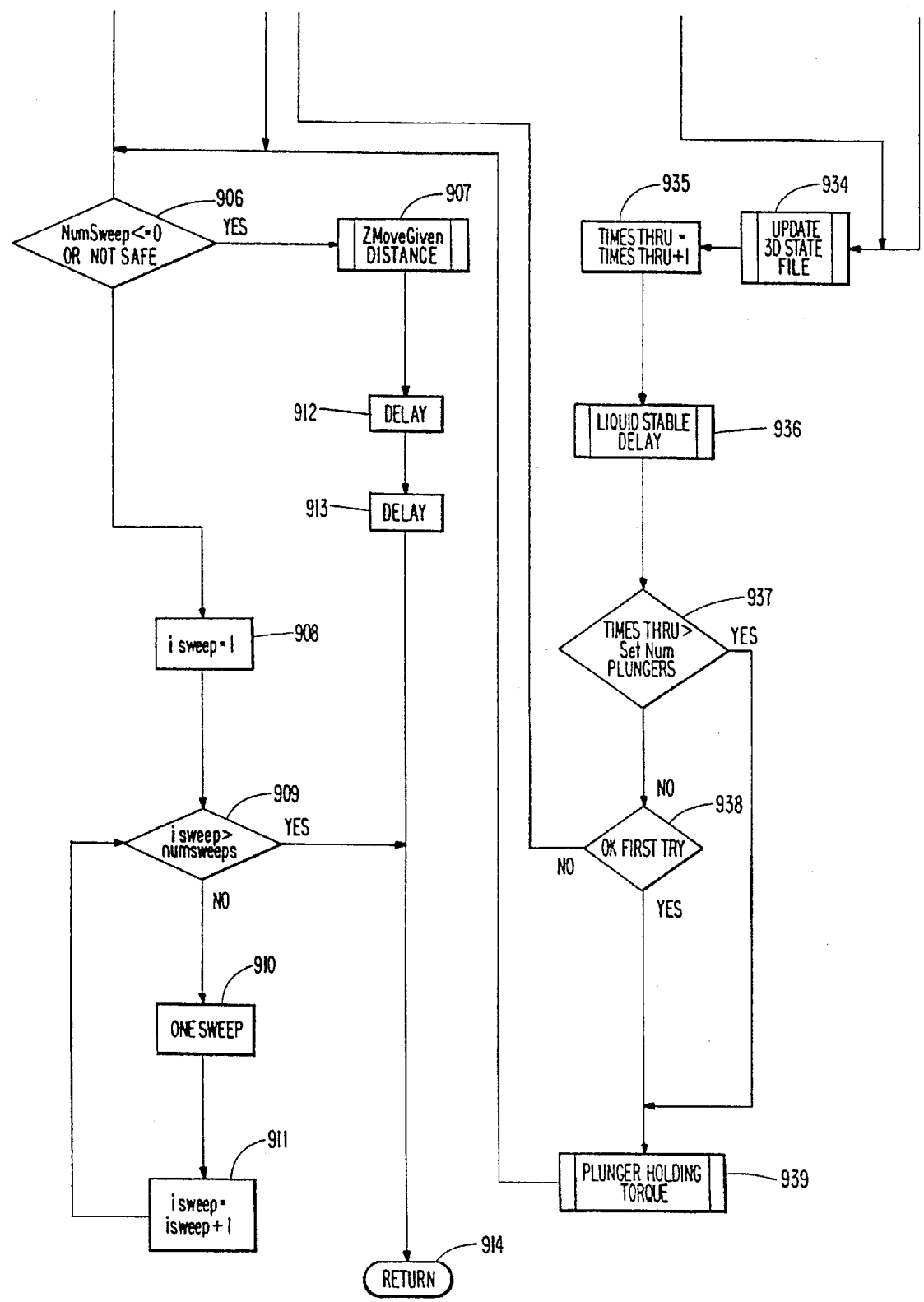
FIG. 30a".

RECOATING OF STEREOLITHOGRAPHIC LAYERS

This application is a continuation of U.S. patent application Ser. No. 08/146,562 filed on Nov. 2, 1993, now abandoned; which is a continuation of U.S. patent application Ser. No. 07/880,190 filed on May 6, 1992, now U.S. Pat. No. 5,258,146; which is a continuation of U.S. patent application Ser. No. 07/515,479 filed on Apr. 27, 1990, now U.S. Pat. No. 5,174,931 and which is also a continuation in part of U.S. patent application Ser. No. 07/265,039 filed on Oct. 31, 1988, now abandoned, and U.S. patent application Ser. No. 07/249,399 filed on Sep. 26, 1988, also now abandoned.

BACKGROUND OF THE INVENTION

This invention relates generally to an improved stereolithography apparatus and method for the production of three-dimensional objects in layers, and more specifically, to an improved apparatus and method for recoating a previously-formed cross-section with a layer of stereolithography medium in anticipation of the formation of a next cross-section.

In recent years, "stereolithography" systems, such as those described in U.S. Pat. No. 4,575,330 entitled "APPARATUS FOR PRODUCTION OF THREE-DIMENSIONAL OBJECTS BY STEREOLITHOGRAPHY" have come into use. Basically, stereolithography is a method for automatically building complex three-dimensional parts (e.g., plastic parts) by successively curing a plurality of thin layers of a curable medium (e.g., polymerizable liquid) on top of each other until all of the thin layers are joined together to form a whole part. Each layer is in essence a thin cross-section of the desired three-dimensional object. With this technology, the parts are literally grown from a supply of building medium (e.g., grown from a vat of liquid plastic). This method of fabrication is extremely powerful for quickly reducing design ideas to physical form and for making prototypes. Moreover, complex parts can be made quickly without tooling. Because the system uses a computer to generate the cross-sectional patterns, the system can be readily linked to CAD/CAM systems.

The presently preferred building media are photopolymers that are cured by ultraviolet (UV) light and their curing is fast enough to make them practical model building materials. The liquid that is not polymerized when a part is made is still usable and remains in the vat as successive parts are made. An ultraviolet laser generates a small intense spot of UV which is moved across the liquid surface with a galvanometer mirror X-Y scanner in a predetermined pattern. The scanner is driven by computer generated vectors or the like. Precise complex patterns can be rapidly produced with this technique.

Other preferred building media includes sinterable powders and powders solidifiable when combined with an appropriately dispensed binder. A typical stereolithography system for use with photopolymers includes a laser scanner, a vat or tank for containing the polymerizable liquid, and an object support platform, which is capable of being raised and lowered in the tank, and a controlling computer. The system is programmed to automatically make a plastic part by forming one thin cross-section at a time and building the desired three-dimensional object up layer by layer.

In typical stereolithographic procedures, a thin layer of viscous curable plastic liquid is applied to a surface which may be a previously cured layer and, after sufficient time has elapsed for the thin layer of polymerizable liquid to smooth out by gravity, a computer controlled beam of radiation is moved across the thin liquid layer to sufficiently cure the plastic liquid so that subsequent layers can be applied thereto. The waiting period for the thin layer to level varies depending on several factors such as the viscosity of the polymerizable liquid, the layer thickness, part geometry, and cross-section and the like.

Typically, the cured layer, which is supported on a vertically movable object support platform, is dipped below the surface of a bath of the viscous polymerizable liquid a distance greater than the desired layer thickness so that liquid flows over the previous cross-section rapidly. Then, the part is raised to a position below the surface of the liquid equal to the desired layer thickness, which forms a bulge of excess material over at least a substantial portion of the previous cross-section. When the surface levels (smooths out), the layer is ready for curing by radiation.

For further details of stereolithography, reference is made to U.S. Pat. Nos. 4,575,330 and 4,999,143 and the following pending U.S. patent applications (all assigned to 3D Systems, Inc., the assignee and applicant for the subject application) which are incorporated herein by reference in their entirety, including appendices attached thereto or material incorporated therein by reference, as if fully set forth:

U.S. Pat. No. 5,104,592 Hull et al., filed Apr. 17, 1989, entitled "STEREOLITHOGRAPHIC CURL REDUCTION";

U.S. Pat. No. 5,015,424 Hull et al., filed Mar. 31, 1989, entitled "METHOD AND APPARATUS FOR PRODUCTION OF HIGH RESOLUTION THREE-DIMENSIONAL OBJECTS BY STEREOLITHOGRAPHY";

U.S. Pat. No. 5,015,424 Smalley, filed Apr. 18, 1988, entitled "METHOD AND APPARATUS FOR PRODUCTION OF THREE-DIMENSIONAL OBJECTS BY STEREOLITHOGRAPHY";

U.S. Pat. No. 5,076,974 Modrek et al., filed Nov. 8, 1988, entitled "METHOD FOR CURING PARTIALLY POLYMERIZED PARTS";

U.S. patent application Ser. No. 268,428, Freed, filed Nov. 8, 1988, entitled "METHOD FOR FINISHING PARTIALLY POLYMERIZED PARTS", now abandoned;

U.S. patent application Ser. No. 268,408, Hull, filed Nov. 8, 1988, entitled "METHOD FOR DRAINING PARTIALLY POLYMERIZED PARTS", now abandoned;

U.S. Pat. No. 5,058,988 Spence, filed Nov. 8, 1988, entitled "APPARATUS AND METHOD FOR PROFILING A BEAM";

U.S. Pat. No. 5,059,021, Spence, filed Nov. 8, 1988, entitled "APPARATUS AND METHOD FOR CORRECTING FOR DRIFT IN PRODUCTION OF OBJECTS BY STEREOLITHOGRAPHY";

U.S. Pat. No. 5,123,734 Spence, filed Nov. 8, 1988, entitled "APPARATUS AND METHOD FOR CALIBRATING AND NORMALIZING A STEREOLITHOGRAPHIC APPARATUS";

U.S. patent application Ser. No. 249,399, Almquist et al., filed Sep. 26, 1988, entitled "METHOD AND APPARATUS FOR PRODUCTION OF THREE-DIMENSIONAL OBJECTS BY STEREOLITHOGRAPHY" now abandoned;

U.S Pat. No. 5,133,987 Spence et al., filed Oct. 27, 1989, entitled "STEREOLITHOGRAPHIC APPARATUS";

U.S. Pat. No. 5,143,663 Leyden, filed Jun. 12, 1989, entitled "INTEGRATED STEREOLITHOGRAPHY";

U.S. patent application Ser. No. 265,039, Almquist et al., filed Oct. 31, 1988, entitled "APPARATUS AND METHOD FOR MEASURING AND CONTROLLING THE LEVEL OF A FLUID, now abandoned;"

U.S. patent application Ser. No. 495,791 Jacobs, filed Mar. 19, 1990, entitled "VIBRATIONALLY ENHANCED STEREOLITHOGRAPHIC RECOATING", now abandoned;

U.S. patent application Ser. No. 414,200, Hull et al., filed Sep. 28, 1989, entitled "AN APPARATUS AND METHOD FOR FORMING A SUBSTANTIALLY FLAT WORKING SURFACE", now abandoned;

U.S. patent application Ser. No. 415,168, Hull et al., filed Sep. 29, 1989, entitled "METHODS OF COATING STEREOLITHOGRAPHIC PARTS", now abandoned;

U.S. Pat. No. 5,182,056 Spence et al., filed Oct. 27, 1989, entitled "IMPROVED SYSTEM FOR PRODUCTION OF THREE-DIMENSIONAL OBJECTS BY STEREOLITHOGRAPHY EMPLOYING VARIOUS PENETRATION DEPTHS AND BEAM PROFILE";

U.S. patent application Ser. No. 428,492, Vorgitch et al., filed Oct. 27, 1989, entitled "RAPID AND ACCURATE PRODUCTION OF STEREOLITHOGRAPHIC PARTS", now abandoned;

U.S. Pat. No. 5,130,064 Smalley et al., filed Oct. 30, 1989, entitled "IMPROVED STEREOLITHOGRAPHIC CONSTRUCTION TECHNIQUES";

International Application No. PCT/US89/04096, Almquist et al., filed Sep. 26, 1989, entitled "RECOATING OF STEREOLITHOGRAPHIC LAYERS"; and U.S. patent application Ser. No. 415,134, Jacobs et al., filed Sep. 29, 1989, entitled "IMPROVED STEREOLITHOGRAPHIC POST-CURING, now abandoned."

U.S. patent application Ser. No. 516,145, Allison et al., filed Apr. 27, 1990, entitled "IMPROVED STEREOLITHOGRAPHIC CONSTRUCTION TECHNIQUES," now abandoned.

Previous stereolithographic doctor blades provide means to reduce the cycle time for forming each layer of plastic, but without providing a capability to vary parameters associated with the layer formation process to the specific part geometry at hand. In some cases, therefore, these blades will not give optimal results, especially when the part has a certain geometry including trapped volumes of unformed material, which allow unformed material being swept in front of the blade to flow back underneath the blade to disrupt the layer formation process, or large flat areas, where the shear force exerted by the blade on the unformed material may cause a problem known as scoopout, again, with the result of disrupting the layer formation process. Also, previous blade designs are relatively thin, and sometimes suffers from a flutter and twist problem, whereby the unsupported end of the blade deforms when the blade is sweeping away a bulge of excess material. This further disrupts the formation of a substantially uniform layer. The thin cross-sectional width also contributes to the flowback problem, mentioned earlier, over large trapped volumes.

Moreover, the previous blade designs were rectangular in cross-section and contacted the uncured material over their full cross-sectional width. The contact of the blade with the unformed material may induce a shear force on the material beneath the blade, which may be acceptable as long as the blade is not travelling over a previous object cross-section. However, when the blades begins travelling over the previous cross-section, so that only a thin "channel" of material separates the blade from the previous cross-section, the shear force may actually induce a lift force on the part, causing it in some cases to lift up, and even strike the blade. Another problem is that a small bulge of material may form on the trailing edge of the blade, which the blade may deposit over the leading edge of the part when it travels over the part. This deposit, if allowed to build up at each cross-section, can result in a substantial distortion of the part.

It is also difficult to adjust the blade gap with the previous blades, which gap is the distance between the blade and the working surface of the material. However, it is desirable to be able to adjust the blade gap, since too large a gap may result in substantial movement of the platform through the working surface, resulting in working surface disruptions, while too small a gap may position the blade during sweeping too close to the working surface which may further contribute to surface disruptions. Presently, setting the blade clearance requires the loosening and tightening of bolts, which may exert a torque on the blade, sufficient to cause the blade to tilt or warp relative to the working surface, which may be detrimental to uniform layer formation.

Measuring and controlling the level of the working fluid in a stereolithographic apparatus is also desirable with layer formation using a blade. Detecting the level of the working fluid is important to the layer recoating process so that the previous cross-section can be lowered sufficiently below the working surface to ensure an adequate formation of excess material over the previous cross-section.

Many scientific experiments and industrial applications require the measurement of the level of a fluid. The term "level of a fluid" as used here means the height of the surface of a fluid in a gravitational field or other accelerated frame of reference. This surface may be the top or even the bottom of the fluid (if the fluid is floating on another fluid). The fluid may be the ocean, the gasoline in the tank of an automobile or a liquid chemical in a test tube, among many possibilities. Various means have been adopted over the years to measure the levels of such fluids, including dip sticks, lines painted on the side of pilings, marks on the side of test tubes, floats, reflected light beams, and the like. A need exists, however, for an apparatus which can very precisely and reliably measure the level of a fluid in a stereolithographic apparatus. Apparatus of this sort is particularly useful if coupled with a level maintenance means such as a plunger, a diaphragm, a lifting and lowering means to vertically translate a container of building material, or controls for a pump in order to maintain the level of the fluid at any desired height.

In particular, stereolithographic machines require very precise control of the level of the working fluid. U.S. Pat. No. 4,575,330 to Charles W. Hull, mentioned earlier, discloses apparatus for production of three dimensional objects by stereolithography. The working fluid used in stereolithographic apparatus is usually a photopolymer liquid curable by the application of ultraviolet (U.V.) light. As noted in U.S. Pat. No. 4,575,330, the level of the working fluid in the preferred embodiment must be maintained at a constant level so that the beam of U.V. light will remain sharply in focus on a fixed plane.

The overall intensity and intensity profile ("beam profile") of the beam of U.V. light at the surface of the liquid photopolymer will determine, in cooperation with other factors (such as the characteristics of the liquid photopolymer and the length of time the beam remains in a single spot), the depth and profile of the photopolymer that is cured or polymerized by exposure to the beam. The beam profile will vary with the level of the liquid photopolymer, because the beam is focussed to have a known profile at a predetermined level of the liquid photo-polymer. If the liquid photopolymer has a level different from the predetermined one, the difference in the beam profile will change the width of the cured photopolymer and its depth from the depth and width planned.

Furthermore, if the level of the liquid photopolymer is higher than the predetermined level, the depth of the cured photopolymer may not be sufficient to reach to and adhere with the previously cured layer, with detrimental consequences for the structural integrity of the object being formed. If the level is lower, then the new layer will be thinner than planned, which is detrimental to the accuracy of reproduction of the object.

The level of the liquid photopolymer must be maintained despite the shrinkage caused by curing the liquid photopolymer, heating, evaporation, and the like. In early versions of stereo-lithographic apparatus, this level was maintained by providing a spillway. The level of the liquid photopolymer rose to and slightly above (because of surface tension) the spillway. A spillway, however, does not control the level of the liquid photopolymer with sufficient precision to make possible the finer resolution of parts made by a stereolithographic apparatus. Previous level-detection apparatus provided a more precise means of measuring the level of a fluid through the use of bi-cell detectors to detect the change in position of a reflected beam, reflected off the surface of material in a side tank. However in many instances, it is desirable to be able to detect level changes in the main tank, rather than in a side tank, since the level in the side tank may not provide a good indication of the level in the main tank. This may be the case if the building material is floated on an immiscible liquid as described in Ser. No. 365,444, now U.S. Pat. No. 5,143,663. A problem with measuring level changes in the main tank is that bubbles or other surface disruptions may form from the passage of the part and/or part platform through the working surface, and the previous apparatus is sensitive to these surface disruptions in the main tank.

Accordingly, an object of the subject invention is to provide means to tailor the layer formation process to specific part geometries. Another object is to provide a sweeping member used in layer formation which reduces or eliminates material flowback and scoopout, and leading edge material deposit, and which induces less lift forces on the previously-formed portion of the part. Another object is to provide means for level detection which does not require a side tank, and which is less sensitive to surface disruptions on the working surface.

Additional objects and advantages will be set forth in the description which follows or will be apparent to those of skill in the art who practice the invention.

SUMMARY OF THE INVENTION

To achieve the foregoing objects, and in accordance with the purpose of the invention as embodied and broadly described herein, there is provided an improved apparatus of the type for forming a three-dimensional object at a working surface of material in a container, the material being capable of selective physical transformation upon exposure to synergistic stimulation, the improvement comprising: a member sweepable in response to first control signals along a predetermined path substantially in a plane spaced by a gap above the working surface for a number of sweeps, and a velocity for each sweep, specified by the first control signals; a platform movable in response to second control signals for supporting a previously-formed object cross-section, the cross-section having a surface, and the platform being adapted to move the cross-sectional surface to a first position below the working surface so that a volume of material moves onto the cross-sectional surface, the volume containing excess material, and to a second position before each sweep of the member wherein the cross-sectional surface is spaced by a clearance from the plane of the sweepable member, the clearance being specified by the second control signals, and determined so that after a final sweep, substantially all the excess material is swept away by the member, leaving a layer of material over the surface of the previously-formed object cross-section; and control means coupled to the sweepable member, and to the movable platform, and capable of varying the number of sweeps for each cross-section of the object, the velocity for each sweep, and the clearance before each sweep, and adapted to produce the first and second control signals specifying the same.

Another improvement comprises a member sweepable along a predetermined path substantially in a plane spaced by a gap above the working surface in response to first control signals; a platform movable in response to second control signals for supporting a previously-formed object cross-section, the cross-section having a surface, and the platform being adapted to move the surface of the cross-section to a first position below the working surface so that a volume of material moves onto the cross-sectional surface, the volume containing at least some excess material, to a second position before a sweep of the member determined so that at least part of the excess resin is placed in the path of and swept away by the member; a float adapted to float on the working surface of the material in the container; means coupled to the float for detecting, based on movement of the float, whether the level of the working surface has moved more than a predetermined distance from a reference level, and for providing a detection signal in response thereto; means responsive to third control signals for maintaining the level of the working surface within the predetermined distance of the reference level; and control means coupled to the sweepable member, the movable platform, the detecting means, and the altering means, and adapted to produce the first and second control signals, and to produce the third control signals in response to the detection signal.

A third improvement comprises a sweepable member having a chamfered edge in a sweep direction, the edge making an angle of between about 5–8 degrees with the plane of the path.

A fourth improvement comprises a sweepable member comprising a plurality of spaced legs extending from a base, and-having ends for contacting the material.

Additional improvements and related methods are also provided.

BRIEF DESCRIPTION OF THE DRAWINGS

FIGS. 30a', 30a", 30b, 30c' and 30c" are flowcharts of the recoating software used in a second embodiment of the SLA-250.

DETAILED DESCRIPTION OF THE INVENTION

RECOATING IN GENERAL

Figure 1:
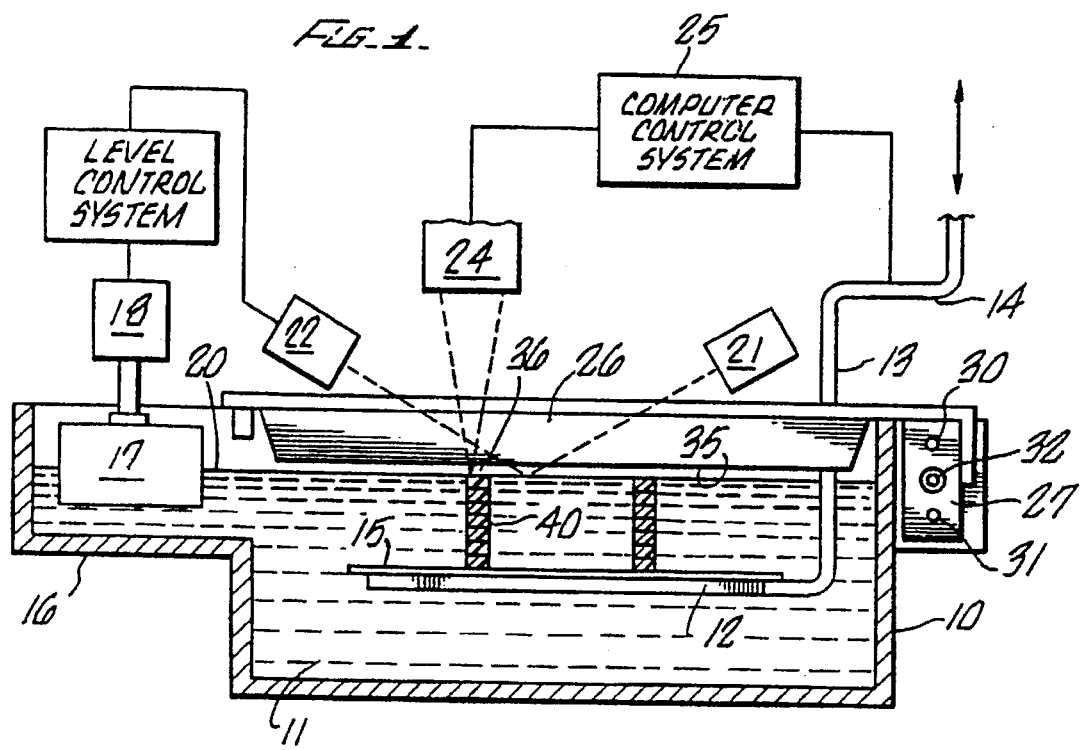
FIG. 1 is a cross-sectional view of a stereolithography system embodying features of the invention.
Figure 2:
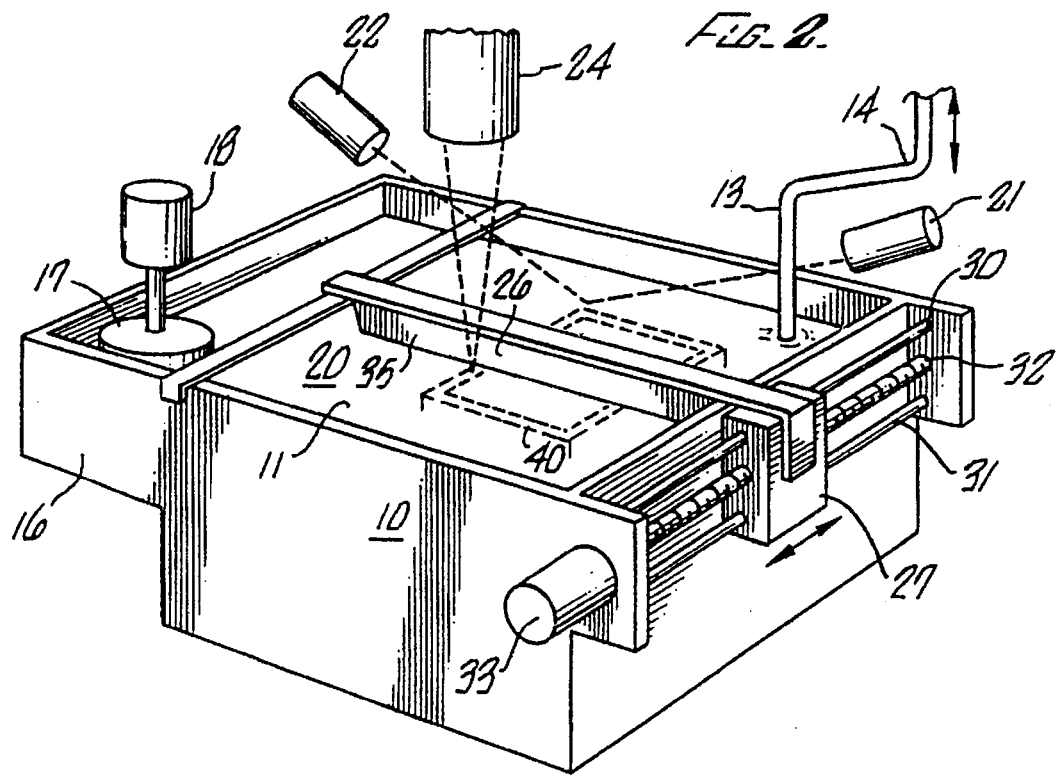
FIG. 2 is a perspective view of the system shown in FIG. 1 further illustrating the embodiment shown in FIG. 1.
Figure 3:
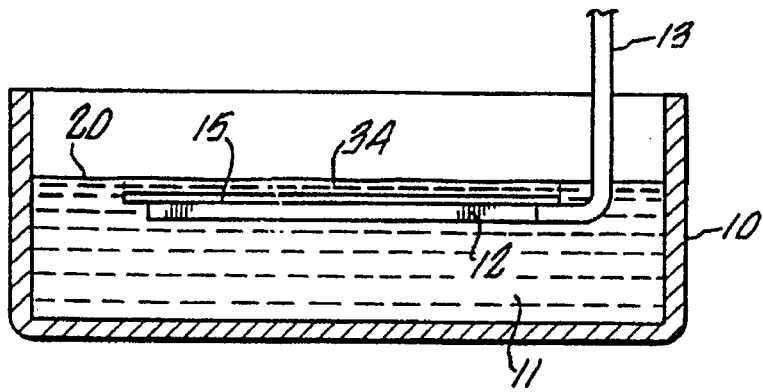
FIGS. 3–6 are simplified cross-sectional views of the tank shown in FIG. 1 at various stages of the stereolithography procedure.

FIGS. 1 and 2 schematically illustrate a stereolithography system for forming three-dimensional objects which embodies features of the invention of Ser. No. 249,399, now abandoned. As shown in these drawings, tank or vat 10 is provided to contain a bath 11 of polymerizable fluid. An object support platform 12 is disposed within the tank 10 and is adapted by frame elements 13 and 14 to be raised and lowered within the tank by a motor (not shown). The platform 12 has a horizontal surface 15 on which the three-dimensional objects are formed in accordance with the invention. The tank 10 has a trough 16 in the upper portion of one sidewall of tank 10 and a plunger or piston 17 is disposed within the trough to be raised and lowered by motor 18 to control the level of the upper surface 20 of polymerizable liquid within the tank 10.

The level of the upper surface 20 of the bath 11 is detected by means of a radiation source 21 such as an HeNe laser, which is directed toward the upper surface 20 at an angle and a radiation sensor 22 which may be a bi-celled detector. The position of the sensor 22 is adjusted to be at a complementary angle with respect to the upper surface 20 so as to receive the radiation from the HeNe laser. A control system 23 is provided to control the movement of the plunger 17 by motor 18.

A computer controlled radiation source 24 is disposed above the bath 11 to direct curing media, such as ultraviolet radiation or other types of curing stimulation, in a predetermined pattern across the upper surface 20 of the bath 11 in order to selectively cure the liquid building material where such radiation impacts thereon. The movement and operation of the radiation source 24 and raising and lowering of the object support platform 12 are integral parts of the computer control 25 of the system as will be further described hereinafter.

A doctor blade 26 is mounted on the top of the tank 10 and is adapted to move horizontally across the top of the tank. A blade support 27 is solidifiably mounted on rails 30 and 31 disposed along one side of the tank 10. A threaded drive shaft 32 passes through a threaded passageway (not shown) in the blade support 27 and rotation thereof by motor 33 moves the blade support 27 and thus the blade 26 horizontally across the top of the tank 10.

The operation of the stereolithography system shown in FIGS. 1 and 2 is best shown in the sequence of FIGS. 3–6. Starting with FIG. 3 the stereolithography procedure is initiated with the object support platform 12 being positioned within the bath 11 of polymerizable liquid so that the horizontal surface 15 thereon is located a short distance from the upper surface 20 of the bath. This distance is greater than the desired thickness of the layer of polymerizable liquid to be cured. The layer of polymerizable liquid immediately above the surface 15 will form the first solid layer of the three-dimensional object when cured.

This first layer above support platform 12 as well as several layers thereafter generally consist of supports that will be removed after the part has been built. Therefore, minor inaccuracies in layer thickness formed for these first few layers are inconsequential to the accurate production of the desired part.

Figure 4:
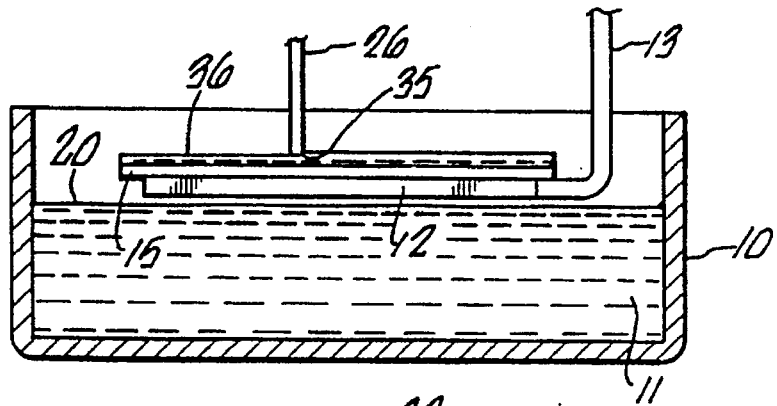

The next step in the process is shown in FIG. 4. The object support platform 12 is raised so that the layer 34 of polymerizable liquid on the surface 15 is held above the upper surface 20 of the bath 11. The polymerizable liquid is relatively viscous fluid so the liquid does not immediately run off the edges of the surface 15 on platform 12 when the layer is raised out of the bath. Doctor blade 26 is moved horizontally so that the lower edge 35 thereof strikes off excess polymerizable liquid from the layer 34 and thereby smooths the upper surface (36) of the coating of material over surface 15. Suitable blade speeds are empirically determined to provide a desired level to the upper surface 36. Moreover, one or more passes by the doctor blade 26 may be needed at a particular speed to provide a smooth level upper surface 36 of coating 34. Typical blade speeds may range from about ½ to ten inches per second.

Figure 5:
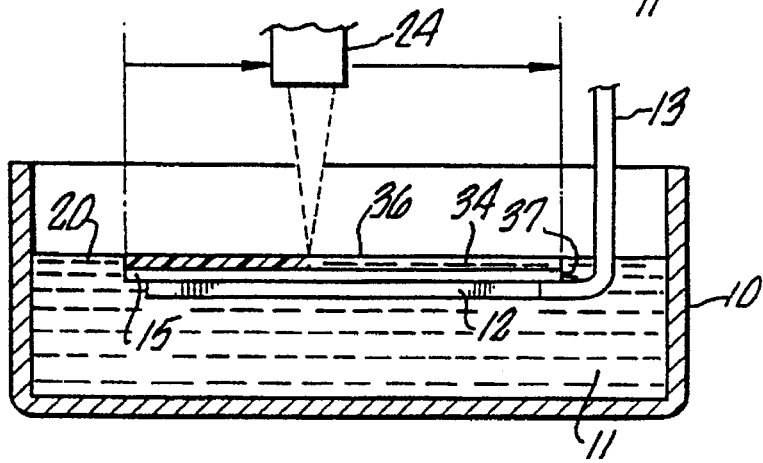

After the upper surface 36 of layer 34 is leveled by the doctor blade 26, the object and support platform 12 are lowered into the bath 11 as shown in FIG. 5 so that the smoothed upper surface 36 of the layer 34 is level with or in the same horizontal plane as the surface 20 of the bath 11. Together these form a surface at which additional cross-sections of a part can be formed. This surface is known as the working surface. The fluid of the bath 11 which surrounds the layer 34 forms an interface 37 which is in essence a wall which supports the outer periphery of layer 34. Any disruptions of the working surface 34 or the upper surface 20 of the bath 11 caused by the submersion of object support platform 12 and the layer 34 into the bath 11 are relatively minor and quickly subside.

The computer controlled radiation source 24 is actuated after a short delay, which delay eliminates any disruptions in the upper surface, to direct curing media, preferably UV radiation or other suitable stimulation, over the working surface 36 of bath 11 in a predetermined pattern to cure the liquid onto which the radiation impacts. The layer 34 is sufficiently cured so that it has the necessary green strength to support additional layers which are subsequently applied in a similar manner and to facilitate handling of the formed object after stereolithographic formation but before final cure.

Figure 6:
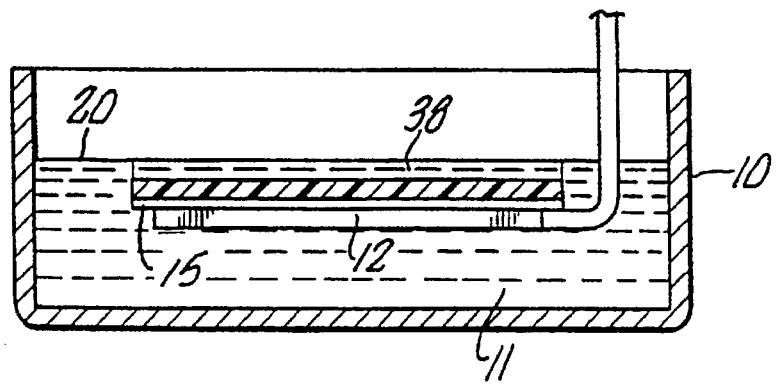

After irradiation of layer 34, the object support platform 12 is further lowered as shown in FIG. 6 so that the liquid from the bath 11 flows over the previously cured layer 34 to form a new layer 38 to thereby initiate another cycle of the process.

A series of transformed layers are built up in the aforesaid manner, as shown in FIG. 1, with each layer being in effect a thin cross-section of the desired three-dimensional object 40. The thickness of the individual layers can vary depending upon the geometry of the part being formed, the composition and viscosity of the untransformed building material and the nature and intensity of the curing stimulation media. However, typical thicknesses range from about 0.003 to about 0.02 inch. The completed three-dimensional object 40 which is formed by the aforedescribed stereolithography system is removed from the tank 10 and then subjected to further treatment to complete the curing of any uncured material which remains within the bounded surfaces of the three-dimensional object. Surface finishing, such as sanding and the like, may also be applied as needed.

A wide variety of polymerizable liquids can be utilized with the present invention as well as a wide range of curing media. However, photon polymerizable liquids, such as acrylics, are presently preferred along with UV radiation to cure them. Preferably, the viscosity of the polymerizable liquid exceeds 100 centipoise and preferably range from about 1000 to about 6000 centipoise. Viscosities outside this range can also be used. In fact, experiments have been successfully done with resins of viscosity greater than 100,000 centipoise.

EXAMPLE

Figure 7:
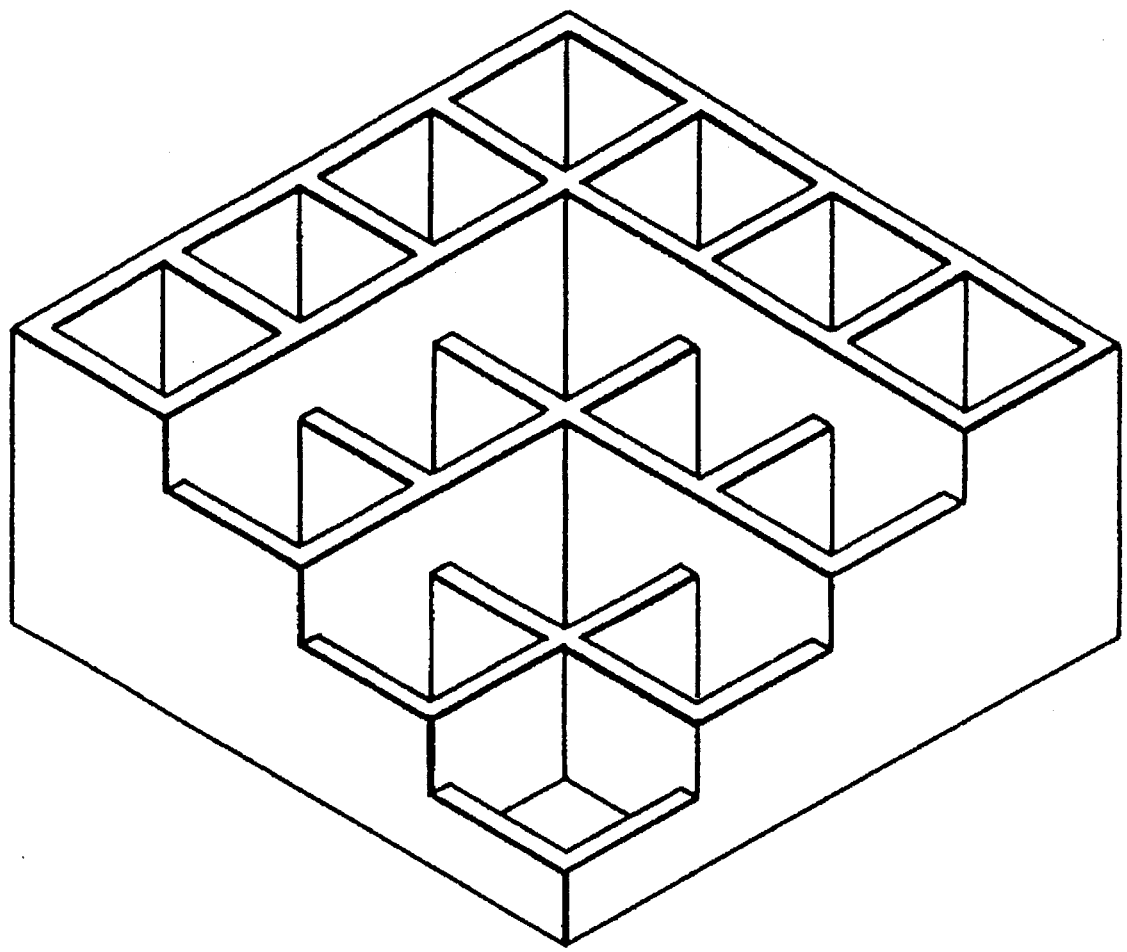
FIG. 7 is a perspective view of a three-dimensional object which has been made in accordance with the present invention.

As an example of a preferred embodiment of the invention of Ser. No. 249,399, now abandoned, a computer controlled stereolithography system developed by the present assignee and schematically shown in FIGS. 1 and 2 was utilized to form the three-dimensional object shown in FIG. 7. The base of the object was 8.25×8.25 inches, the maximum height was approximately 4 inches and the minimum height was about 1 inch. The wall thicknesses were approximately 0.25 inch. The polymerizable resin employed was a relatively viscous resin from Desoto Chemical Company identified as 4112-65 resin. The temperature of the bath thereof was maintained at approximately 30° C. The thickness of each layer applied was approximately 0.02 inch. The following procedures embodying the features of the present invention were followed for recoating each part layer applied. The object support platform of the stereolithography system was lowered into the bath of 4112-65 resin to allow the liquid resin to flow onto the support surface thereon to form an initial layer of polymerizable liquid which was thicker than desired. The platform was then raised so that the desired upper surface of the initial layer thereon was raised above the bath. A blade traveling at approximately 1 inch per second struck off approximately 0.1 inch of polymerizable liquid in one pass, leaving about 0.02 inch of polymerizable liquid on the support surface on the platform. The platform was then lowered so that the smoothed upper surface of the layer was level with the surface of the bath. The working surface was subjected to ultraviolet radiation from an HeCd laser providing radiation at a wavelength of about 325 nanometers at about 15 milliwatts of power. The total recoating cycle time for each layer recoating cycle was approximately 35 seconds. The time to make such a part with prior methods would have been approximately 165 seconds per layer. The total time saved by utilizing the methods of the present invention in this example was approximately 7.5 hours.

LEVEL DETECTION WITH A BI-CELL PHOTODETECTOR

Figure 8:
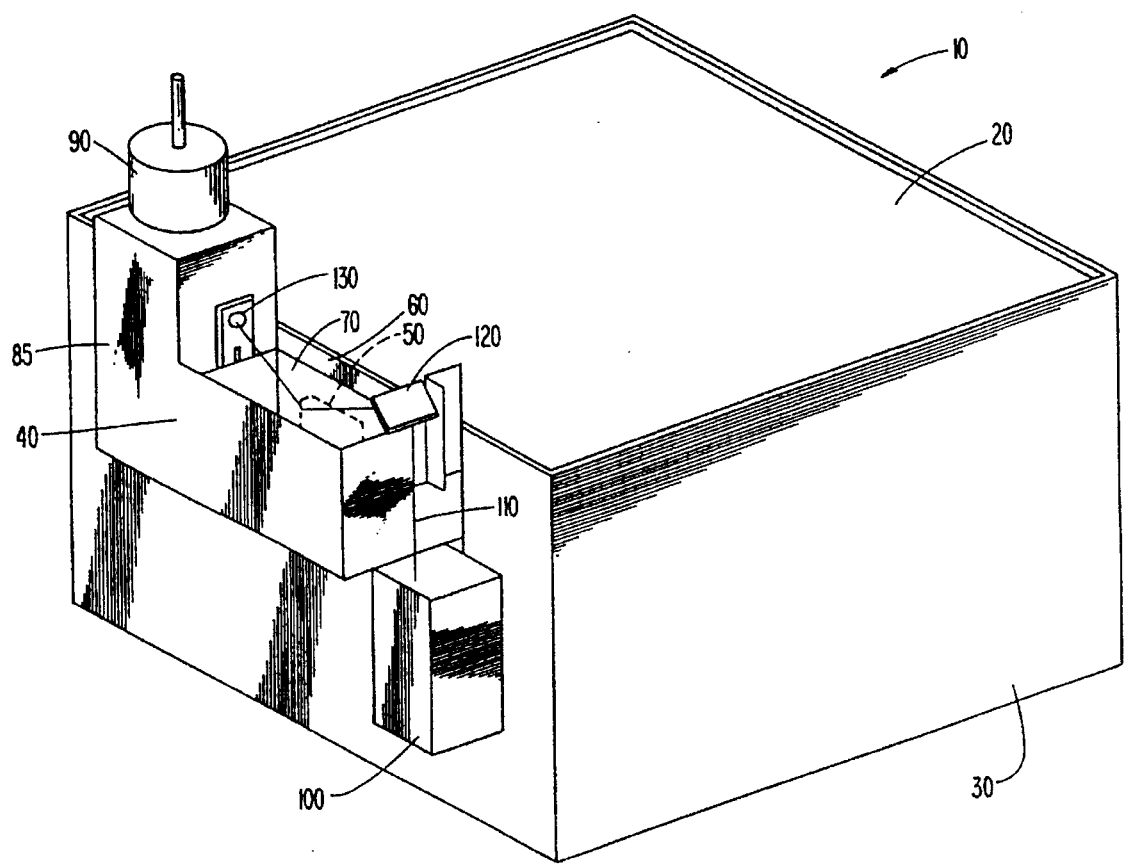
FIG. 8 a perspective view of a portion of a stereolithographic apparatus with a preferred embodiment of the fluid level measuring apparatus of the present invention mounted thereon.

Referring now to FIG. 8 in the drawings, an advantageous embodiment of the leveling aspect of the invention of Ser. No. 249,399, now abandoned is shown attached to a stereolithographic vat 30, which is the vat portion of a stereolithography apparatus, in order to measure the level of the working fluid 20 (e.g., a U.V. curable photopolymer such as DeSoto 4112-65) in resin vat 30. The stereolithographic vat depicted in FIG. 8, apart from the addition of the preferred embodiment of the invention and related equipment, has the basic format shown in U.S. Pat. No. 4,575,330 (earlier incorporated by reference) and found in the commercial stereolithographic apparatus sold by 3D Systems, Inc. under the acronym "SLA-1."

The stereolithographic apparatus 10 has a side tank 40 added to it which communicates with resin vat 30 by means of a subsurface passage 50 in wall 60 of the resin vat 30. The dimensions of the side tank are 7 inches by 4 inches in the preferred embodiment of the invention. The working fluid 20 fills the resin vat 30 and the side tank 40. The working fluid is free to flow from the side tank to the resin vat and vice versa. The level of the working fluid in the resin vat (and thus in the side tank) must be precisely controlled to a preset level in order to carry out stereolithographic production of parts (objects made by stereolithography are called "parts"). The apparatus of the present invention, in the form of the preferred embodiment shown, accomplishes this purpose. The subsurface passage allows resin to flow between tanks but blocks the transmission of bubbles near the surface of the material in the main tank from going into the side tank. The presence of bubbles could cause erroneous surface level detection by causing inappropriate reflection of the beam.

A helium neon laser 100 is mounted on resin vat 30 below and to the side of the side tank 40. The laser is aligned so that its output beam is emitted straight up along the side tank. A Uniphase 1508 laser has been found to be successful in the preferred embodiment of the present invention. The Uniphase 1508 laser was chosen because of its low cost, compactness, and low power requirements. The light emitted from this laser will not polymerize the working fluid.

The output beam 110 of the helium neon laser is directed upwards to a mirror 120 (a Rolyn Optics #60.21) mounted on a bracket above the side tank. This deflects the beam along first optical path 112 onto the surface 70 of the working fluid in the side tank 40, as may be best seen in FIG. 9. The beam strikes the surface of the working fluid at angle $\beta$ with respect to the surface 70 (the angle of incidence equals 90° minus $\beta$). Angle $\beta$ has a value at which a detectable component of the beam will be reflected along a second optical path 114. A varying range of angles will meet this latter requirement, depending upon the character of the fluid and the laser light, and the dimensions of the tank. In the preferred embodiment described here, this angle is 15°.

The apparatus described herein measures the level of the resin in the side tank as opposed to the vat. This is advantageous, since bubbles or other surface disruptions may form in the main vat as the part or support passes through the resin surface at each cycle of part building. These bubbles or other surface disruptions, if struck by the beam, could cause the beam to reflect from the resin surface at an erroneous angle. Other surface disruptions may form over the top of an immersed part that could cause an erroneous beam deflection, which disruptions could take a long time to level out. These include resin bulges, or areas where too much resin has been pushed off by the blade during recoating because of blade drag. These problems may be particularly acute in the case of certain part geometries having trapped volumes, or large, flat, horizontal surfaces, which geometries will be discussed in more detail farther on. By measuring the level of resin in a side tank, the above problems are minimized or eliminated.

After reflection from the surface 70 of the working fluid, the beam returns up along second optical path 114 at the same angle with respect to the surface of the fluid at which the beam impinged on the surface 70 of the fluid. The beam then shines on the bi-cell photo detector 130 mounted on plunger housing 85 on the other side of the side tank 40 from the mirror 120. The mirror is adjusted so that the beam impinges on the bi-cell detector 130 when the level of the working fluid is at the desired height. The mirror is not moved or turned once it has been adjusted to reflect the beam off the surface of the working fluid to the bi-cell photodetector when the level of the working fluid is at the desired height.

Figure 9:
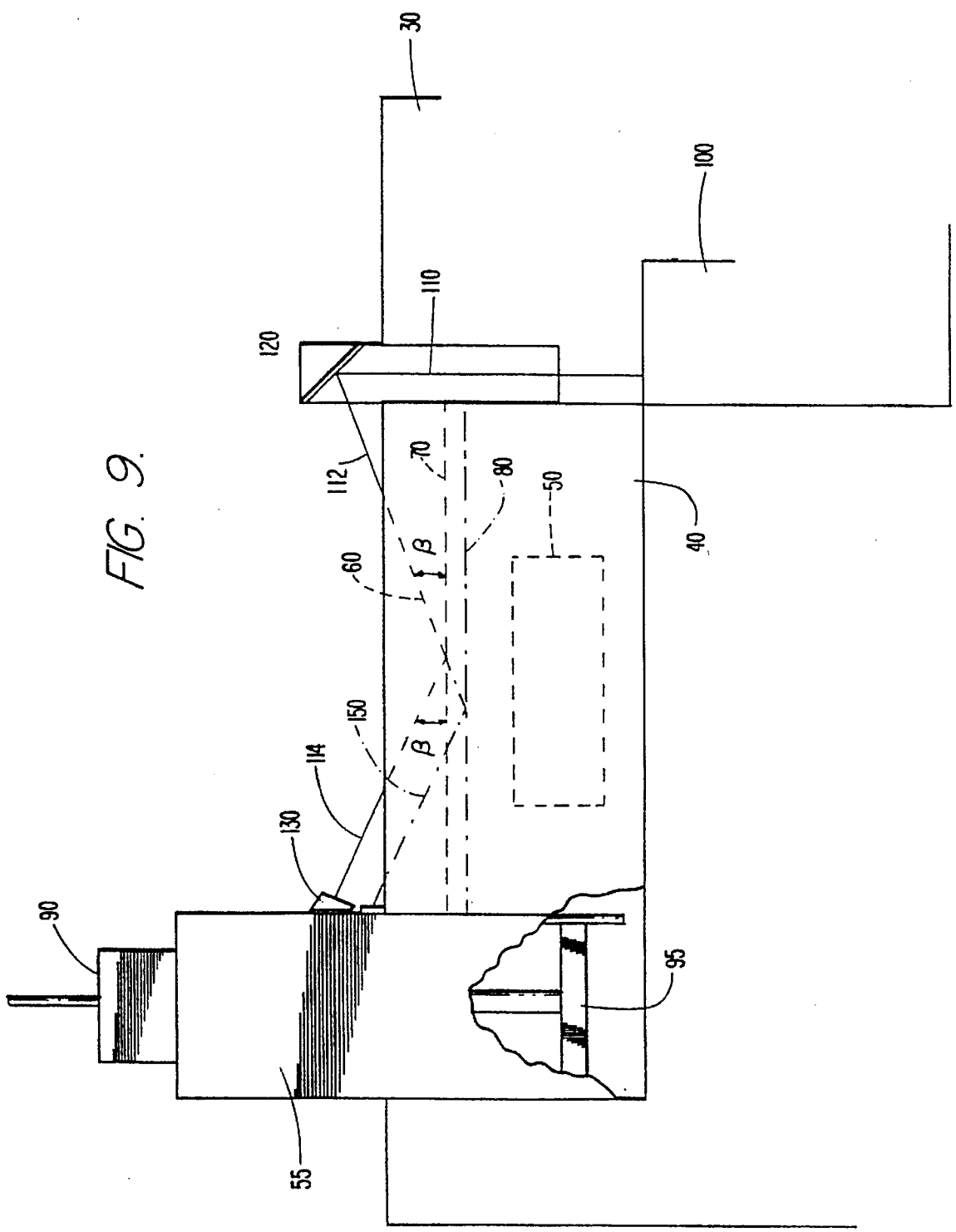
FIG. 9 s a side elevational view of a preferred embodiment of the invention.
Figure 11:
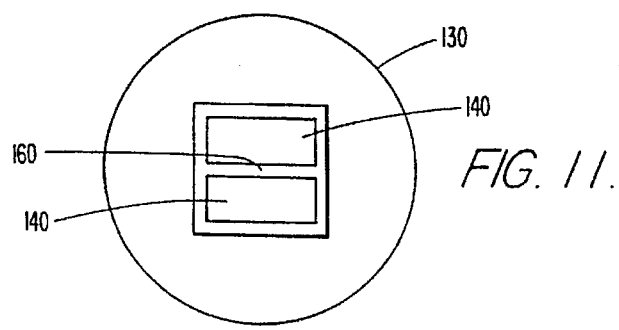
FIG. 11 is a front elevational view of a bi-cell photo sensor used in a preferred embodiment of the invention.
Figure 12:
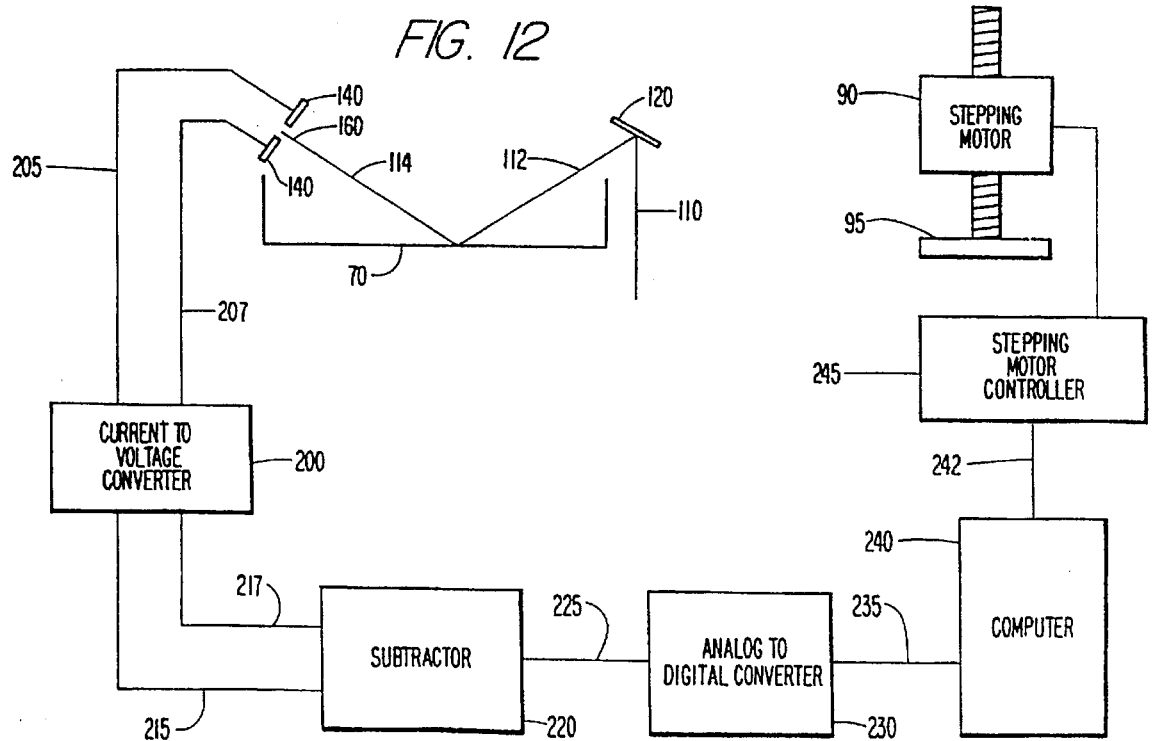
FIG. 12 is a block diagram of the electronics associated with the bi-cell photosensor of the preferred embodiment of the invention.

A satisfactory bi-cell photodetector, shown in FIG. 11, is made by Silicon Detector Corporation and is known by their number SD113-24-21-021. Other brands and sizes of bi-cell photo-detectors would be satisfactory. Linear position sensitive detectors ("PSD"), such as the Hamamatsu two-dimensional PSD (S1544) or two-dimensional lateral cell (S1B52) would be acceptable and might be preferable when the apparatus is intended to measure and display a quantity of output in terms of units of length. The bi-cell photodetector comprises two side-by-side photocells 140. The bi-cell photodetector 130 is mounted on the plunger housing 85 so that the photocells 140 are one above the other and both photocells are above the level of the working fluid. The photodetector may be inclined so that it intercepts second optical path 114 at a right angle, as is best seen in FIGS. 9 and 12. This ensures that the profile of the beam at the photodetector is a circle, not an oval, if the beam originally had a circular profile.

When the level of the fluid rises or falls due to shrinkage from curing, heating, and the like, the beam will strike the surface 70 at a different point. Accordingly, the beam will strike the bi-cell photodetector at a different point. This effect on the beam is shown in phantom in FIG. 9, where a lower level 80 of the working fluid reflects the beam along second optical path 150 to impinge at a lower point with respect to the bi-cell photodetectors. The working fluid level change is exaggerated to illustrate this effect; the preferred embodiment of the invention measures the level of the working fluid in order to maintain that level at a predetermined height. Level changes are small because such level changes are quickly corrected as described below.

Figure 10:
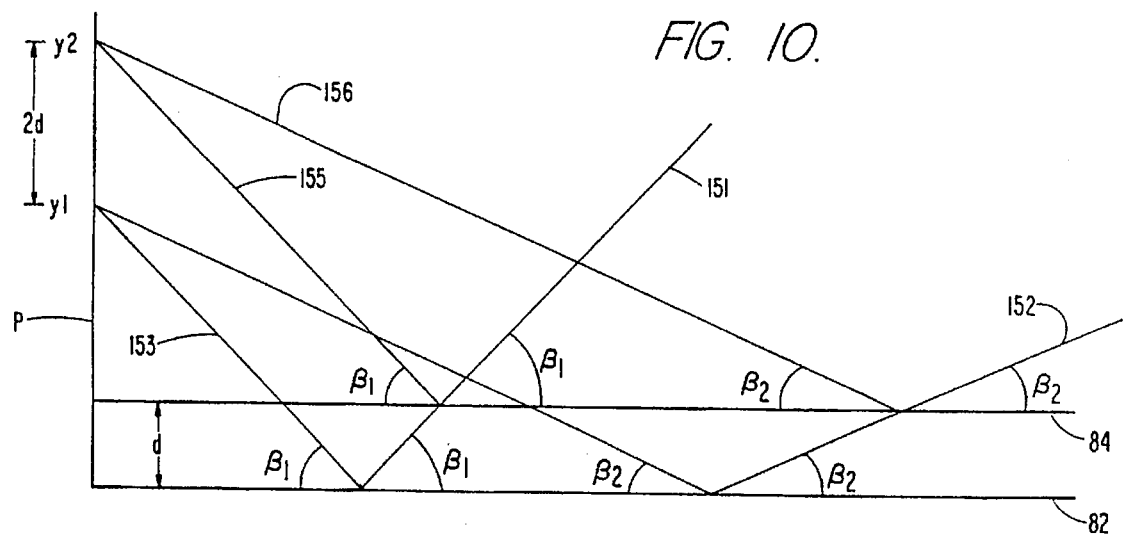
FIG. 10 is a side elevational view of the optical paths taken by the laser beam of a preferred embodiment of the invention under conditions of changing fluid level and angle of incidence.

A given change in the level of the working fluid will cause the same displacement in the point at which the beam impinges on the bi-cell photodetector, regardless of the value of $\beta$. FIG. 10 illustrates the result of a change in the working fluid level from level 82 to higher level 84. The difference between levels 82 and 84 is the vertical distance d. Two different beams are shown arriving along first optical paths 151 and 152, and meeting the surface of the fluid at angles $\beta_1$ and $\beta_2$, respectively. The second optical paths 153 and 154 (for the first level 82) are set to impinge on perpendicular P at the same point $Y_1$. When the level of the working fluid rises to level 84, the beams follow second optical paths 155 and 156, respectively. Simple trigonometric calculations reveal that both second optical paths 155 and 156 will meet perpendicular P at the same point $Y_2$ and that the vertical distance between $Y_1$ and $Y_2$ is twice the value of d, the vertical change in level of the working fluid. Accordingly, varying $\beta$ will not affect the accuracy of the method of measuring the level of a fluid according to the invention. The value of $\beta$ to be chosen depends mainly on which angle will obtain satisfactory reflection of the beam within the constraints of the apparatus.

The working fluid level change will result in a change in the electrical signal emitted by the bi-cell photodetector. The photocells 140 in the bi-cell photodetector are separated by slit 160 (see FIG. 11) which is narrow, less than a mil thick. The output of both of the photocells will be equal when the bi-cell photodetector is not illuminated by the laser or when the laser beam is exactly centered on the slit 160 between the photocells 140. The outputs become unequal when the beam moves so that it impinges on one of the cells more than the other. Comparison of unequal outputs by a comparison circuit, as described below, will result in a signal being sent to the stepper motor 90 in order to drive plunger 95. The plunger 95 (see FIG. 9) will go up or down as needed to maintain the level of the working fluid. Additional reasons for maintaining a known level of the working surface are described in U.S. patent application Ser. No. 268,907, now U.S. Pat. No. 5,059,021 and Ser. No. 268,837, now U.S. Pat. No. 5,123,734, referenced earlier.

The plunger maintains the working fluid level at a substantially constant level in space. This is advantageous for it keeps the laser beam in focus. If the level were allowed to change, as would be the case for certain resin dispensing systems which dispose fresh resin into the vat at each cycle of part building, the laser would have to be refocused for the new level.

Referring now to FIG. 12, the current outputs 205 and 207 of the photocells 140 are delivered as current to voltage converter 200 which converts the output of each photocell to a voltage between 0 and −2.5 volts. The two voltage outputs 215 and 217 of the current to voltage converter 200 (each photocell 140 has its own output) are supplied to subtractor 220, where the voltage outputs are subtracted. With the addition of a reference voltage (not shown) the difference between voltage outputs 215 and 217 is a signal 225 which ranges between 0 and +5 volts. When the fluid is at its desired level, signal 225 is at +2.5 volts.

Signal 225 is sent to analog/digital converter 230 where the signal is converted to digital signal 235, which then goes to computer 240. Computer 240 compares signal 235 to the predetermined digital signal for the desired fluid level and activates stepper motor controller 245. Stepper motor controller 245 in turn activates stepping motor 90 (a Minarik Electric Co. LAS 3802-001 stepper motor in the preferred embodiment) which moves plunger 95 up or down to displace fluid in order to return the fluid level to the desired value.

The computer is programmed to measure fluid level shortly after a first dipping operation, in which the part is dipped by moving the elevator deeper into the fluid, and before the elevator is raised back up to "draw" the next layer onto the part. The level of the working fluid is measured and controlled only at this specific time in the building process. The computer compares the signal 235 to the reference value at this specific time only and generates the signal 242 to the stepper motor controller 245 that determines how long and in which direction stepper motor controller 245 will activate stepper motor 90.

It is noted that the working surface determined in the leveling procedure (expected working surface) may not correspond precisely to the actual working surface when the upper surface of the part is located 1 layer thickness below the working surface. This is due to displacement of excess building material by the platform support arms, or the like, when the part is overdipped into the material. One may expect that the above systematic error can have several effects on part building: (1) the expected working surface may not correspond to the actual working surface, thereby causing a change in beam focus and a change in horizontal dimensions of the cross-sections of the part; and (2) the actual layer thickness may not be the expected layer thickness. However, in presently preferred systems, the cross-sectional areas of the support arms are extremely small compared with the surface area of the container of building material and the overdip distance is typically only 5–8 mm for typical building materials, thereby making the above-described effects negligible. If, however, one wants to be get rid of these effects, it is within the ability of one of average skill in the art to take into account the volume and level differences and therefore to insure that the actual and desired working surfaces coincide.

STAGED RECOATING

In an embodiment of the recoating apparatus of the subject invention, the ability to vary several parameters associated with the blade recoating process is provided, which parameters include the blade gap (which is the distance between the doctor blade and the surface of the resin bath in the vat), the blade clearance (which is the distance between the blade and the top of the part), the number of sweeps, and the velocity of each sweep. Typically, the blade clearance will be, but may not be, the same as the layer thickness of the next layer to be formed.

The optimal size of the blade gap depends on a balancing of several considerations. A large blade gap is problematic since it may lead to creases in the surface of the resin bath which will take time to level out. This is so because the blade gap determines the extent to which the top of the part must be raised above the building material surface for sweeping, and also determines the extent to which the top of the part must thereafter be lowered in before curing of the next layer can begin. For a 125 mil blade gap, for example, and a desired blade clearance of 20 mils, the top of the part must be raised 105 mils above the material surface before sweeping can begin, and then must be lowered 125 mils before curing can begin so the top of the part will be 20 mils below the working surface. The greater the movement of the top of the part, the more disruption that will be caused at the surface of the building material by the movement of the platform and supports, and the rest of the part, into and out of the liquid resin. This disruption is what is referred to above as a crease. These creases will typically form at the interfaces between the untransformed building material and the part.

A small blade gap is also problematic since the smaller the blade gap, the more resin the doctor blade typically must push out on a given sweep. For a 0 mil blade gap, for example, where the doctor blade is kept right at the surface of the bath, although the crease problem referred to above may be eliminated, the doctor blade may be required to sweep resin off the entire vat surface. This may create a small "tidal wave" of resin, which may spill over the side of the vat, and which may "break" and form bubbles on the resin surface.

Additionally, when using a liquid photopolymer building material, it has been found that too small a blade gap can result in a problem called "leading edge hump." This problem occurs when the back of the blade is wet with a quantity of resin prior to it sweeping over the part. The quantity of resin that can buildup on the rear of the blade is inversely proportional to the drag forces that are trying to separate it from the blade as the blade sweeps. As the blade first encounters the region in the vat that is over the leading edge of the previously formed layer of structure, the drag forces can be increased tremendously. This can have the effect of tearing a substantial portion of the clinging material off the blade and depositing it on to this first encountered (the leading edge) of the part.

It has been found that a blade gap of 25 mils provides a good compromise between the problems referred to above. Typically, the blade gap will be set once before a part is built, and thereafter remain constant throughout part building.

Another parameter which is advantageous to vary is the blade clearance. Unlike the blade gap, however, it is desirable to be able to vary the blade clearance throughout part building instead of just once before part building. The blade clearance is generally made variable by variable positioning of the part using the elevator stage.

Figure 13:
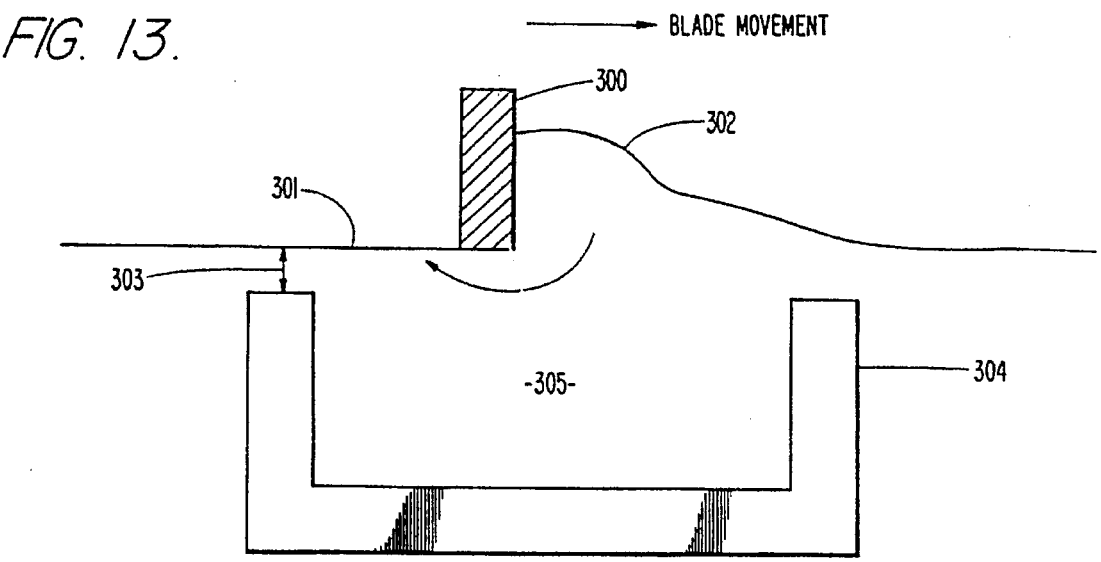
FIG. 13 illustrates the trapped volume problem.

A variable blade clearance is advantageous, because it makes staged recoating possible. Staged recoating is where multiple sweeps of the blade are used for recoating a given layer, with a different blade clearance and possibly blade velocity at each sweep. Assuming a layer thickness of 20 mils for the next layer, for example, in a staged recoating process, the blade clearance for the first sweep might be 60 mils, for the second 40 mils, and for the third, 20 mils. As a result, at each sweep, a smaller amount of resin will be swept away than if a single sweep were used with a blade clearance of 20 mils, and a smaller bulge of resin will build up in front of the blade than if a single sweep were used. A large bulge building up in front of the blade is problematic when a trapped volume of resin is encountered by the blade. When a trapped volume is encountered, because of the force of gravity, a large bulge of resin may flow underneath the blade, and disrupt the desired layer thickness of the smooth layer forming in the wake of the blade. If the bulge were not allowed to build up in the first instance, then this problem could be made less severe. This problem can be illustrated with FIG. 13, which shows blade 300 in the middle of a sweep. Part 304 has been overcoated and is located beneath the blade by distance 303, which is the blade clearance. For simplicity of illustration, the blade gap in FIG. 13 is zero. Smooth resin surface 301 is formed in the wake of the blade, while a bulge of excess resin, identified by reference numeral 302, is formed in front of the blade. When the blade encounters a trapped volume of resin, identified with reference numeral 305, if bulge 302 is large enough, resin from the bulge may flow underneath the blade as indicated to disrupt the formation of smooth surface 301. This effect is less pronounced where the blade is travelling over a flat, horizontal surface of a part, since there is less room for the resin to flow underneath the blade.

Another parameter which can be varied is the speed of the blade, especially during staged sweeping, where a different speed can be specified for each sweep. It is advantageous to be able to tailor the blade speed to part geometry. When the blade is passing over a large, horizontal flat area of a part, if the blade is travelling too fast, too much resin may be swept away because of drag, which will induce resin below the blade to move at a particular velocity. If the blade is moving at 5 in/sec. for example, resin 1 mil below the blade may be induced to move at 4 in/sec, and resin below that may be induced to move at 3 in/sec. In some instances, drag may be so severe over flat areas, that substantially all liquid resin is swept away by the blade. Therefore, over large flat areas, it may be desirable to slow the blade speed down so that the above problem does not occur.

On the other hand, over trapped volumes, if the blade is moved too slowly, this may give the resin in the bulge more time to flow underneath the blade. Therefore, over trapped volumes, it may be desirable to increase the speed of the blade so that resin does not have time to flow underneath. However, the speed can be increased too much, thereby resulting in a scoopout problem like that mentioned when sweeping a flat region. Additionally, if it is increased too much, a wave of resin may be formed in front of the blade, which could break and form bubbles.

Unfortunately, it is difficult in general to obtain desired coatings by varying the speed of the blade as it sweeps over a given cross-section, depending on part geometry, since the blade may encounter a flat region and a trapped volume simultaneously. However, when a variable speed is provided for each sweep of staged recoating, the speed of the blade at each sweep and the number of sweeps can be chosen to minimize the above problems for a particular cross-section geometry. For example, it may be desirable for certain parts, where large flat areas and trapped volumes will be encountered, to use a large number of sweeps per layer, in the range of 3-10, or higher, with a relatively slow blade speed at each sweep. Because of the large number of sweeps, only a small amount of resin will be pushed away at each sweep, so that a bulge will not be able to build up and flow underneath the blade when a trapped volume is encountered. On the other hand, because of the slow blade speed, the problem of pushing away too much resin off of a large, flat, horizontal part surface will be minimized. This is because the blade will not be able to generate enough drag to sweep away the resin. Moreover, the slow blade speed will not be a problem over trapped volumes since a large bulge will not be allowed to build up, so there will be little or no problem of resin flowing underneath the blade even with the slow blade speed.

It is also advantageous to be able to vary the extent to which the part is overdipped into the resin before sweeping begins. As described earlier, the part is typically immersed beneath the surface of the resin by more than the desired layer thickness of the next layer. For example, in a commercial embodiment of a SLA known as the SLA-250 manufactured by 3D Systems, the assignee of the subject invention, preferred layer thicknesses are ½ mm. or lower. In the SLA-250, the part is typically overdipped into the resin by 8 mm, which is many times a typical layer thickness. Therefore, it is desirable to be able to vary this parameter depending on layer thickness.

A typical recoating cycle comprises the following steps: 1) deep over-dipping of the part; 2) detecting and adjusting resin surface level; 3) raising the part to the appropriate level so that it is located at the first blade clearance beneath the blade, a/k/a "up dipping"; 4) sweeping; 5) positioning the part for additional sweeps and performing these sweeps; 6) moving the part to its proper position, one layer thickness below the working surface, if necessary; and 7) delaying so that any intolerable surface imperfections settle out. The required delay time can be decreased by the application of vibrational energy to the surface of the building material. Techniques and apparatus for applying such vibration to the surface of the building material are disclosed in Ser. Nos. 414,134, 495,791, now abandoned. Overdipping by more than a layer thickness not only ensures that excess resin will form over at least a substantial portion of the part which can be smoothed out during sweeping, but it also ensures that surface disruptions which could interfere with resin level detection in step 2) level out faster. If the part were immersed close to the surface, any surface disruption which could form above the part would take longer to level out. This is because the "channel" between the top of the part and the resin surface would be smaller, and would restrict the movement of resin needed to smooth out disruptions. Therefore, because of overdipping by more than a layer thickness, level detection is correspondingly made more accurate. Moreover, if overdipping were limited to one layer thickness, then thin layer thicknesses of 0.1 to 0.5 mm (approximately 4 mils to 20 mils) would be very difficult to recoat. But, these layer thicknesses may be necessary to build many parts with high resolution. Therefore, deep over-dipping also makes thin layers in this range easier to recoat.

In sum, in this embodiment, the ability to vary the blade gap, blade clearance, depth of overdipping, and blade speed, and the ability to use staged recoating, provide means to better tailor blade recoating to specific part geometries, so that specific problems associated with these geometries can be overcome.

IMPROVED BLADE DESIGNS

In an additional embodiment, the blade design can be varied to make it even more efficient. In the SLA-250, the cross-section of the doctor blade is a rectangle having a width of ⅛ inch. In addition, the blade is supported at only one end with a support rail, which guides the movement of the blade so that the blade and its support resemble a cantilever. This may cause problems known as "flutter" and "twist," whereby the unsupported end of the blade "twists" about its long axis, and "flutters" in the form of vertical oscillations, thereby leading to errors in the recoating process, such as nonuniform layer thickness. The extent to which the unsupported end will twist and flutter is proportional to the square of the blade length. An additional problem that may occur is the setting of the blade gap with this blade. This process involves many steps, each prone to error, and is also time-consuming. Moreover, it requires manually tightening screws which can exert torque on, and therefore deflect the blade, thus upsetting the accuracy of the procedure itself.

Modifications to the doctor blade are possible that address these problems. Some of these modifications have been included in a new stereolithography system known as the SLA-500, also developed by 3D Systems, Inc.

First, to enable blade gap setting to be more easily accomplished, micrometer screws are provided at each end of the blade, which allow the height of each end of the blade above the resin surface to be independently adjusted to the known value within a tolerance of ½ mil without exerting torque on the blade.

In addition, threaded, retractable needles are provided, one at each end of the blade, each of which extends a known distance from the bottom of the blade, which distance is equal to the expected blade gap. At present, the needles extend 25 mils beyond the bottom of the blade. If a different blade gap were desired, needles which extended a different amount could be used.

Figure 14:
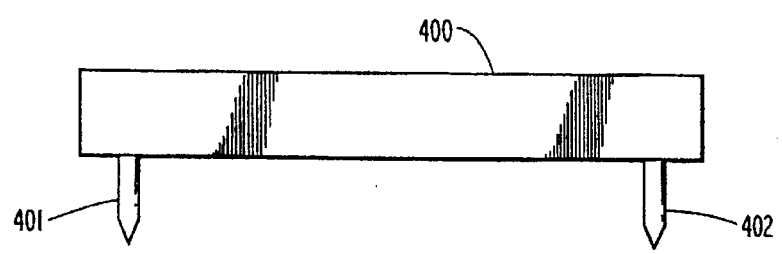
FIG. 14 illustrates threaded, retractable pins for setting the blade gap.
Figure 15:
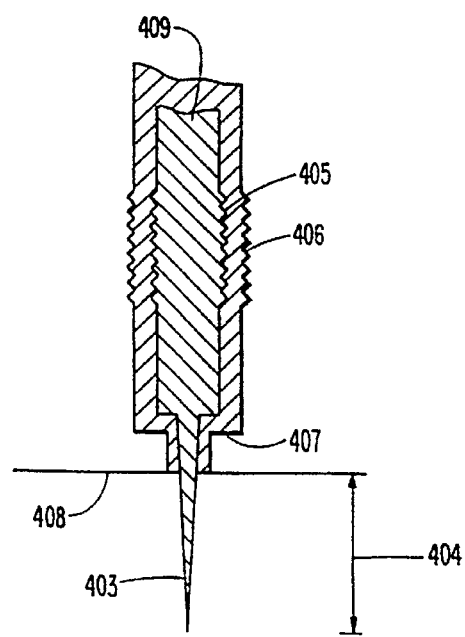
FIG. 15 provides a close-up view of the pin mounted in the blade.

The needles are illustrated in FIGS. 14 and 15. FIG. 14 shows blade 400 with needles 401 and 402 provided near the ends. FIG. 15 shows a closeup of one of the needles which is mounted in the blade. As shown, the needle has an extended portion 403, which extends a distance 404 beyond the bottom 408 of the blade. In the SLA-500, the distance is 25 mils±0.5 mils. As shown, the needle has a threaded portion 405, which is preferably a micrometer thread, having at least 60 turns/inch.

The needle mount in the blade is identified with reference numeral 409. As shown, the mount has a threaded portion 406, into which the threaded portion of the needle can be threaded, and stops 407, for controlling the extent to which the needle can protrude beyond the bottom of the blade.

To set the blade gap, the needles are used by screwing them into the blade until they reach the "stops" and they protrude the appropriate amount. Then, the micrometer adjustment screw at one end of the blade is turned until the needle at that end just touches the resin surface. When using a liquid photopolymer, this can easily be determined visually since the tip of the needle will form a large easily-observable meniscus with the resin surface when it touches the fluid surface. Thus, the needle can be placed at the surface within a tolerance of ¼ mil. Next, the micrometer screw at the other end of the blade is adjusted until the needle at that end just touches the resin surface. Finally, the blade is raised relative to the surface, and then lowered to insure that both needles touch the surface at the same time. One method of raising the blade relative to the surface involves leaving the blade stationary and lowering the resin surface until the meniscus breaks. This is done by controlled use of the liquid level adjustment plunger. Then, the level is raised (using the plunger) slowly until contact is made between the needles and the liquid. If the blade is adjusted properly, this should occur simultaneously for both needles when the resin regains its proper level. If not, further iterations of the above cycle are made until they do. When they do, the blade gap is deemed set, and then the needles are retracted so they no longer protrude. They will remain in the mounts, however, so that the blade mass stays the same.

Other means for attaching the needles to the blade are possible, including the use of detente pins and release buttons similar to those used with a ratchet set.

To significantly reduce twist and flutter of the blade, a second support rail is added so that each end of the blade is supported by such a rail. This will greatly reduce or effectively eliminate twist and flutter at the unsupported end of the blade.

Because of the double rail support, the blade can be made thicker for increased strength, and also to reduce flutter in the middle of the blade. A thicker blade may not be possible with just one support since the blade would sag more. At present, SLA-500 blades are available at widths of ⅛ in, 3/16 in, and ¼ in.

Figure 16:
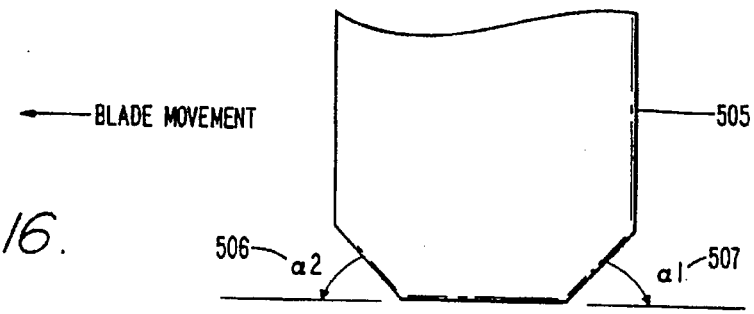
FIG. 16 illustrates a cross-section of a blade having an angle of attack in the direction of blade movement.

Finally, as shown in FIG. 16, the blade cross-section can be changed so it is no longer rectangular. First, the bottom of the blade can be constructed so that the non-horizontal edges of the blade near the bottom form angles, identified with reference numerals 506 and 507, known as the angles of attack and separation, respectively, with the resin surface. The angle of attack is the angle in the direction of blade movement while the angle of separation is the angle at the other end. These angles are added to better improve resin flow underneath the blade. Without these angles, flow under the blade is more likely, which may create problems with trapped volumes. As a result, this may turn up as an imperfection in the part. By angling the edges of the blade, the pressure gradients are increased underneath the blade, leading to less fluid underflow and therefore possibly improved recoating of parts with trapped volumes. It has been found that, depending on part geometry, these angles can range between about 5 and 8 degrees, and in addition, the angle of attack can differ from the angle of separation. For the SLA-500, an angle of attack of 6 degrees is used.

The blade in FIG. 16 is shown as bisymmetric so that it can sweep in either direction. Alternatively, two asymmetric blades could be used alternatively to sweep in either direction with angles of attack in the direction of movement. Other blade configurations are possible.

Figure 17:
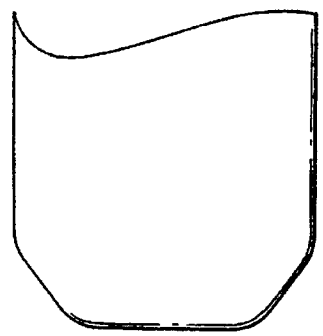
FIGS. 17–19 illustrate alternative cross-sectional shapes for the blade of FIG. 16.
Figure 18:
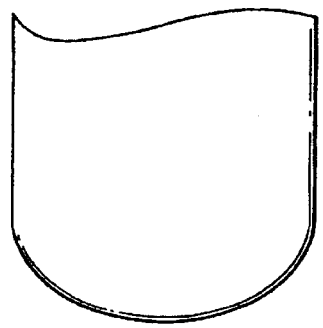
Figure 19:
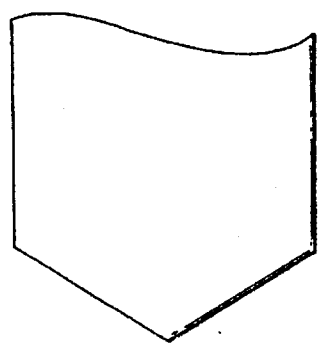

FIG. 17 shows the blade of FIG. 16 where each vertex point is rounded. This may further reduce underflow. FIG. 18 shows a version where the entire bottom is rounded. FIG. 19 shows a version where the bottom is a sharp vertex.

LEVEL DETECTION USING A FLOAT

The levelling apparatus of the subject invention (which apparatus is used in the SLA-500) will now be described. This apparatus overcomes a problem which may occur with the bi-cell detector apparatus described earlier. As discussed earlier, the bi-cell apparatus may be sensitive to bubbles. To overcome this problem in that apparatus, a side tank is added in which bubbles are not formed, and the resin level is detected in the side vat. However, when a layer of resin is supported on a heavy immiscible fluid as described in U.S. patent application Ser. No. 365,444 now U.S. Pat. No. 5,143,663, the resin level in the side tank may not be an accurate determinate of the resin level in the main vat, as is assumed. This is because during part building, if the resin in each chamber only communicates with the resin in the other chamber through the denser immiscible fluid, resin in the main vat may be used up disproportionally compared with the side tank. Because of this disproportionality, the liquid in the side tank, when viewed as a whole, may not be as dense as that in the main vat. This may cause the resin level in the side tank to falsely read too high.

To overcome this problem, an apparatus including a float is employed in the SLA-500 to detect the resin level in the main vat instead of the bi-cell apparatus described earlier. The float has the advantage that it is relatively insensitive to bubbles, and so can be used to detect the level of the resin in the main vat as opposed to a side tank. This is because a bubble which attaches to the side of the float will not appreciably change its density, and hence the level at which it floats. Therefore, a side tank is not needed, and the float will accurately detect the resin level even if a layer of resin were floated on a heavy, immiscible fluid.

The float can take many shapes. For the SLA-500, the float is presently in the shape of a small can, having a volume of about 50 cc or more. In addition, the float is advantageously TEFLON coated, so that any resin that gets on the top, or wets the sides of the float, will rapidly drip or slide off, and not substantially change the density of the float for an appreciable period of time.

Figure 20:
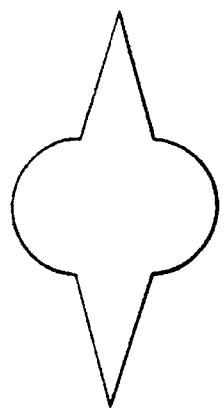
FIG. 20 illustrates an alternative shape for a level-detecting float.

If a bubble were able to lodge itself underneath the float, this could cause an erroneous level measurement since it could change the extent to which the float is submerged. In this instance, to combat this problem, other float designs are possible, as shown in FIG. 20, which would discourage bubbles from lodging underneath the float.

Figure 21:
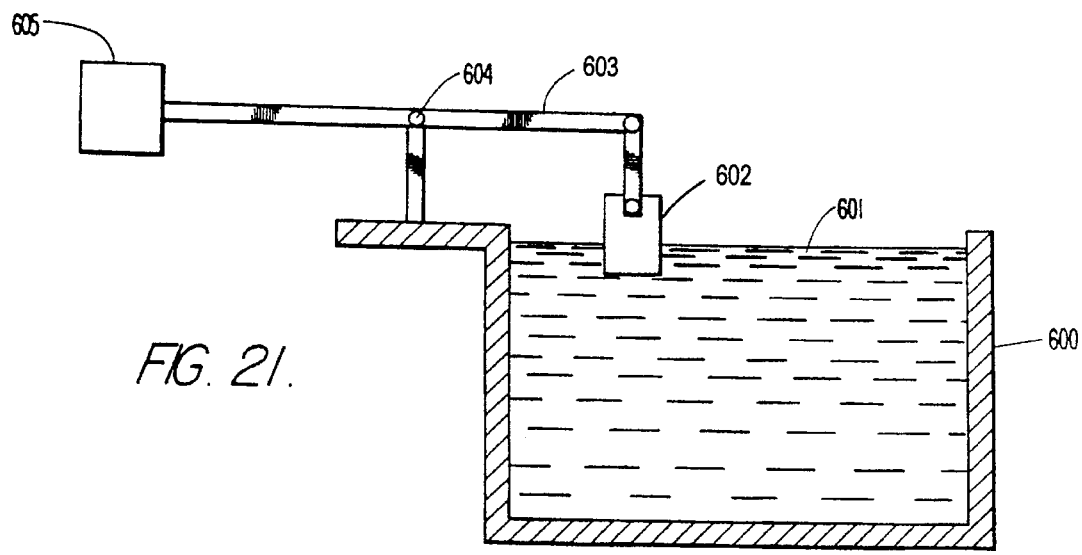
FIG. 21 illustrates a level detecting apparatus including a float.

The float apparatus presently used in the SLA-500 is illustrated in FIG. 21. As illustrated, the apparatus comprises float 602, supporting beam 603, bearing 604, and optical detection circuitry 605. As shown, the supporting beam is coupled to the float, which floats on resin surface 601 placed in vat 600. The beam is also vertically rotatable around bearing 604. In the SLA-500, bearing 604 is advantageously a class 9 bearing. In the present preferred embodiment, the length of the beam 603 between the float 602 and the bearing 604 is shorter than the length of beam 603 between bearing 604 and the optical detection circuity 605. This increases the sensitivity of level detection by causing a larger displacement of the optical blocking element of circuity 605 for a smaller displacement of float 602.

Figure 22:
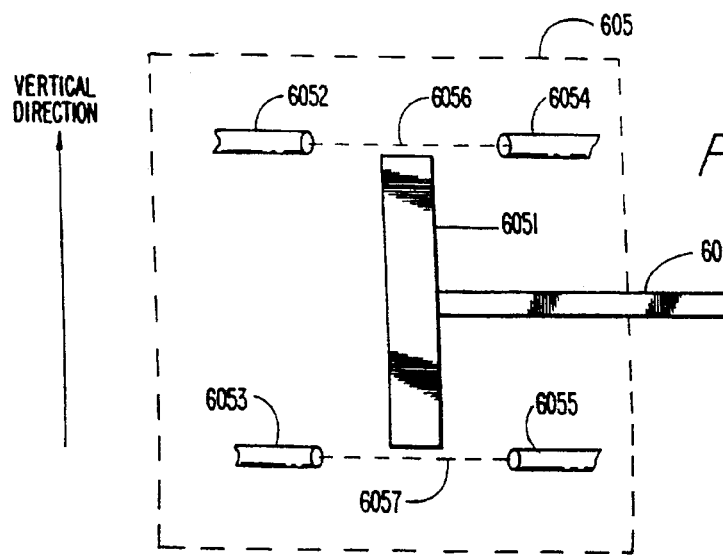
FIG. 22 is a diagram of the optical detector of the apparatus of FIG. 21.

The optical detection circuitry 605 is shown in detail in FIG. 22. As illustrated, the circuitry comprises member 6051 which is coupled to beam 603, light-emitting diodes ("LEDs") 6052 and 6053, which emit light beams 6056 and 6057, respectively, and optical detectors 6054 and 6055, which detect the uninterrupted presence of light beams 6056 and 6057, respectively. The optical detectors are electronically coupled to a plunger or other means (not shown) described earlier for raising or lowering the resin level in response to electrical signals from the optical detectors.

Any change in the level of the fluid will cause a corresponding vertical displacement of the float. This, in turn, will cause beam 603 to rotate around bearing 604, which will cause member 6051 to displace vertically by a distance which is a magnification of the fluid displacement.

As long as the member 6051, as shown, is situated between and does not block either of the two light beams, 6056 and 6057, the uninterrupted presence of which is detected by optical detectors 6054 and 6055, respectively, the resin level is assumed to be at the correct height. The locations of optical detectors 6054 and 6055 are positioned so that light beams 6056 and 6057 barely miss being blocked by member 6051 when the resin is at the proper level. When member 6051 is moved even slightly, it will block either beam 6056 or 6057 from reaching optical detector 6054 or 6055, respectively. Only when member 6051 is deflected sufficiently to block the passage of one of the light beams to its corresponding optical detector, which will be detected by the failure of the optical detector to pick up light from its corresponding LED, will it be assumed that the resin is at an incorrect level. In this instance, a plunger or other means electrically coupled to the optical detectors will be either raised or lowered in order to position the resin level, and hence float, at the correct height. If beam 6056 is blocked by the member, which will be detected by optical detector 6054, it will be assumed that the resin level is too low, in which case a plunger or the like could be lowered into the resin until the resin level is raised to the correct height. If beam 6057 is blocked by the member, which will be detected by optical detector 6055, it will be assumed that the resin level is too high, in which case a plunger or the like could be raised out of the resin until the resin level is lowered to the correct height. Note that both of beams 6056 and 6057 cannot simultaneously be blocked by member 6051. Therefore, there will rarely, if ever, be an ambiguity with this apparatus, in the instance there the resin level is at an incorrect height, regarding whether the proper response thereto is to raise or lower the resin level.

SAMPLE RECOATING SOFTWARE

Figure 23:
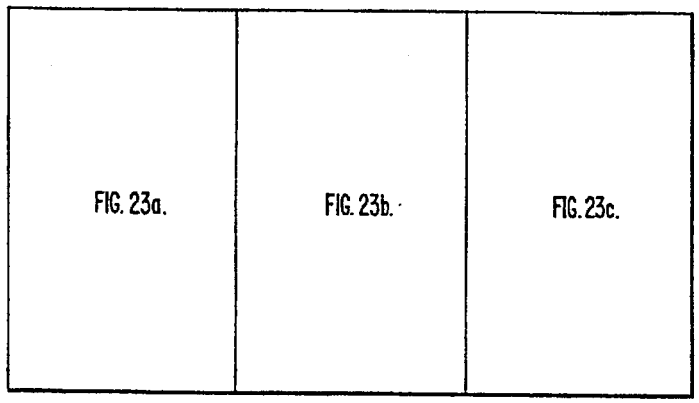
FIG. 23 is a block diagram of the flowchart of the recoating software used in one embodiment of the SLA-250.

Sample recoating software used in an SLA-250, which uses a liquid photopolymer building material ("resin") will now be described. A specification for the software in the form of a flowchart is illustrated in FIG. 23. Before utilizing the software, a user must first specify certain parameters that will be used to control the movement of the platform. These parameters are ZA, ZV, ZW, and ZD. As described in more detail in U.S. patent application Ser. No. 331,644, now U.S. Pat. No. 5,184,307, the platform is under the control of a computer known as the PROCESS computer. ZA is the amount the PROCESS computer will cause the platform to accelerate or decelerate, ZV is the maximum velocity the platform will be allowed to achieve due to acceleration ZA, and ZD is the depth the platform is caused to overdip into the liquid resin before sweeping. As discussed earlier, ZD is typically much greater than a layer thickness. ZW is the settling delay, which is the amount of time the PROCESS computer is directed to wait after the platform has been lowered after sweeping to place the upper surface of the resin layer on top of the part at the same level as the resin in the vat. The PROCESS computer will wait the amount of time specified by ZW before beginning the curing process for the next layer.

Besides these parameters, the user may specify other variables for each layer or range of layers including SN, which is the number of sweeps per layer, and GV, which stands for global velocity, and indicates that all sweeps are to be made at the specified velocity. The user also may specify V1–V7, which are individual velocities associated with sweeps 1–7, respectively. By setting these values, the user indicates he or she wishes velocity to vary by sweep.

The process begins in step 700, when layer N is drawn. Next, in step 701, the platform is lowered beneath the resin surface by ZD at a speed determined by ZA and ZV. In step 703, a post-dip delay is implemented to allow settling of the resin since the platform has just been moved. This post dip delay is generally very short (a few seconds or less). Only a few second are needed since the resin is relatively viscous so that waves induced by the movement of the part are damped out quite rapidly. Additionally, only locations of the part can cause long term perturbations of the surface, and the part has been moved far below the resin surface to eliminate these effects.

In step 704, a reading from the bi-cell detector is taken and then corrected for by subtracting a bias introduced by the circuitry (identified as BCVAL-BIAS). The reading is then compared with an upper limit, identified as UPLIM, and a lower limit, identified as LOWLIM. If between these two values, the resin level is assumed to be at the correct height.

Assuming the level is at the correct height, in step 705, a flag is checked to see if set. The flag is set in response to a key pushed by the user, which indicates that the user manually is adding or taking away resin from the vat. Once the flag is set, a key must be pressed a second time to indicate that the operator wants the system to begin the leveling process again. Assuming the flag is not set, in step 708, a check is made to determine that SN, the number of sweeps for layer N+1, is greater than 0, and that the platform is still in a safe position so that the blade will not strike it while sweeping. The upper bound for the platform position is identified by the mnemonic NOSWEEP. If these conditions are not met, the platform is raised by ZD–ZS (one layer thickness below the working surface). This is indicated by step 752 or 753. The process continues from this point with steps 749, 750, and 751, as will be discussed subsequently.

Assuming these conditions are met, in step 709, an internal counter, SWEEP, is first initialized to 0, and then incremented by 1. In step 710, the platform is moved to locate the part at the part/blade gap, and in step 711, the sweeper motor is energized (in the present terminology the part/blade gap is the blade clearance). In step 712, a check is made to determine whether the blade is at the front or back of the vat. Assuming the front for the moment, in step 713, the blade is swept to the back of the vat (which is a distance specified by SWEEPDIST) at a velocity which may depend on the current value of SWEEP.

When the blade has reached the rear of the vat, it will in the usual instance trigger a switch identified with the mnemonic LIMIT SWITCH. Assuming the limit switch has been activated, in step 727, a check is made to determine whether all the sweeps specified by SN have been performed for the layer. Assuming they have not, a jump is made back to step 709, where the above cycle is repeated, starting with the incrementing of SN by +1 (we do not reset sweep to 0).

Turning back to step 714, in the case where the limit switch has not been activated, the blade is slowly moved towards the rear at the velocity of 0.5 in/sec., and assuming the limit switch is activated within 2 seconds, a jump is made to step 722. Assuming it is not so activated, the process is aborted in step 721.

Turning back to step 712, assuming the blade is at the back of the vat, in step 717, the blade is swept towards the front at a velocity which may be a function of the current sweep number, and in step 718, a check is made to see if the limit switch has been activated. Assuming it has, a jump is made to step 722. If it has not, in step 719, the blade is slowly moved towards the front at a velocity of 0.5 in/sec., and if the limit switch is activated within 2 sec., a jump is made to step 722. If it is not, the process is aborted in step 721.

Turning back to step 704, which is right after the platform (and part) have been overdipped below the resin surface, if the resin level is not at the appropriate height, a check is made in step 723 to see if it is too high or too low. If BCVAL-BIAS is not greater than UPLIM, the resin level is too low, and the plunger must then be lowered into the resin. In step 724, a check is made to see if the plunger is already at its lower limit of travel, and assuming it is not, in steps 725 and 726, the plunger is lowered, and the plunger position, identified with the mnemonic PLUNGPOS, is updated. In step 727, a delay is instituted to allow the resin to settle, and a jump is made to step 704 to check the resin level again. The above cycle then repeats.

Turning back to step 724, assuming the plunger is at the bottom of the vat, there are two possible mechanisms by which the resin level can be raised: 1) by adding resin to the vat (this could, of course, be automated by the addition of a resin pumping means or the like); or 2) by the liquid level rising on its own (e.g., due to an increase in its temperature). In step 732, the level is checked again, and assuming it is still too low, in steps 733–734, the user is asked to press a key indicating he or she will manually add resin. Until the key is pressed, the process will loop. While waiting for the key to be pressed, the resin level may rise on its own (e.g., increase in temperature). If this occurs, a corresponding "yes" response to step 732 occurs, and the process automatically continues by proceeding back to step 704. If this rising of the resin doesn't occur spontaneously, through temperature fluctuations or the like, resin can be added manually. The desire to manually add resin is initiated by pressing a key. When the key is pressed, a flag is set (the same flag which is checked in step 705). While the user presumably adds resin to the vat, in step 739, the process will loop until the resin level is at the correct level. When it is, in step 740, a message is sent to the user indicating that enough resin has been added, and a jump is made to step 704.

Turning back to step 705, after the resin has been added so that the resin level is at the correct height, the flag must be reset. This condition is detected in steps 705 and 706, and in step 707, the flag is reset. This manual resetting of the flag ensures that the system doesn't automatically start up when it detects the appropriate resin level since the operator may still be working on the machine. After resetting the flag, the system continues to automatically loop through step 704, checking the resin level for 30 seconds to ensure everything is operating properly (e.g., resin temperature and height are stable).

Other embodiments are possible, which include means to automatically add or take away resin from the vat when the plunger reaches one of its limits, such as a pump or the like which is responsive to means for detecting when the plunger is at one of these limits.

Turning back to step 723, in the case where BCVAL-BIAS is greater than UPLIM, indicating that the resin level is too high, the plunger must be raised. A check is made in step 728 to see if the plunger is already at its highest possible position, indicated by 0. Assuming it is not, in steps 729–730, the plunger is raised, and the plunger position, identified as PLUNGPOS, is updated. Then, in step 731, a settling delay is instituted, and a jump is made back to step 704.

Turning back to step 728, assuming the plunger is at its highest position already, and cannot be raised anymore, the user must be notified to remove some resin from the vat or the system must wait for the resin level to drop on its own. In step 741, a check is made to determine that the resin level is still too high, and in steps 742–743, the user is sent a message, asking him or her to remove resin, and is asked to press a key acknowledging the message. Until the key is pressed, the process will loop. The process will continue when circumstances allow provided that this occurs before a key is pressed. When the key is pressed, in step 744, a flag is set, and in step 745, while the user is removing resin, the resin level is checked until it is at the appropriate height. Until it is, the process will loop. When the level is at the correct height, in step 746, the user is notified to stop removing resin, and a jump is made back to step 704. In steps 705–707, as discussed earlier, a key is pressed to reset the flag.

Note that levelling need not be performed at each layer, but only when the level may have changed because of any of the following: 1) thermal expansion; 2) shrinkage; and 3) changing displacement caused by platform supports. If none of these are present or not considered of significant magnitude, levelling need not be conducted on every layer. Instead, leveling may occur at any appropriate interval, periodically or non-periodically, as the circumstances dictate, such as on every other layer, or every fifth layer or in some other sequence.

Turning to steps 747–749, when all the sweeps for layer N+1 have been performed, the sweeper motor is de-energized and the platform is adjusted, if necessary, to place the upper surface of the last layer one layer thickness below the working surface of the resin, a settling delay equal to ZW will be instituted, and in steps 750–751, the vectors for layer N+1 are computed, and the layer drawn using these vectors in step 751. More detail on computing vectors and drawing layers is provided in U.S. patent application Ser. No. 331,644, now U.S. Pat No. 5,184,307. Of course, if parallel processing occurs, step 750 can be performed while the leveling and sweeping processes occur.

The above cycle is then repeated for the remaining layers of the part.

A listing of recoating software, version 3.60, used in the SLA-250, will now be provided. The software comprises the following modules, written in TURBO PASCAL, each of which is listed in turn:

| Module | Description |
|---|---|
| UTLSWEEP.PAS | Controls sweeping during part building; used in conjunction with BUILD |
| SINSTEP.PAS | Allows sine wave stepping of the platform during recoating |
| MACHINE.PRM | includes sweeping input/default parameters |
| AUTOLEVEL.PAS | performs leveling in between the drawing of layers |
| UTLADJUST.PAS | used to set resin level before building a part |
| RECOATER.PAS | uses above programs to perform recoating action external to BUILD |

As described in more detail in U.S. patent application Ser. No. 331,644, now U.S. Pat. No. 5,184,307, BUILD is the program which orchestrates the building of a part. As indicated above, the programs will, in the usual instance, be used in conjunction with BUILD. Together, these programs will provide functionality substantially similar to that described above with respect to FIG. 23. RECOATER.PAS, however, provides a means to perform recoating independent of BUILD. The software listings follow:

Copyright © 1989, 1990 3D Systems, Inc.

PATENT
188/189

```
unit UTLSWEEP;
{$D+ $L+}
{==============================================================
    3D Systems Stereolithography System Software
==============================================================

UTLSWEEP.INC
    SLA Recoater blade and plunger utility include file.

11/15/88 GOF File created.
    11/28/88 GOF Updated for production SLA250 board.
    11/30/88 GOF Add BldSweep.inc, solidify interfaces with
Richard.  Its his fault!
    01/03/89 GOF Comment out all if keypressed from sweeper code.
    01/13/89 GOF Put MonitorLaserBeamDrift as a part of PD,
postdipdelay.
    01/18/89 GOF Integrate with Jon's SLA 500 version.
    01/24/89 JFT If requested speed is > MaxSafeSineSpeed then we
use the old square-wave steps to move the recoater, but if it's
<= it then we use sine-wave stepping from SINSTEP.PAS unit, which
we now USE here.  Both methods changed to correct speed
parameters to correct velocity.
    01/31/89 JFT Pass ZAccel & ZVeloc as parameters to ZFreeMove &
ZMoveGivenDistance.
    01/27/89 GOF Add PD2, the second post dip delay for set
plunger proc.
    01/31/89 GOF Add routine to read and write Machine.prm
(MaxBladeMoves)
    02/01/89 GOF Add PD2, DrainAccel, and DrainVeloc to sweep.prm.
``` jo/2506

02/07/89 GOF Add XP support. (extra Platform) Also change Veloc to Floatt.

02/24/89 GOF Add exit to SetPlunger if its OK the first ReadBiCell.

02/27/89 GOF Minor cleanup and comments.

03/07/89 JFT On PlungerUp full stroke, add better assurance of getting to top.  Echo stall message if we don't reach it.

03/17/89 JFT It's only fitting that I'm writing this on a green display.  To accommodate the SLA-500, MaxPlungeMoves has become greater than maxInt.  So, variables in this unit that take assignment from MaxPlungeMoves are transformed to longint.

04/10/89 JFT Change Velocity to Period.

05/22/89 JFT Change blade malfunction alert to allow user to reposition blade.

07/05/89 JFT Single Coil Holding Torque.

09/20/89 JFT/RAG Added Sweeper Calibration procedure and support for NCR.
-----------------------------------------------------------}
{***********************************************************}
interface
uses CRT,DOS,UTILITY1,UTLZSTAGE,SINSTEP,BUILDVAR;

{***********************************************************}
{ math coprocessor support }

{$IFOPT N+}
      {$DEFINE COP}
   {$ELSE}
      {$UNDEF COP}

PATENT
188/189

```
      {$ENDIF}
    type
      {$IFDEF COP}
      FloatType = Single;
      {$ELSE}
      FloatType = Real;
      {$ENDIF}

{$I product.inc}
    const
      { MaxPlungeMoves  = 3000; }{ for the silver screw } { Now in
    product.inc. }
      { MaxPlungeMoves  = 2800;   for the gold screw    }
        defaultPeriod          = 3; { seconds per sweep }
        minplungemoves         = 1;

minPeriod              = 0.1;
        maxPeriod              = 10;

Bits: array[0..3] of Byte = ($09,$0A,$06,$05);

var
    { global variables}
    NoSweep         : boolean;

PlungerPos                     : longint;  { Made longint from
    integer for 500. }
``` jo/2506 57

```
          MachineType              : string;
          MaxBladeMoves            : integer;
          DefaultPlungerStepsPerMil : real;

          { file contents }
          NumSweeps                : integer;
          Period                   : array[1..7] of FloatType;
          BladeGap                 : array[1..7] of integer;
          Bias                     : integer;
          PlungeMotorDelay         : integer;
          PlungStart               : FloatType; { not used }
          UpLim                    : integer;
          LowLim                   : integer;
          BladeGapL0               : FloatType;
          PostDipDelay             : integer;
          NumChecks                : integer;
          PD2                      : integer;
          XP                       : FloatType;
          SHOWSWEEP                : boolean;
          ProcessSpeedM            : Real ;

{*****************************************************}
          procedure ReadSWEEPxPRMfile;
          procedure ReadMACHINExPRMfile;
          procedure WriteMACHINExPRMfile;
          procedure SweeperBack(period : real; StopCode : integer);
          procedure SweeperForward(period: real; StopCode : integer);
          procedure MoveBlade(period: real; StopCode:integer);
```

PATENT
188/189

```
        procedure PlungerHoldingTorque; {Use after any plunger move of 1}
        procedure PlungerDown(numMoves : longint; var StopCode :
        integer);
        procedure PlungerUp(numMoves : longint; var StopCode : integer);
        procedure InitSweeperandPlunger(option:integer;var StopCode :
        integer);
        procedure InitSweeper(option:integer;var StopCode : integer);
        procedure ReadBiCell(recurs:char;var FinalLevel:integer);
        procedure WhichBladeLimit(var LimitSwitch: integer);
        { procedure AddRemoveResin(var FinalLevel: integer); }
        procedure SetPlunger(numSetPlungers:integer;var
        FinalLevel:integer );
        procedure DoSweep(DipDepth,LayerDepth:real;
        RelaxationTime:integer);
        procedure expSweeperBack(speed:real);
        procedure expSweeperForward(speed:real);
        procedure expMoveBlade(period:real);
        procedure SweepCal;

     {*****************************************************}
     implementation const
         LnSteps: array[1..60] of Integer =
     (400,200,100,060,50,45,40,35,30,25,20,18,16,14,12,10,10,8,8,8,8,6
     ,6,6,5,5,5,4,4,4,4,4,3,3,3,2,2,2,2,2,1,1,1,1,1,1,1,1,1,1,1,1,0,0,
     0,0,0,0,0,0);

SwepCoil = $309;
``` jo/2506

```
        SweepLim = $308;

defaultBladeGap        = 100;  { percent }
        defaultBias            = 0;
        defaultPlungeMotorDelay = 8;
        defaultPlungStart      = 3.5; { inches - not used now }
        defaultUpLim           = 5;
        defaultLowLim          = -5;
        defaultBladeGapL0      = 0.125;  { inches between liquid
    and blade }
        defaultPostDipDelay    = 3;     { seconds }
        defaultNumChecks       = -1;    { automatic mode }
        defaultPD2             = 2;
        defaultDA              = '0.8';
        defaultDV              = '0.8';
        defaultXP              = '0.0';

SweepDist              = 12.1;

    var
        StepIter : integer;
        SweepStep : integer;
        PlungeStep : integer;
        delaytime  : integer;
        junk1,junksc : integer;
        junkKey     : char;

{*********************************************************}
    procedure SweepDefaults;
```

PATENT
188/189

```
      var
          i, code : integer;
      begin
          NumSweeps       := 1;
          for i := 1 to 7 do begin
              Period[i]   := defaultPeriod;
              BladeGap[i] := defaultBladeGap;
          end;
          Bias            := defaultBias;
          PlungeMotorDelay := defaultPlungeMotorDelay;
          PlungStart      := defaultPlungStart;
          UpLim           := Bias + defaultUpLim;
          LowLim          := Bias + defaultLowLim;
          BladeGapL0      := defaultBladeGapL0 * 25.4; { convert to
      mm }
          PostDipDelay    := defaultPostDipDelay;
          NumChecks       := defaultNumChecks;  { automatic mode }
          PD2             := defaultPD2;
          DrainAccel      := defaultDA;
          DrainVeloc      := defaultDV;
          XP              := RealVal(defaultXP,code);
          ShowSweep       := false;
      end;
      {*******************************************************}
      procedure ReadSWEEPxPRMfile;
      const
          anyfile      = $3F;
      var
          SweepFile : Text;
``` jo/2506                        61

```
            Line     : String;
            i,jj,kk,index : integer;
            DirInfo          : searchRec;

5     begin
              If ShowSweep then writeln ('   Reading machine.prm
          file. ');
              FindFirst('\3dsys\Machine.PRM',anyfile,DirInfo);
              if DosError <> 0 then begin
 10               window(1,1,80,25);
                  ClrScr;
                  gotoxy(1,21);
                  writeln;
                  writeln('   ERROR: Machine.PRM not found.   ');
 15               UserWait;
                  Halt(1);
              end;
      {------------------------------------------------------------}
              assign(SweepFile,'\3dsys\Machine.prm');
 20         reset(SweepFile);
            i := 0;
            repeat
                readln(sweepFile,line)
            until line = 'SWEEP.PRM';
            while (Not Eof(SweepFile)) and (i <= 27) do begin
                readln(SweepFile,line);
                if line[1] <> '!' then inc(i);
                if i = 1 then begin
                    NumSweeps := IntVal(copy(line,1,pos('!',line)-1),jj);
```

PATENT
188/189

```
              end;
           if (i >= 2) and (i <= 15) then begin
              if (i mod 2) = 0
              then Period[i div
     2]:=RealVal(copy(line,1,pos('!',line)-1),jj)
              else BladeGap[i div
     2]:=round(RealVal(copy(line,1,pos('!',line)-1),jj));
                 {} { BladeGap[i div 2]:=(1/1000) * (25.4) * BladeGap[i
     div 2]; }
                      { covert mils to mm }
              if (BladeGap[i div 2] <= 0)
              then BladeGap[i div 2] := 0;
              if (BladeGap[i div 2] > 999)
              then BladeGap[i div 2] := 999;
           end;
           case i of
              16 :  Bias := IntVal(copy(line,1,pos('!',line)-1),jj);
              17 :  PlungeMotorDelay :=
     IntVal(copy(line,1,pos('!',line)-1),jj);
              18 :  PlungStart :=
     RealVal(copy(line,1,pos('!',line)-1),jj);
              19 :  UpLim := IntVal(copy(line,1,pos('!',line)-1),jj);
              20 :  LowLim := IntVal(copy(line,1,pos('!',line)-1),jj);
              21 :  BladeGapL0 :=
     (25.4)*RealVal(copy(line,1,pos('!',line)-1),jj);
                             { convert inches to mm }
     {}{       22 :  postDipDelay :=
     IntVal(copy(line,1,pos('!',line)-1),jj); }
``` jo/2506                        63

```
            22 :  NumChecks :=
    IntVal(copy(line,1,pos('!',line)-1),jj);
    {}{       24 :  PD2         :=
    IntVal(copy(line,1,pos('!',line)-1),jj); }
            23 :  DrainAccel:= copy(line,1,pos(' ',line)-1);
            24 :  DrainVeloc:= copy(line,1,pos(' ',line)-1);
            25 :  XP          :=
    RealVal(copy(line,1,pos('!',line)-1),jj);
            26 :  ShowSweep := ( upcase(line[1]) = 'S' );
        end;
      end;
      Close(SweepFile);
      for i := 1 to 7 do begin
        if (Period[i] > maxSweepPeriod) then Period[i] :=
    maxSweepPeriod;
        if (Period[i] < minSweepPeriod) then Period[i] :=
    minSweepPeriod;
      end;
      UpLim         := Bias + UpLim;
      LowLim        := Bias + LowLim;
      if showsweep then begin
        writeln('Here are the gap percentages--');
        for i := 1 to 7 do writeln('Gap',i,' is ',BladeGap[i]);
      end;
      ZSafeSweep := ZBladeLevel + 0.060 {warp tolerance + 10 mils}
    + XP;
    end;

{*****************************************************}
    jo/2506                          64
```

PATENT
188/189

```
      procedure ReadMACHINExPRMfile;
      const
           anyfile      = $3F;
      var
           SweepFile : Text;
           Line  : String;
           i,jj,kk,index  : integer;
           DirInfo       : searchRec;

      begin
           If ShowSweep then writeln ('   Reading MACHINE.PRM
      file. ');
           FindFirst('\3dsys\Machine.PRM',anyfile,DirInfo);
           if DosError <> 0 then begin
15              window(1,1,80,25);
                ClrScr;
                gotoxy(1,21);
                writeln;
                writeln('   ERROR: Machine.prm not found.    ');
20              UserWait;
                Halt(1);
           end;
      {--------------------------------------------------}
           assign(SweepFile,'\3dsys\Machine.prm');
25         reset(SweepFile);
           i := 0;
           repeat
               readln(SweepFile,line)
           until line = 'MACHINE.PRM';
``` jo/2506

```
          while (Not Eof(SweepFile)) and (i < 3) do begin
             readln(SweepFile,line);
             if line[1] <> '!' then inc(i);
             case i of
               1 :  begin
                       MachineType    := copy(line,1,7);
                       ProcessSpeedM := RealVal(copy(line, 8, 8), jj) ;
                    end ;
                2 :  MaxBladeMoves :=
     IntVal(copy(line,1,pos('!',line)-1),jj);
                3 :  DefaultPlungerStepsPerMil :=
     RealVal(copy(line,1,pos('!',line)-1),jj);
             end;
          end;
          close(sweepFile);
       end;

{****************************************************}
       procedure WriteMACHINExPRMfile;
20     const
          ParamFileName = '\3DSYS\MACHINE.XYZ';
          NewName       = '\3DSYS\MACHINE.PRM';

var
25        IOerr,i,m,n,valcode : integer;
          j : longint;
          r : real;
          ParamFileLine, AppendText : str80;
```

PATENT
188/189

```
        ParamFile,NewFile: text;
        DirInfo           : SearchRec;
        InputLine         : string;

     begin
        OpenParamFile := ParamFileName;

assign(ParamFile,OpenParamFile);
        rewrite(ParamFile);
10      assign(NewFile,NewName);
        reset(NewFile);
        while not eof(NewFile) do begin
            readln(NewFile,InputLine);
            writeln(ParamFile,InputLine);
15      end;
        rewrite(NewFile);

IOerr := IOresult;
        if IOerr <> 0 then begin
            OpenParamFile := ParamFileName;
            assign(ParamFile,OpenParamFile);
            reset(ParamFile);
            IOerr := IOresult;
            if IOerr <> 0 then OpenParamFile := ' '
        end; {IO error}
        if IOerr = 0 then begin
            i := 0;
            reset(ParamFile);
            repeat
``` jo/2506                            67

PATENT
188/189

```
            readln(paramFile,paramFileLine);
            writeln(newFile,paramFileLine);
         until paramFileLine = 'MACHINE.PRM';
         readln(paramFile,paramFileLine);
         while (paramFileLine[1] = ' ') or (paramFileLine[1] = '!')
      do
         begin
            writeln(newFile,paramFileLine);
            readln(paramFile,paramFileLine);
         end;
         writeln(newFile,paramFileLine);   { This is the machine
      model #. }
         Str(MaxBladeMoves,paramFileLine);
         writeln(newFile,paramFileLine+'    !  Maximum blade steps
      to cross vat');
         readln(paramFile);   { We just wrote a new val here so
      throw old away. }
         while not eof(paramFile) do
         begin
            readln(paramFile,paramFileLine);
            writeln(newFile,paramFileLine);
         end;
      end;
      close(NewFile);
      close(ParamFile);
   end;

{****************************************************}
   procedure RotateStep(DirStep: Integer;var InputByte: Integer);
``` jo/2506                              68

```
    begin
      StepIter  := ((StepIter + DirStep) + 4) mod 4;
      InputByte := Bits[StepIter];
    end;

{*******************************************************}
    procedure BenDelay(del:integer);
    var
      x :integer;
      i :integer;
      j :integer;
    begin
    X := 0;
    j := 0;
      repeat
         INC(X);
         for i := 1 to 10 do inc(j); { 100 us }
      until X>= del;
    end;

{*******************************************************}
    function SweeperParameter(period : real): real;
    { Feed this the desired period and it will return the appropriate
    parameter }
    { to sweep at that period.  You then feed that # to the
    appropriate         }
    { sweeper moving procedure.
             }
    var
```

PATENT
188/189

```
        RoundPeriod : integer;
        sweeperParam : real;
    begin
        RoundPeriod := round(period);
        if RoundPeriod < minSweepPeriod then RoundPeriod :=
    minSweepPeriod;
        if RoundPeriod > maxSweepPeriod then RoundPeriod :=
    maxSweepPeriod;

        (* check for the machine type so the appropiate *)
        (* Parameter Value for the blade sweep is assigned *)
        if ((ProcessSpeedM * 10) < 1) then
            (* WYSE 286 values *)
            case RoundPeriod of
                1 : sweeperParam := period1Param;    { SquareMoves
    start here. }
                2 : sweeperParam := period2Param;
                3 : sweeperParam := period3Param;
                4 : sweeperParam := period4Param;
                5 : sweeperParam := period5Param;
                6 : sweeperParam := period6Param;
                7 : sweeperParam := period7Param;    { SineMoves start
    here. }
                8 : sweeperParam := period8Param;
                9 : sweeperParam := period9Param;
               10 : sweeperParam := period10Param;
               11 : sweeperParam := period11Param;
               12 : sweeperParam := period12Param;
               13 : sweeperParam := period13Param;
``` jo/2506                              70

```
              14 : sweeperParam := period14Param;
              15 : sweeperParam := period15Param;
              16 : sweeperParam := period16Param;
              else
         begin
              if (RoundPeriod > 16) and (RoundPeriod < 21)
              then sweeperParam := period16Param - ((RoundPeriod -
         16) * ((period16Param-period21Param)/4));
              if (RoundPeriod > 20) and (RoundPeriod < 31)
              then sweeperParam := period21Param - ((RoundPeriod -
         20) * ((period21Param-period30Param)/10));
              end;
         end
    else (* NCR 386 VALUES *)
         (* all NCR 386 values are sine moves *)
         case RoundPeriod of
              1 : sweeperParam := 1.2 ;     2 : sweeperParam := 1.2 ;
              3 : sweeperParam := 1.2 ;     4 : sweeperParam := 0.8 ;
              5 : sweeperParam := 0.6 ;     6 : sweeperParam := 0.5 ;
              7 : sweeperParam := 0.4 ;     8 : sweeperParam := 0.35 ;
              9 : sweeperParam := 0.31 ;   10 : sweeperParam := 0.26 ;
             11 : sweeperParam := 0.245 ;  12 : sweeperParam := 0.22 ;
             13 : sweeperParam := 0.205 ;  14 : sweeperParam := 0.19 ;
             15 : sweeperParam := 0.18 ;   16 : sweeperParam := 0.16 ;
             17 : sweeperParam := 0.152 ;  18 : sweeperParam :=0.1375;
             19 : sweeperParam := 0.135 ;  20 : sweeperParam := 0.13 ;
             21 : sweeperParam := 0.12 ;   22 : sweeperParam :=0.115 ;
             23 : sweeperParam := 0.11 ;   24 : sweeperParam :=0.105 ;
             25 : sweeperParam := 0.1 ;    26 : sweeperParam :=0.097 ;
```

```
                27 : sweeperParam := 0.0935 ; 28 : sweeperParam := 0.09 ;
                29 : sweeperParam := 0.087 ;  30 : sweeperParam :=0.085 ;
            end (* case NCR 386 *) ;

        SweeperParameter := sweeperParam;
    end;
    {*****************************************************}
    function SweeperSqrVelocity(vel:real):real;
    { Converts a velocity in inches per second to the sweepers
    private units.  Smaller trueVels correspond to greater
    velocities.                                                         }
    { This function is no longer used.                                   } var
        trueVel : real;
    begin
            if vel <= 1 then trueVel := 76
            else if vel <= 2  then trueVel := (vel - 1) * (36-76) + 76
            else if vel <= 3  then trueVel := (vel - 2) * (23-36) + 36
20          else if vel <= 4  then trueVel := (vel - 3) * (17-23) + 23
            else if vel <= 5  then trueVel := (vel - 4) * (12-17) + 17
            else if vel <= 6  then trueVel := (vel - 5) * (10-12) + 12
            else if vel <= 7  then trueVel := (vel - 6) * (9-10)  + 10
            else if vel <= 8  then trueVel := (vel - 7) * (7-9)   +  9
            else if vel <= 9  then trueVel := (vel - 8) * (6-7)   +  7
            else if vel <= 10 then trueVel := (vel - 9) * (6-7)   +  7
            else trueVel := 5;
            SweeperSqrVelocity := truevel;
    end;
```

```
{*****************************************************}
procedure SweeperBack(period : real; StopCode : integer);
{ StopCode 0 = normal return ( could be the limit )
          1 = abnormal - limit hit before completed move
( ZStage )
          2 = abnormal - keypressed
          3 = stall }
var
  i : integer;
  key : char;
  speed : real;
begin
  speed := SweeperParameter(period); {speed holds a raw parameter
now}
  if period < MinSafeSinePeriod then begin
    delaytime  := trunc(speed);
    if (ZStagePos < ZSafeSweep) then exit;
    port[Sweeplim] := $FF;
    i := 0;
    if ShowSweep then writeln('   SWEEPER BACK   ');
    repeat
        if (port[SweepLim] and $40) <> $40 then begin
          port[SwepCoil] := $00;
          BladePos := MaxBladeMoves;
          StopCode   := 0;
          exit; { hit limit switch }
        end;
```

```
        inc(BladePos);
        if i <= 59 then inc(i)                    { ramp up   }
        else if BladePos > (MaxBladeMoves - 60)   { ramp down }
            then i := MaxBladeMoves - BladePos + 1;

rotatestep(1,Sweepstep);
        port[Swepcoil] := {(port[Swepcoil] and $F3) or} (sweepstep
    and $0F);
        BenDelay(delaytime + LnSteps[i]);
    until {(keypressed) or } (BladePos >= MaxBladeMoves);
    port[SwepCoil] := $00;
    {   if keypressed then begin
            key := Readkey;
            StopCode := 2;
        end; }
        if BladePos >= MaxBladeMoves then begin
            if ShowSweep then writeln(' *** ERROR : STALL in Sweeper
    Back ');
            delay(1000);
            beep;
            BladePos := MaxBladeMoves;
            StopCode := 3;
        end;
    end
    else sinemove(MaxBladeMoves,speed,'r','r',stopcode);
end;

{*****************************************************}
procedure SweeperForward(period : real; StopCode : integer);

jo/2506                         74
```

```
    var
        i : integer;
        key : char;
        speed : real;
5   begin
        speed := SweeperParameter(period); {speed holds a raw parameter
    now}
        if period < MinSafeSinePeriod then begin
            delaytime := trunc(speed);
10      if (ZStagePos < ZSafeSweep) then exit;
        port[Sweeplim] := $FF;
        i := 0;
        if ShowSweep then writeln('    SWEEPER FORWARD    ');
        repeat
            if (port[SweepLim] and $20) <> $20 then begin
                port[SwepCoil] := $00;
                BladePos := 0;
                StopCode := 0;
                exit;   { home limit switch }
            end;
            dec(BladePos);
            if i <= 59 then inc(i)                  { ramp up  }
            else if BladePos < 60   { ramp down }
                then i := BladePos + 1;
            rotatestep(-1,sweepstep);
            port[Swepcoil] := {(port[Swepcoil] and $F3) or }(sweepstep
    and $0F);
            BenDelay(delaytime + LnSteps[i]);
        until {(keypressed) or } (BladePos <= 0);
```

```
        port[SwepCoil] := $00;
   {   if keypressed then begin
         key := Readkey;
         StopCode := 2;
       end; }
       if BladePos <= 0  then begin
          if ShowSweep then writeln(' *** ERROR : STALL in Sweeper
    Forward ');
          BladePos := 0;
10        StopCode := 3;
          beep;
          delay(1000);
       end;

     end
     else sinemove(MaxBladeMoves,speed,'r','l',stopcode); { We should
    never reach }
                                    { this point.           }
     end;

{*****************************************************}
   procedure MoveBlade(period : real; StopCode:integer);
   var
       RoundPeriod : integer;
       sweeperParam : real;
   begin
      { Determine machine type. }
      if ( ProcessSpeedM * 10 ) >= 1 then
      { NCR 920 } {Too cool! JFT}
```

```
        begin
            if BladePos <> 0 then expsinemove( MaxBladeMoves ,
        SweeperParameter( period ) , 'r' )
                           else expsinemove( MaxBladeMoves ,
        SweeperParameter( period ) , 'l' );
            end else begin
            { Wyse 286 }
                if period >= MinSafeSinePeriod
                    then if BladePos <> 0 then
        expsinemove(MaxBladeMoves,SweeperParameter(period),'r')
                         else
        expsinemove(MaxBladeMoves,SweeperParameter(period),'l')
                    else if BladePos <> 0 then
        sweeperforward(period,StopCode)
                         else sweeperback(period,StopCode);
            end;
        end;

{*******************************************************}
        procedure PlungerHoldingTorque;
        begin
            if StepIter >= $09
            then port[SwepCoil] := ( $08 * 16 and $F0 )
            else port[SwepCoil] := ( $04 * 16 and $F0 );
        end;
        {*******************************************************}
        procedure PlungerDown(numMoves : longint; var StopCode :
        integer);
        {*** numMoves of 0 means go to Plunger limit ***}
```

```
      var
         i,j,k : integer;
         m : longint;   {} { Changed from integer to accommodate
      SLA-500. }
      begin
         if PlungerPos >= MaxPlungeMoves then exit;
         if numMoves <> 1 then
      Read3DStateFile(ZStagePos,PlungerPos,JunkSC);
         if ShowSweep then writeln('   MOVING PLUNGER DOWN - setting
      level.');
         if numMoves = 0 then m := MaxPlungeMoves else m := numMoves;
         k := 1;
         port[SwepCoil] := ( plungeStep * 16 and $F0 );
         repeat
            inc(k);
            for j := 1 to minplungemoves do begin
               rotatestep(1,plungestep);
               port[Swepcoil] := {(port[Swepcoil] and $F0) or}
      (plungestep*16 and $F0);
               delay(PlungeMotorDelay);
            end;
            inc(PlungerPos);
         until (k >= m) or (PlungerPos >= MaxPlungeMoves);
         if numMoves <> 1 then PlungerHoldingTorque;
      {   if numMoves <> 1 then }
      Update3DStateFile(ZStagePos,PlungerPos,JunkSC);
      end;

{*****************************************************}
```

```
procedure PlungerUp(numMoves : longint; var StopCode : integer);
{*** numMoves of 0 means go to Plunger limit ***}
var
    i,j,k : integer;
    m : longint;
    HitLimit : boolean;
begin
    HitLimit := false;
    PlungerStalled := false;
    { If moving up full stroke, set the plunger position to twice
        MaxPlungeMoves give greater assurance that the plunger
reaches the top. }
    StopCode := 1;   { Default to stall, set to 0 when we hit
switch. }
    if PlungerPos <= 0 then exit;
    if numMoves <>1 then
Read3DStateFile(ZStagePos,PlungerPos,JunkSC);
    if numMoves = 0 then PlungerPos := 2 * MaxPlungeMoves;
    if ShowSweep then writeln('   MOVING PLUNGER UP    - setting
level.');
    if numMoves = 0 then m := 2 * MaxPlungeMoves else m :=
numMoves;
    k := 1;
    port[SwepCoil] := ( plungeStep * 16 and $F0 );
    repeat
        inc(k);
        for j := 1 to minplungemoves do begin
                rotatestep(-1,plungestep);
```

```
                    port[Swepcoil] := {(port[Swepcoil] and $F0) or
         }(plungestep*16 and $F0);
                    delay(PlungeMotorDelay);
               end;
           dec(PlungerPos);
           if (port[SweepLim] and $80) <> $80 then begin
               port[SwepCoil] := $00;
               PlungerPos := 0;
               StopCode   := 0;
               HitLimit := true;
               { Update3DStateFile OK for numMoves = 1 }
               Update3DStateFile(ZStagePos,PlungerPos,JunkSC);
               exit;  { plunger top limit switch }
           end;
        until (k >= m) or ( PlungerPos <= 0);
        if numMoves <> 1 then PlungerHoldingTorque;
        { If this was a full-stroke move, check to see if we hit the
        limit switch.  If we didn't, then display that situation
        according to OpMode. }
        if numMoves = 0 then begin
            if not HitLimit then PlungerStalled := true;
        end;
        {   if numMoves <> 1 then }
        Update3DStateFile(ZStagePos,PlungerPos,JunkSC);
     end;

{*******************************************************} procedure ReadBiCell(recurs:char;var FinalLevel:integer);
```

```
{***   recurs = R = recursive readings to check validity
                N = non-recursive reading
                S = average of 5 simple straight bi-cell values
       with no validity checks ***}
  const
      LevelReading = 128;
  var
      b,i,j,count,k,newlevel,sum,stopcode : integer;
      junkstr,sign : string;
  begin
      count := 1;
      if Recurs = 'S' then count := 5;
      sum := 0;
      for k := 1 to count do begin
          port[780] := 12;     { addr ADC port = 780 has 16 channels,
  use 5 }
          for i := 1 to 100 do inc(j); { 10 us }  .
          i := 0;
          repeat
              inc(i);
              b := port[$310];
              newLevel := port[$30C];
          until (b<128) or (i>2000); {re-repeat this loop}
          NewLevel := NewLevel - LevelReading;
          FinalLevel := NewLevel;
          sum := sum + FinalLevel;
          if ShowSweep then begin
  {}           {writeln('        NewLevel =',NewLevel,'                ');}
               clrscr;
```

```
            if NewLevel > 0 then sign := '-' else sign := '+';
            junkstr := concat('New level =
       ',sign,intstr(abs(NewLevel)));
            centertext(junkstr,1);
            delay(100);
          end;
        end; { for 1 to count }
          if (ShowSweep) and ( count > 1) then begin
            if sum > 0 then FinalLevel := trunc((sum / count)+0.5)
                        else FinalLevel := trunc((sum / count)-0.5);
{}         {  writeln('    AveLevel =',FinalLevel,'        ');}
            if NewLevel > 0 then sign := '-' else sign := '+';
            junkstr := concat('New level =
       ',sign,intstr(abs(NewLevel)));
            centertext(junkstr,1);
            delay(200);
          end;
          if (Recurs = 'S') then exit;
          if (NewLevel = BIAS) and (Recurs = 'R') then begin
             { test for laser blocked or off bi-cell }
            PlungerUp(20,StopCode);
            ReadBiCell('N',NewLevel);
            if NewLevel = BIAS then begin
               PlungerDown(40,StopCode);
               ReadBiCell('N',NewLevel);
               if NewLevel = BIAS then begin
                  centertext('ERROR : Laser Beam is blocked or off
       Bi-Cell.',1);
                  UserWait;
```

```
                    Halt(1);
                end;
            PlungerUp(40,StopCode);
        end;
    PlungerDown(20,StopCode);
    end; { NewLevel = BIAS }
end;    { ReadBiCell       }

{*****************************************************} procedure WhichBladeLimit(var LimitSwitch: integer);
{ 1 = front, 2 = back, 3 = neither }
begin
    if (port[SweepLim] and $20) <> $20 then begin
        port[SwepCoil] := $00;
        LimitSwitch:= 1;
        BladePos    := 0;
        exit;   { home limit switch }
    end;
    if (port[SweepLim] and $40) <> $40 then begin
        port[SwepCoil] := $00;
        LimitSwitch:= 2;
        BladePos    := MaxBladeMoves;
        exit;    { back limit switch }
    end;
    LimitSwitch := 3;
end;
{*****************************************************}
procedure InitSweeperandPlunger(option:integer;
```

```
                                            var StopCode : integer);
     var
        wastekey : char;
        kk : integer;
     begin port[$30B] := $98;    { init 8255 }
        port[$30B] := $98;    {control port}
        port[Swepcoil] := 0;     {8255 port C}
10      port[Sweeplim] := 0;     {8255 port B}
        delay(1);

WhichBladeLimit(kk);  { this sets BladePos }
        if kk = 3 then begin
           beep;
           writeln;
           Centerln(' CAUTION:  Sweeper blade not in home position.');
           Centerln(' You may manually reposition the blade at front
     of vat. ');
           userwait;
           delay(1);
           {}{}kk:=-1234;
           WhichBladeLimit(kk);
           {}{}Window(1,1,80,25);
           {}{}Writeln(kk);
           if kk = 3 then begin
              gotoxy(1,1);
              DrawBox(3,7,73,14,2);
              repeat delay(100) until keypressed;
```

PATENT
188/189

```
            junkkey := readkey;
            CursorOn;
            Halt(1);
         end;
      end;
      PlungerPos := MaxPlungeMoves +150;   { Pad it so we KNOW it
   goes to limit }
      PlungerUp(0,StopCode);
      PlungerDown((MaxPlungeMoves div 2),StopCode);
      PlungerPos := MaxPlungeMoves div 2;
      if ShowSweep then begin
         writeln('   SWEEPER, PLUNGER, AND ZSTAGE INITIALIZED   ');
         delay(800);
      end;
      if keypressed then wastekey := ReadKey;
   end;

{*************************************************} procedure InitSweeper(option:integer;
                                      var StopCode : integer);
   var
      wastekey : char;
      kk : integer;
   begin
25
      port[$30B] := $98;   { init 8255 }
      port[$30B] := $98;   {control port}
      port[Swepcoil] := 0;   {8255 port C}
``` jo/2506

PATENT
188/189

```
        port[Sweeplim] := 0;    {8255 port B}
        delay(1);

WhichBladeLimit(kk); { this sets BladePos }
        if kk = 3 then begin
            beep;
            writeln;
            Centerln(' Sweeper blade not in home position, program
        aborting. ');
            Centerln(' You may manually reposition the blade at front
        of vat. ');
            userwait;
            if (port[SweepLim] and $20) <> $20 then begin
                port[Sweeplim] := $00;
            end else begin
                gotoxy(1,1);
                DrawBox(3,7,73,14,2);
                repeat delay(100) until keypressed;
                junkkey := readkey;
                CursorOn;
                Halt(1);
            end;
        end;
    end;
    {*****************************************************}
    procedure LiquidStableDelay;
    { Take bicell readings until the difference between readings is
    within epsilon a specified number of times in a row.  }
    const
```

```
            NumOfODeltaReadsNeeded      = 5;
            deltaEpsilon               = 3;
        var
            level,oldlevel      : integer;
  5         numOfODeltaReads    : integer;
        begin
            numOfODeltaReads := 0;
            ReadBiCell('S',level);
            ReadBiCell('S',oldlevel);
            while (abs(level - oldlevel) > deltaEpsilon) and
        (NumOfODeltaReads < NumOfODeltaReadsNeeded) do
            begin
                ReadBiCell('S',level);
                ReadBiCell('S',oldlevel);
                if abs(level - oldLevel) <= deltaEpsilon then
        inc(NumOfODeltaReads);
            end;
        end;
        {*****************************************************}

       procedure SetPlunger(numSetPlungers:integer;var
        FinalLevel:integer );
        var
            level,oldlevel, timesthru,stopcode : integer;
            OKfirstTry          : boolean;
            zPos                : real;
            pPos                : longint;
            junksc              : integer;
        begin { SetPlunger }
```

PATENT
188/189

```
      (*  {****************}
          if PMWriteFlag then begin
              Read3DStateFile(zPos,pPos,junksc);
              ReadBiCell('N',level);
              Append(PMWriteFile);
              Writeln(PMWriteFile,zPos:2:6,' : ', pPos:1,' : ', level:1,
      '  SetPlunger commences...');
              Close(PMWriteFile);
          end;
      {****************}  *)
          OKfirstTry := false;
          TimesThru := 0;
          if ShowSweep then begin
              if NumSetPlungers = -1 then writeln('AUTOMATIC MODE')
              else writeln('Number of Level Checks=',numSetPlungers);
          end;
      {}  ReadBiCell('N',level);
      {}  if (level < Uplim) and (level > lowlim) then begin
              if ShowSweep then writeln('Bi-cell level OK first time
      through SetPlunger.');
      (*  {****************}
          if PMWriteFlag then begin
              Read3DStateFile(zPos,pPos,junksc);
              ReadBiCell('N',level);
              Append(PMWriteFile);
              Writeln(PMWriteFile,zPos:2:6,' : ', pPos:1,' : ',
      level:1, '  SetPlunger completed.');
              Close(PMWriteFile);
          end;
``` jo/2506                           88

```
                  {****************}  *)
                     exit;
                  end;
                  if NumSetPlungers = -1 then NumSetPlungers := 25;
           repeat
                  if ShowSweep then writeln('READING BI-CELL');
                  ReadBiCell('N',level);
                  if (NumSetPlungers = 25) and (TimesThru>=1) and
                     (Level<=UpLim) and (Level>=LowLim) then OKfirstTry:=
           true;

(*    if TimesThru = 0 then begin
                  { do a validity test here -- }
                  oldlevel := level;
                  PlungerUp(20,StopCode);
                  ReadBiCell('N',level);
                  if level = oldlevel then begin
                     PlungerDown(40,StopCode);
                     ReadBiCell('N',level);
                     if ( level = oldlevel ) and ( level = bias ) then begin
                        writeln;
                        writeln('ERROR : Laser Beam is not within a usable
           bi-cell range.');
                        writeln;
                        UserWait;
                        {  AddRemoveResin(level); } Halt(1);
                     end;
                  end else PlungerDown(20,StopCode);
                end;   { TimesThru = 0 } *)
```

```
            if level > UpLim then begin
               repeat
                   PlungerDown(1,StopCode);
                   ReadBiCell('N',level);
               until level < UpLim;
            end;
            if level < LowLim then begin
               repeat
                   PlungerUp(1,StopCode);
                   ReadBiCell('N',level);
               until level > LowLim;
            end;
            { the state file is not updated in Plunger moves of 1
         case... }
            Update3DStateFile(ZStagePos,PlungerPos,StopCode);
            inc(TimesThru);
            LiquidStableDelay;
         {}(*  {}  delay(PD2 * 1000); *)
         {  if not((TimesThru > NumSetPlungers) or OKfirstTry)
            then delay(PD2*1000); }
         until (TimesThru > NumSetPlungers) or OKfirstTry;
         if ShowSweep then writeln ('   FINAL LEVEL =',FinalLevel);
      (* {****************}
         if PMWriteFlag then begin
            Read3DStateFile(zPos,pPos,junksc);
            ReadBiCell('N',level);
            Append(PMWriteFile);
```

```
        Writeln(PMWriteFile,zPos:2:6,' : ', pPos:1,' : ', level:1,
    ' SetPlunger completed.');
        Close(PMWriteFile);
      end;
    {****************}  *)
      PlungerHoldingTorque;
    end;  { SetPlunger }

{****************************************************}
    procedure OneSweep(index:integer;DipDepth,LayerDepth:real);
    var
        stopcode : integer;
        currentZPos : real;
        junkPlungerPos : longint;
    begin
        Read3DStateFile(currentZPos, junkPlungerPos, stopcode);
        (*if currentZPos > 0 then DipDepth := 8 else DipDepth := 6;*)
        if index = 1
        then begin
            if ShowSweep then writeln('   ZMove =',(-(-DipDepth -
    BladeGapL0
                   + (LayerDepth * BladeGap[index]/100))
    /25.4):7:3);
            ZMoveGivenDistance(ZAccel,ZVeloc,-(-DipDepth - BladeGapL0 +
                (LayerDepth * BladeGap[index]/100))/25.4 {conv. to
    inches})
        end else begin
            if ShowSweep then writeln('   ZMove =',(-((LayerDepth *
    BladeGap[index]/100)-
```

```
                        (LayerDepth *
    BladeGap[index-1]/100))/25.4):7:3);
           ZMoveGivenDistance(ZAccel,ZVeloc,-((LayerDepth *
    BladeGap[index]/100)-
                                (LayerDepth *
    BladeGap[index-1]/100))/25.4);
       end;
       MoveBlade(Period[index],StopCode);
    end;

{*********************************************}
    procedure DoSweep(DipDepth,LayerDepth:real;
    RelaxationTime:integer);
    var
       level,oldlevel,isweep,StopCode : integer;
       currentZPos : real;
       junkPlungerPos : longint;
    begin
       Read3DStateFile(currentZPos, junkPlungerPos, stopcode);
       (*if currentZPos > 0 then DipDepth := 8 else DipDepth := 6;*)
    { ZW=RelaxationTime in seconds // ZD=DipDepth in mm
       ZV=ZtableVeloc // ZA := ZtableAccel //  Next Layer Thickness =
    LayerDepth  }

       if ShowSweep then begin
           writeln('   Layer Thickness(mm)=',LayerDepth:5:3, (mils)=',(LayerDepth*1000/25.4):5:3);
           writeln('   ZMove =',(-DipDepth/25.4):7:3,' inches ');
```

```
            writeln('        =',-DipDepth:7:3,' mm ');
        end;

{ Move down ZD, DipDepth. }

ZMoveGivenDistance(ZAccel,ZVeloc,-DipDepth/25.4);
        { wait PD }

Delay(3500);

LiquidStableDelay;

(* delay(postDipDelay*1000); *)

if (numchecks <> 0) and (not demoFlag) then
        SetPlunger(numChecks,level);

if showsweep then begin
            writeln('ZstagePos=',ZstagePos:7:2);
            writeln('BladeGapL0/25.4=',(BladeGapL0/25.4):7:2);
            writeln('DipDepth (mils)=',(DipDepth/25.4):7:3);
            writeln('LayerDepth (mils)=',(LayerDepth/25.4):7:3);
            writeln('1-2-3+4=',( ZStagePos - (BladeGapL0/25.4) -
        (DipDepth/25.4)
               + (LayerDepth/25.4) ):7:3);
            writeln('ZSafeSweep=',ZSafeSweep:7:3);
            userwait;
        end;

{ no sweep case }
        { Note this criteria does not involve BladeGap[i]. }
        if (numSweeps <= 0) or (( ZStagePos - (BladeGapL0/25.4) -
        (DipDepth/25.4)
            + (LayerDepth/25.4) ) < ZSafeSweep) then begin
            if ShowSweep then writeln('*** Unsafe to sweep.');
```

```
            { Move elevator up to the 'draw next layer' position. }
            if ShowSweep then writeln('    ZMove
       =',(-(LayerDepth-DipDepth)/25.4):7:3);
            ZMoveGivenDistance(ZAccel,ZVeloc,-(LayerDepth-DipDepth)/
        25.4);
            delay(5);
            Delay(RelaxationTime{ZW});
            exit;
         end;

         for isweep := 1 to numSweeps do begin
            OneSweep(isweep,DipDepth,LayerDepth);
         end;
         {Now bring the system to pre-sweep plus part layer thickness.}
         if ShowSweep then writeln('    ZMove
       =',(-(BladeGapL0-(LayerDepth * BladeGap[numSweeps]/100)+
       LayerDepth)/25.4):7:3);
          if not HopNguyen then begin
             if demoFlag then
         ZMoveGivenDistance(ZAccel,ZVeloc,-(BladeGapL0-
                         (LayerDepth * BladeGap[numSweeps]/100) )/25.4)
             else
         ZMoveGivenDistance(ZAccel,ZVeloc,-(BladeGapL0-(LayerDepth *
                         BladeGap[numSweeps]/100)
         +LayerDepth)/25.4);
          end;
          delay(10);
       end;
``` jo/2506                                          94

PATENT
188/189

{*********************************************************}

{*********************************************************}
```
        function expSweeperSqrVelocity(vel:real):real;
        { Converts a velocity in inches per second to the sweepers
        private units.  Smaller trueVels correspond to greater
        velocities.                         } var
            trueVel : real;
        begin
             if vel <= 1 then trueVel := 76
             else if vel <= 2  then trueVel := (vel - 1) * (36-76) + 76
             else if vel <= 3  then trueVel := (vel - 2) * (23-36) + 36
 15          else if vel <= 4  then trueVel := (vel - 3) * (17-23) + 23
             else if vel <= 5  then trueVel := (vel - 4) * (12-17) + 17
             else if vel <= 6  then trueVel := (vel - 5) * (10-12) + 12
             else if vel <= 7  then trueVel := (vel - 6) * (9-10)  + 10
             else if vel <= 8  then trueVel := (vel - 7) * (7-9)   + 11
             else if vel <= 9  then trueVel := (vel - 8) * (6-7)   +  9
             else if vel <= 10 then trueVel := (vel - 9) * (6-7)   +  9
             else trueVel := 5;
             expSweeperSqrVelocity := truevel;
        end;
        procedure expSweeperBack;
        { StopCode 0 = normal return ( could be the limit )
                   1 = abnormal - limit hit before completed move
        ( ZStage )
```

```
                    2 = abnormal - keypressed
                    3 = stall }
        var
           i : integer;
           key : char;
        {}{ speed : real; }
        begin
            delaytime := trunc(speed);
            if (ZStagePos < ZSafeSweep) then exit;
10          port[Sweeplim] := $FF;
            i := 0;
            if ShowSweep then writeln('   SWEEPER BACK   ');
            repeat
                if (port[SweepLim] and $40) <> $40 then begin
                    port[SwepCoil] := $00;
                    BladePos := MaxBladeMoves;
                    exit; { hit limit switch }
                end;
                inc(BladePos);
                if i <= 59 then inc(i)                    { ramp up   }
                else if BladePos > (MaxBladeMoves - 60)   { ramp down }
                     then i := MaxBladeMoves - BladePos + 1;

rotatestep(1,Sweepstep);
                port[Swepcoil] := {(port[Swepcoil] and $F3) or} (sweepstep
        and $0F);
                BenDelay(delaytime + LnSteps[i]);
            until {(keypressed) or } (BladePos >= MaxBladeMoves);
            port[SwepCoil] := $00;
```

```
        {   if keypressed then begin
                key := Readkey;
            end; }
            if BladePos >= MaxBladeMoves then begin
                if ShowSweep then writeln(' *** ERROR : STALL in Sweeper
            Back ');
                delay(1000);
                beep;
                BladePos := MaxBladeMoves;
            end;
        end;

{*****************************************************}
        procedure expSweeperForward;
15      var
            i : integer;
            key : char;
        {}{    speed : real; }
        begin
20          delaytime := trunc(speed);
            if (ZStagePos < ZSafeSweep) then exit;
            port[Sweeplim] := $FF;
            i := 0;
            if ShowSweep then writeln('   SWEEPER FORWARD     ');
            repeat
                if (port[SweepLim] and $20) <> $20 then begin
                    port[SwepCoil] := $00;
                    BladePos := 0;
                    exit;   { home limit switch }
```

```
           end;
           dec(BladePos);
           if i <= 59 then inc(i)            { ramp up    }
           else if BladePos < 60    { ramp down }
                then i := BladePos + 1;

rotatestep(-1,sweepstep);
           port[Swepcoil] := {(port[Swepcoil] and $F3) or }(sweepstep
       and $0F);
           BenDelay(delaytime + LnSteps[i]);
        until {(keypressed) or } (BladePos <= 0);
        port[SwepCoil] := $00;
      {  if keypressed then begin
           key := Readkey;
        end; }
        if BladePos <= 0  then begin
           if ShowSweep then writeln(' *** ERROR : STALL in Sweeper
       Forward ');
           BladePos := 0;
           beep;
           delay(1000);
        end;
     end;
     procedure expMoveBlade(period:real);
     var
         SineMoveParam : real;
     begin
     {}{  if period < 2 then begin
           if BladePos <> 0 then expsweeperforward
```

```
                        else expsweeperback;
      end else begin
          case period of
              2 : SineMoveParam := 10.5;
              3 : SineMoveParam := 6.8;
              4 : SineMoveParam := 6.2;
              5 : SineMoveParam := 6.1;
              6 : SineMoveParam := 4;
              7 : SineMoveParam := 3;
              8 : SineMoveParam := 2.98;
              9 : SineMoveParam := 2.97;
              10: SineMoveParam := 2.95;
          end;
          if BladePos <> 0 then
  expsinemove(MaxBladeMoves,SineMoveParam,'r')
                      else
  expsinemove(MaxBladeMoves,SineMoveParam,'l');
      end; }
          sinemoveparam := period;
  {}{     if BladePos <> 0 then
  expsinemove(MaxBladeMoves,SineMoveParam,'r')
                      else
  expsinemove(MaxBladeMoves,SineMoveParam,'l');}
          if BladePos <> 0 then expsweeperforward(period)
                      else expsweeperback(period);

end;
```

```
{*********************************************************}
procedure SweepCal;
var
    resp : integer;
    theDelay : integer;
    realDelay : real;

hour1, hour2,
    min1, min2,
    sec1, sec2,
    sec1100, sec2100 : WORD ;

begin
    repeat
        write( '1) for square, 2) for sine ?' );
        readln( resp );
        if resp = 1 then begin
            write( 'Raw delay ? ' );
            readln( theDelay );
            GetTime(hour1, min1, sec1, sec1100) ;
            if BladePos <> 0 then sweeperforward(theDelay,StopCode)
                              else sweeperback(theDelay,StopCode);
        end else if resp = 2 then begin
            write( 'Raw delay ? ' );
            readln( realDelay );
            GetTime(hour1, min1, sec1, sec1100) ;
            if BladePos <> 0 then
    expsinemove(MaxBladeMoves,realDelay,'r')
``` jo/2506                         100

```
                        else
    expsinemove(MaxBladeMoves,realDelay,'1')

end;
        GetTime(hour2, min2, sec2, sec2100) ;
        writeln('Start: ', hour1, ':', min1, ':', sec1, ':',
    sec1100:2) ;
        writeln('Start: ', hour2, ':', min2, ':', sec2, ':',
    sec2100:2) ;
    until false; {forever}
    end;
    {*****************************************************}
    begin
        { blade must be at the front, already checked in utlzstage
        init }
        SweepDefaults;
        ReadSWEEPxPRMfile;
        ReadMACHINExPRMfile;
        BladePos := 0;
        StepIter := 0;
        NoSweep := false;
        ZClearBuffer;
        Read3DStateFile(ZStagePos,PlungerPos,junkSC);
    end.
    unit SINSTEP;
    {==========================================================
        3D Systems Stereolithography System Software
    ==========================================================
```

PATENT
188/189

01/24/89 JFT Creation.

```
                -------------------------------------------------------}
       {*******************************************************}
       interface
       uses CRT,DOS,UTLZSTAGE,UTILITY1;

const
           MaxSafeSineSpeed = 1;
       var
           BladePos        : integer;

procedure sinemove(steps: integer; SweepPeriod: real; device,dir
       : char; stopcode:integer);
15     procedure expsinemove(steps:integer; rawParam: real; dir : char);

{*******************************************************}
       implementation const
           JB              = $300;   {plunger, recoater address}
           JBC             = $308;   {8255: 4 MSB: plunger}
           CoilDataPort    = $309;   {     4 LSB: recoater}
           MaxBladeMoves = 1255; { pre - microstepping }
           SwepCoil = $309;
           SweepLim = $308;

function SweeperVelocity(InchesPerSec:real):real;
``` jo/2506                                102

PATENT
188/189

{ No longer used--JFT, 4/3/89 }

{ Used by SineMove to correct the velocity parameter to correct speed. } var vel : real;

begin if InchesPerSec < 0.1 then vel := (InchesPerSec / 0.1) * 0.11 else if InchesPerSec <= 0.2 then vel := ((InchesPerSec -
0.1) / 0.1) * (0.2375-0.11) + 0.11 else if InchesPerSec <= 0.5 then vel := ((InchesPerSec - 0.2) / 0.1) * (0.68-0.2375) + 0.2375 else if InchesPerSec <= 1.0 then vel := ((InchesPerSec - 0.5) / 0.3) * (1.55-0.68) + 0.68;

SweeperVelocity := vel;

end;

{} {sinemove: microstepping of recoater and plunger: see description of parameter at begin of file. Last test results:
better performance with CoProc N+, Ramp seemed to be to slow for higher velocities (>10), so AccelRampMax := 2 without further tests ! Test for this procedure: MICRO1.PAS (see conditional defines)}

{ No longer used. Expsinemove is used instead--JFT, 4/3/89 }
procedure sinemove(steps: integer; SweepPeriod: real; device,dir : char; stopcode:integer);

const jo/2506    103

PATENT
188/189

```
              DAngleArray            : array[0..7] of integer =
                                       (10,10,10,15,15,15,30,30);
              AccelRampMax           : integer = 2;
              RampLength             : integer = 4;

type
              LookUpTable = array [0..45] of real;

var stepcount              : integer;
              X1,X2                  : real;
              Fld,AccelValue         : integer;
              DIndex, DAngle         : integer;
              SinOfAngle,CosOfAngle  : integer;
              QuarterPi,PeriodPoint  : integer;
              FldTimes               : LookUpTable;
              BitFactor              : integer;
              X0Bit,X1Bit,X2Bit      : integer;
              CoilABit1,CoilABit2    : integer;
              CoilBBit1,CoilBBit2    : integer;
              SingleBit,FLdCount     : integer;
              j,double,accelcount    : integer;
              single,null            : integer;
              output                 : integer;
              rep                    : integer;
              whichLim               : integer;
              veloc                  : real;
``` jo/2506                                  104

```
    begin
        if (ZStagePos < ZSafeSweep) then exit;
        port[Sweeplim] := $FF;
        veloc := SweeperVelocity(12.1/SweepPeriod);
        if device = 'p' then BitFactor := 1
        else BitFactor := 16;
        CoilABit1 := 32 div BitFactor;                         {20H, 2}
        CoilABit2 := 16 div BitFactor;                         {10H, 1}
        CoilBBit1 := 128 div BitFactor;                        {80H, 8}
        CoilBBit2 := 64 div BitFactor;                         {40H, 4}

{Fld}
        Fld := round(100/veloc+0.5);
15
        {Dangle}
        DIndex := round(veloc+0.5)-1;
        if DIndex < 0 then DIndex := 0;
        if DIndex > 7 then DIndex := 7;
20      for j := 0 to DIndex do Dangle := DAngleArray[j];

{ Set QuarterPi to one-fourth period. }
        QuarterPi := 90 div DAngle;

25      { Build a table of values for the five-fourths period
        interval. }
        { The extra quarter lets us look up cosines easily. }
        for j:= 0 to (5 * QuarterPi) do
            FldTimes[j]:=sin(pi / 180 * DAngle * j) * Fld;

jo/2506                            105
```

PATENT
188/189

```
       for stepcount := 1 to steps do begin 5     if (port[SweepLim] and $20) <> $20 then
         begin
           if upcase(dir)='R' then
             begin
               port[SwepCoil] := $00;
               bladePos:=0;
               StopCode   := 0;
               exit;
             end;
         end else if (port[SweepLim] and $40) <> $40 then
         begin
           if upcase(dir)='L' then
             begin
               port[SwepCoil] := $00;
               bladePos:=MaxBladeMoves;
20             StopCode   := 0;
               exit;
             end;
         end;

25     if (stepcount <= RampLength) then begin
           AccelValue :=
       AccelRampMax*round(veloc/3)*(RampLength-stepcount+1)
           div RampLength;              {accel}
           if AccelValue < 1 then AccelValue := 1;
```

```
        end;

if ((steps-stepcount+1) <= RampLength) then begin
           AccelValue :=
     AccelRampMax*round(veloc/3)*(RampLength-(steps-stepcount))
           div RampLength;
           if AccelValue < 1 then AccelValue := 1;
        end else if (stepcount > RampLength) then
           AccelValue := 1;

{ Point SinOfAngle at lo or hi end of table, depending on
     step }
        { direction.  CosOfAngle is one-quarter pi ahead of this. }
        if upcase(dir) = 'L'
        then SinOfAngle := 0
        else SinOfAngle := 360 div DAngle;
        CosOfAngle := SinOfAngle + QuarterPi;

for PeriodPoint := 0 to (4 * QuarterPi) do begin

X1 := FldTimes[SinOfAngle];
           if X1 > 0 then X1bit := CoilABit1        {32   20H}
           else if X1 < 0 then X1bit := CoilABit2   {16   10H}
           else X1bit := 0;

X2 := FldTimes[CosOfAngle];
           if X2 > 0 then X2bit := CoilBBit1        {128  80H}
           else if X2 < 0 then X2bit := CoilBBit2   {64   40H}
           else X2bit := 0;
```

```
        XOBit := 0;

if abs(X1) < abs(X2) then begin
           double := abs(round(X1 +0.5));
           SingleBit := X2bit;
        end;
        if abs(X2) <= abs(X1) then begin
           double := abs(round(X2 +0.5));
           SingleBit := X1bit;
        end;
        single := abs(round(abs(X1)-abs(X2)+0.5));
        null   := Fld-double-single;

for accelcount := 1 to AccelValue do begin if upcase(dir) = 'L' then begin      {left} if double > 0 then begin
                    for j := 0 to double do port[CoilDataPort] :=
X1bit+X2bit;
                 end;
                 if single > 0 then begin
                    for j := 0 to single do port[CoilDataPort] :=
SingleBit;
                 end;
                 if null > 0 then begin
                    for j := 0 to null do port[CoilDataPort] := X0Bit;
                 end;
                          {end dir ="l"}
```

PATENT
188/189

```
           end else begin {dir "r"}                          {right} if null > 0 then begin
              for j := 0 to null do port[CoilDataPort] := X0Bit;
           end;
           if single > 0 then begin
              for j := 0 to single do port[CoilDataPort] :=
      SingleBit;
10         end;
           if double > 0 then begin
              for j := 0 to double do port[CoilDataPort] :=
      X1bit+X2bit;
           end;
           end;           {dir "r"} end;                       {accelcount}

{ Update lookup table pointers. }
20       if upcase(dir) = 'R' then begin
            SinOfAngle := SinOfAngle-1;
         end else begin
            SinOfAngle := SinOfAngle+1;
         end;
25       CosOfAngle := SinOfAngle + QuarterPi;

end;                       {for SinOfAngle...} end;                         {steps} jo/2506                        109
```

```
        port[CoilDataPort] := $FF;
        if BladePos <= 0 then begin
  {}       { if ShowSweep then writeln(' *** ERROR : STALL in Sweeper
5 SineMove Forward ');}
        BladePos := 0;
        StopCode := 3;
        beep;
        delay(1000);
10    end;
    end;

{****************************************************}

    procedure expsinemove(steps:integer; rawParam: real; dir : char);

const
        DAngleArray              : array[0..7] of integer =
                                   (10,10,10,15,15,15,30,30);
        AccelRampMax             : integer = 2;
        RampLength               : integer = 4;
    type
        LookUpTable = array [0..45] of real;

    var stepcount                : integer;
        X1,X2                    : real;
        Fld,AccelValue           : integer;
```

PATENT
188/189

```
        DIndex, DAngle              : integer;
        SinOfAngle,CosOfAngle       : integer;
        QuarterPi,PeriodPoint       : integer;
        FldTimes                    : LookUpTable;
        BitFactor                   : integer;
        X0Bit,X1Bit,X2Bit           : integer;
        CoilABit1,CoilABit2         : integer;
        CoilBBit1,CoilBBit2         : integer;
        SingleBit,FLdCount          : integer;
10      j,double,accelcount         : integer;
        single,null                 : integer;
        output                      : integer;
        rep                         : integer;
        whichLim                    : integer;
15      veloc                       : real;

begin
        if (ZStagePos < ZSafeSweep) then exit;
        port[Sweeplim] := $FF;
        veloc := rawParam;

BitFactor := 16;
        CoilABit1 := 32 div BitFactor;      {20H, 2}
        CoilABit2 := 16 div BitFactor;      {10H, 1}
        CoilBBit1 := 128 div BitFactor;     {80H, 8}
        CoilBBit2 := 64 div BitFactor;      {40H, 4}

{Fld}
        Fld := round(100/veloc+0.5);
```

```
        {Dangle}
        DIndex := round(veloc+0.5)-1;
        if DIndex < 0 then DIndex := 0;
        if DIndex > 7 then DIndex := 7;
        for j := 0 to DIndex do Dangle := DAngleArray[j];

{ Set QuarterPi to one-fourth period. }
        QuarterPi := 90 div DAngle;
10
        { Build a table of values for the five-fourths period
    interval. }
        { The extra quarter lets us look up cosines easily.         }
        for j:= 0 to (5 * QuarterPi) do
15          FldTimes[j]:=sin(pi / 180 * DAngle * j) * Fld;

for stepcount := 1 to steps do begin 20        if (port[SweepLim] and $20) <> $20 then
            begin
              if upcase(dir)='R' then
                begin
                  port[SwepCoil] := $00;
                  bladePos:=0;
                  exit;
                end;
            end else if (port[SweepLim] and $40) <> $40 then
              begin
```

PATENT
188/189

```
        if upcase(dir)='L' then
          begin
            port[SwepCoil] := $00;
            bladePos:=MaxBladeMoves;
            exit;
          end;
      end;

if (stepcount <= RampLength) then begin
10       AccelValue :=
    AccelRampMax*round(veloc/3)*(RampLength-stepcount+1)
         div RampLength;                 {accel}
         if AccelValue < 1 then AccelValue := 1;
      end;
15
      if ((steps-stepcount+1) <= RampLength) then begin
         AccelValue :=
    AccelRampMax*round(veloc/3)*(RampLength-(steps-stepcount))
         div RampLength;
20       if AccelValue < 1 then AccelValue := 1;
      end else if (stepcount > RampLength) then
      AccelValue := 1;

{ Point SinOfAngle at lo or hi end of table, depending on
25   step }
      { direction.  CosOfAngle is one-quarter pi ahead of this.
    }
      if upcase(dir) = 'L'
      then SinOfAngle := 0
``` jo/2506                113

PATENT
188/189

```
         else SinOfAngle := 360 div DAngle;
         CosOfAngle := SinOfAngle + QuarterPi;

for PeriodPoint := 0 to (4 * QuarterPi) do begin
            X1 := FldTimes[SinOfAngle];
            if X1 > 0 then X1bit := CoilABit1         {32   20H}
               else if X1 < 0 then X1bit := CoilABit2  {16   10H}
               else X1bit := 0;
 10
            X2 := FldTimes[CosOfAngle];
            if X2 > 0 then X2bit := CoilBBit1         {128  80H}
               else if X2 < 0 then X2bit := CoilBBit2  {64   40H}
               else X2bit := 0;
            X0Bit := 0;

if abs(X1) < abs(X2) then begin
               double := abs(round(X1 +0.5));
               SingleBit := X2bit;
 20         end;
            if abs(X2) <= abs(X1) then begin
               double := abs(round(X2 +0.5));
               SingleBit := X1bit;
            end;
 25         single := abs(round(abs(X1)-abs(X2)+0.5));
            null   := Fld-double-single;

for accelcount := 1 to AccelValue do begin
``` jo/2506

```
           if upcase(dir) = 'L' then begin          {left} if double > 0 then begin
                 for j := 0 to double do port[CoilDataPort] :=
 5      X1bit+X2bit;
                 end;
              if single > 0 then begin
                 for j := 0 to single do port[CoilDataPort] :=
        SingleBit;
10               end;
              if null > 0 then begin
                 for j := 0 to null do port[CoilDataPort] := X0Bit;
                 end;
                       {end dir ="l"}
15
           end else begin {dir "r"}                 {right} if null > 0 then begin
                 for j := 0 to null do port[CoilDataPort] := X0Bit;
20               end;
              if single > 0 then begin
                 for j := 0 to single do port[CoilDataPort] :=
        SingleBit;
                 end;
              if double > 0 then begin
                 for j := 0 to double do port[CoilDataPort] :=
        X1bit+X2bit;
                 end;
              end;          {dir "r"}
```

PATENT
188/189

```
            end;                    {accelcount}

{ Update lookup table pointers. }
            if upcase(dir) = 'R' then begin
               SinOfAngle := SinOfAngle-1;
            end else begin
               SinOfAngle := SinOfAngle+1;
            end;
10          CosOfAngle := SinOfAngle + QuarterPi;

end;                    {for SinOfAngle...} end;                       {steps}
15
        port[CoilDataPort] := $FF;
        if BladePos <= 0  then begin
        {}    { if ShowSweep then writeln(' *** ERROR : STALL in Sweeper
        SineMove Forward ');}
20         BladePos := 0;
           beep;
           delay(1000);
        end;
     end;
25
     {*****************************************************} end.^Z
``` jo/2506                     116

PATENT
188/189

```
       !***********************************************************
       !
       ! Build Parameter File
       ! Version 3.60
       !
       ! *********************************************
       ! Part Name:              Date:
       ! Important Data:
       ! last altered:
       !  *********************************************
       ! place options together inside of quotes;  use "" if no options
       !
       ""
       !
       ! General Parameters
       !
       800            Elevator board base address
       100            elevator pitch
       3.556          XY-only scale factor; Use 3.556 for Inches and Slize
       res=1000
       !!1, 0.0
       !!A0, 0.0
       17000          X-coordinate offsets
       17000          Y-coordinate offsets
       5000           Max number of bytes per block in Laser Queue
       26000,26000    Minimum X and Y of vat area (for graphics viewport)
       39000,39000    Maximum X and Y of vat area
       !
       #TOP,"DC+"     ! Drift Correction on
``` jo/2506                                117

PATENT
188/189

```
        !
        !
        #BTM,"ZW 30;              ! Z-axis wait time in seconds
               ZD 8;               ! Z-axis dip depth in mm
               ZV 0.2;             ! Z-axis velocity parameter
               ZA 0.2"             ! Z-axis acceleration parameter
        !***********************************************
        MACHINE.PRM
        !   MACHINE.PRM machine parameter file 05/18/89
        !
        SLA-250    !   machine type
        620        !   maximum blade steps to cross vat
        0.03       !   plunger steps per mil of elevator movement
       BEAM.PRM
        !   PROFILE Parameters Table
        !   Version 3.60
        !
        5000,32767      beam rest position
        !
        !   Beam Profile Data
        !
        3                  number of profile sensors
        3                  second sensor channel #
        63104,55452        sensor #1 changed 3-24-89 MJH
        0.045              1/2 mil hole multiplier to get mW
        0.0116             1 mil
        0.00592            2 mils changed 3-24-89 MJH
        0.00072            4 mils
``` jo/2506                        118

PATENT
188/189

```
          1                first sensor channel #
          4752,6543        sensor #2 changed 3-24-89 MJH
          0.040            1/2 mil hole multiplier to get mW
          0.0102           1 mil
          0.00776          2 mils changed 3-24-89 MJH
          0.00063          4 mils
          5
          32767,32767      position of 2 mil hole (#3)
          0.040            1/2 mil hole multiplier to get mW
          0.0010           1 mil
          0.00605          2 mils
          0.00063          4 mils
          !
          !   Temperature Data
          !
          4                thermometer channel #
          13               # points in thermistor calibration table
          19900,10         temperature calibration table...
          15720,15         format is resistance (Ohms), temperature (C)
          12490,20
          10000,25
          8057,30
          6531,35
          5327,40
          4370,45
          3604,50
          2986,55
          2486,60
          2081,65
``` jo/2506                                                 119

```
    1749,70
    !
    ! Fast, Medium & Slow Calibration Delay Values
    !
    ! line format is Spiral time (ms), between points (secs, 1/10
    sec res),
    ! between rows (secs)
    !
    20,0,0          Fast: 20 ms, turnaround as quickly as possible
    50,0.5,5        Medium: 50 ms, 1/2 sec, 5 secs
    100,20,120      Slow: 100 ms, 20 secs, 2 minutes
    !
    ! Slew Rate Limit Parameters
    !
    1000            maximum step in either axis
    2               delay between step points in milliseconds
    !*********************************************************
    POWER.PRM
    !   POWER V3.60 Parameters File
    !
    LASERPOWERTYPE=TOGGLE    LEVEL or UNKNOWN
    !*********************************************************
    SWEEP.PRM
    !       SWEEP.PRM 05/18/89
    !
    1       ! NS numsweeps
    10      ! P1 sweep velocity
    100     ! G1 blade gap as a percent of next layer thickness
    (ignore if NS=1)
```

PATENT
188/189

```
        10        !  P2
       100        !  G2
        10        !  P3
       100        !  G3
        10        !  P4
       100        !  G4
        10        !  P5
       100        !  G5
        10        !  P6
       100        !  G6
        10        !  P7
       100        !  G7
         0        !  BI bias when He laser is blocked
         9        !  MD plunge Motor Delay : delay between plunger motor
     pulses (ms)
       3.0        !  PS PlungStart : inches plunger moves down to its
     start position
         4        !  UL UPLIM : bi-cell activate level
        -4        !  LL LOWLIM: bi-cell activate level
       0.125      !  BG BladeGapL0 - distance between liquid and recoater
     blade (inches)
        -1        !  NC Number of checks for leveling ( 0 -> 5 or -1 for
     auto mode *** )
       0.3        !  DA Draining elevator acceleration
       0.5        !  DV Draining elevator velocity
         0        !  XP eXtra Platform
     height(mils).ZSafeSweep=ZBladeLevel+60mil+XP
     noshow       !  Show or No-Show sweep info ( S or N in the first
     column )
``` jo/2506                               121

PATENT
188/189

```
!*********************************************************
ZSTAGE.PRM
!   ZSTAGE Parameters File
!   Version 3.60
!
""          command line options: /NEGZ, /S, /M
800         elevator control board I/O address
.5          acceleration parameter
1           velocity parameter
2000000     big distance (max movement for up or down)
100000      # of microsteps per inch
2000        timeout value
10000       ZBladeLevel
10000       ZLiquidLevel
10000       ZUnloadLevel
^Z
```

```
      program AutoLevel;
      uses crt,utility1,utlsweep,windows;
      var
          junksc              : integer;
          DisplayWind         : wind;
          ExitSave            : pointer;
          Done                : boolean;
          HoldKey             : char;
          theLevel            : integer;
      {$F+}procedure ExitAutoLevel;{$F-}
      begin
          CursorOn;
          DefaultWindow;
          ClrScr;
          ExitProc := ExitSave;
      end;

procedure DrawMainScreen;
      begin
          clrscr;
          centertext('This is the Surface Position Repeatability
      POD',1);
          centertext('Auto-Levelling Program V1.1',2);
          centertext('Press L to Level, X to exit.',4);
      end;

procedure DoAutoLevel;
      begin
```

```
              centertext('Auto-Levelling in progress...',6);
              SetPlunger(-1,theLevel);
              centertext('Levelled at ',6);
              write(PlungerPos);
              writeln('            ');
              userwait;
              DrawMainScreen;
         end;

     begin
          { Initialize program. }
          ExitSave := ExitProc;
          ExitProc := @ExitAutoLevel;
          CursorOff;
          Done := false;

{ Initialize screen. }
          clrscr;
          DefineWindow(DisplayWind,5,5,75,20,2);
          FrameWindow(DisplayWind);
          ActivateWindow(DisplayWind);
          DrawMainScreen;

{ Read keys. }
          { "X" key exits. }
          { "L" key autolevels. }
          repeat
             repeat
                delay(100);
```

```
            until keypressed;
            HoldKey := upcase(ReadKey);
            if HoldKey = 'X' then Done := true;
            if HoldKey = 'L' then DoAutoLevel;
        until Done;
     end.^Z
```

PATENT
188/189

```
{ 02/01/89 JFT Made into a unit from Wayne Vinson's code.
    02/27/89 JFT Modified "Too High" or "Too Low" sections to read
until a peak is reached, then read until the abs(level) is less
than a threshold value.  The user is adding or removing resin
during this time.
    03/01/89 JFT Above fix only works well for resin removal.  Go
to modified older method with epsilon of 5.  Change user
messages.
    05/04/89 JFT Fixed (?) the bug that caused repeated adjustments
when the bicell was bullseyed.  Changed user messages and sounds.
Removed need to press key when adjustment complete.
    05/25/89 JFT Use procedure HandleKeyboardRequest in adjust
resin level loops so that the user may abort w/ctrl-c or break.
    06/16/89 JFT Lengthen move done by plunger from 40 to 60 when
checking to see if we're on the bicell.  Also use upLim and
lowLim instead of twice upLim and twice lowLim.
    08/03/89 JFT In CheckLevel, if 2nd or 3rd readings are 0 then
call it off the bicell.                    }
{*********************************************************}
unit UtlAdjust;
{ $ M 16384,0,0}
{$D+;I+}
{*********************************************************}
interface
uses Crt,Dos,Utility1,UtlSweep,UtlZStage,Windows;

procedure AddRemoveResin(var FinalLevel: integer);
procedure procReadBiCell(displaydelay:integer;echo:boolean);
procedure LongReadBiCell(displaydelay:integer);
``` jo/2506                              126

PATENT
188/189

```
    procedure procPlungerUp(echo:boolean);
    procedure procPlungerDown(echo:boolean);

{*********************************************************}
    implementation const
        epsilon = 2;   { +/- bias variation used in add/remove resin }

    var
        opt,stopc : integer;
        velocity2 : real;
        key, junkkey : char;
        level     : integer;
        delaytime : integer;
        onbicell,leveladjusted : boolean;
        tempstring : string;
        AlertWind,DataWind : wind;
    {*********************************************************}
    procedure procReadBiCell(displaydelay:integer;echo:boolean);
                {If echo is true then write levels to screen}
    var
        junkStr:string;
        sign    :string;
    begin
        ReadBiCell('N',level);
        if echo then begin
            if level < 0 then sign := '+' else sign := '-';   {Reverse signs for display}
``` jo/2506        127

```
            if level = 0 then sign := '';           {0 gets no sign}
            junkStr := concat('The liquid level is
        ',sign,IntStr(abs(level)));
            centerText(junkStr,1);
        end;
        delay(displaydelay);
    end;
    {*******************************************************}
    procedure LongReadBiCell(displaydelay:integer);
    begin
        repeat
            procReadBiCell(displaydelay,false);   {don't echo to levels
        to screen}
        until keypressed;
        key := Readkey;
    end;
    {*******************************************************}
    procedure procPlungerUp(echo:boolean);
    begin
        leveladjusted := false;
        repeat
            PlungerUp(10,stopc);
            procReadBiCell(1,echo);
        until keypressed;
        junkkey := upcase(Readkey);
    end;
    {*******************************************************}
    procedure procPlungerDown(echo:boolean);
    begin
```

```
            leveladjusted := false;
            repeat
                PlungerDown(10,stopc);
                procReadBiCell(1,echo);
            until keypressed;
            junkkey := upcase(Readkey);
        end;
        {*********************************************************}
        procedure DoBeep(freq,time : integer);
        begin
                sound(freq);
                delay(time);
                nosound;
            end;
        {*********************************************************}
        procedure DoFinalAdjustment;
            var
                i,level,tempint,returncode : integer;
                wasteKey                   : char;
            begin
                ActivateWindow(AlertWind);
                clrscr;
                if onbicell then begin { otherwise setplunger gets pissed }
                    centertext('Performing automated fine adjustment of
        resin level.',2);
                centertext('Please stand by.',5);
                ActivateWindow(DataWind);
                clrscr;
                ReadBicell('N',level);
```

PATENT
188/189

```
{}{      tempint := 8;}   { do course adjustment first }
         tempint := 32;   { do course adjustment first }
         repeat
             HandleKeyboardRequest( wasteKey );
             if (level > uplim) then begin
                 repeat
                     for i := 1 to tempint do begin
                         PlungerDown(1,ReturnCode);
                         delay(400 div tempint);
                     end; { of i }
                     ReadBiCell('N',level);
                 until level < UpLim;
             end;
             if (level < lowlim) then begin
                 repeat
                     for i := 1 to tempint do begin
                         PlungerUp(1,returnCode);
                         delay(400 div tempint);
                     end; { i }
                     ReadBiCell('N',level);
                 until level > LowLim;
             end;
             clrscr;
             centertext('Pausing to allow resin to settle.',1);
             delay(5000);    { allow settling time }
             ClrScr;         { Pause completed }
             tempint := 1; { now do finer adjustment }
             ReadBicell('S',level);
         until (level < uplim) and (level > lowlim);
``` jo/2506                        130

PATENT
188/189

```
            ActivateWindow(AlertWind);
            clrscr;
            centertext('Resin level now adjusted for part
      building.',4);
            leveladjusted := true;
            delay(2500);
            beep;
         end; { if onbicell }
      end; { of dofinaladjustment }
   {*********************************************}
   procedure CheckLevel;
      { reads and evaluates if on or off bicell
        and sets boolean bicell accordingly }
      var
         returncode,firstlevel,secondlevel,thirdlevel,tempint :
   integer;
      begin
         ActivateWindow(AlertWind);
         ClrScr;
         onbicell := false;
         Centertext('Checking resin level.',1);
         Centertext('Please stand by.',5);
         firstlevel  := 0;
         secondlevel := 0;
         thirdlevel  := 0;
         ActivateWindow(DataWind);
         clrscr;
         ReadBicell('S',firstlevel);
```

```
        if (firstlevel > 2*uplim) or (firstlevel < 2*lowlim) then
onbicell := true
        else begin { first gave bias type reading .. could still be
dead on }
            PlungerUp(60,returncode);
            { This delay added to thwart the recurrent adjustment
bug. }
            Delay(3000);
            ReadBicell('S',secondlevel);
            PlungerDown(120,returncode);
            { This delay added to thwart the recurrent adjustment
bug. }
            Delay(3000);
            ReadBicell('S',thirdlevel);
            PlungerUp(60,returncode);
            { both 2nd and 3rd must not give bias reading to be
on bicell }
            (*
            if not (secondlevel in[bias-epsilon..bias+epsilon]) and
            not (thirdlevel in[bias-epsilon..bias+epsilon]) then
OnBicell := true;
            *)
            (*
            if ((secondlevel > uplim) or (secondlevel < lowlim)) and
                ((thirdlevel > uplim) or (thirdlevel < lowlim)) then
                OnBicell := true;
            *)
            if ( ( secondLevel > bias + epsilon ) or ( thirdLevel <
bias - epsilon ) )
```

PATENT
188/189

```
            then OnBicell := true;
            { The following was added to accommodate SLAs with
        biases outside of the range -1..+1. When off the bicell, those
        SLAs showed as on the bicell. This should catch that case. --JFT
        }
            if ( secondLevel = bias ) or ( thirdLevel = bias ) then
        OnBicell := false;
            ActivateWindow(AlertWind);
          end; { else }
       end; { of checklevel }
    {********************************************************}
    procedure CenterPlunger;
       var
           returncode,midplunge,plungemove : integer;
       begin
           midplunge := maxplungemoves div 2;
           plungemove := abs(midplunge - plungerpos);
               { always put plunger in mid position before starting
        part }
            { for now always go all the way to top }
           plungerup(0,returncode);
           plungerdown(maxplungemoves div 2,stopc);
           update3dstatefile(zstagepos,plungerpos,returncode);
               { if tracking shows no problem then activate following
       instead }
           { if plungerpos < midplunge then
        plungerdown(plungemove,stopc);
             if plungerpos > midplunge then
        plungerup(plungemove,stopc);}
``` jo/2506                    133

```
            FrameWindow(DataWind);
            ActivateWindow(DataWind);
            clrscr;
            centertext('Pausing to allow resin to settle.',1);
            delay(10000);   { wait 10 sec for level to stabilize after
                              fast plunge move }
            ActivateWindow(AlertWind);
        end; { centerplunger }
    {*********************************************}
    procedure AddRemoveResin(var FinalLevel: integer);
        const
            CoarseAdjustLim = 10;
        var
            tempint,oldlevel,plungemove,option,returncode : integer;
            key,wastekey : char;
            tempreal : real;
            PeakReached : boolean;
            MaxReading : integer;
        begin
            DefineWindow(AlertWind,10,7,70,18,2);
            DefineWindow(DataWind,10,23,70,25,1);
            DefaultWindow;
            ClrScr;
            writeln;
            centerln(Product+' Resin Level Adjustment Utility');
            writeln;
            centerln('Copyright (C) 1989 by 3D Systems, Inc.');
            centerln('3D Systems StereoLithography System');
            FrameWindow(AlertWind);
```

```
                { FrameWindow(DataWind);        }
                { DataWind is framed in CenterPlunger }
                ActivateWindow(AlertWind);

                { first see if already did level check }
                {   showsweep := true; }
                if not leveladjusted then begin
                    centertext('Initializing resin adjustment
        apparatus.',2);
                    centertext('Please stand by.',5);
                CenterPlunger;
                CheckLevel;
                Delay(300);
                if OnBicell then begin
                    ActivateWindow(AlertWind);
                    ClrScr;
                    centertext('The resin level is currently in',2);
                    centertext('an acceptable range for part
        building.',3);
                    centertext('Manual adjustment will be
        unnecessary.',5);
                    DoFinalAdjustment;
                    Update3DStateFile(ZStagePos,PlungerPos,stopc);
                    exit;
                end; { if OnBicell }
                ActivateWindow(AlertWind);
                ClrScr;
                for tempint := 1 to 3 do begin
                    beep;
```

135 jo/2506

```
                    delay(100);
            end; { of tempint }
            centertext('The resin level is not in an acceptable',2);
            centertext('range for part building.',3);
            centertext('A MANUAL adjustment will be necessary:',5);
            centertext('Look at the white leveling pointer at
   the',7);
            centertext('rear of the vat.',8);
            centertext('Is resin touching the pointer?',9);
            While keypressed do wastekey := readkey;   { catch all
   previous keys }
            Wastekey := Readkey;   { get new key }

{ LEVEL TOO HIGH }

If Upcase(Wastekey) = 'Y' then begin   { level too high }
                ClrScr;
                centertext('The resin level is too high.',1);
                centertext('Please remove resin until the beep
   sounds.',5);
                centertext('Stop removing resin when you hear the
   beep.',6);
                PeakReached := false;
                MaxReading := 0;
                Repeat
                    HandleKeyboardRequest( wasteKey );
                    ActivateWindow(DataWind);
                    readbicell('N',level); { need quick read here }
                    { delay(10);}
```

136 jo/2506

```
                    ActivateWindow(AlertWind);
                    if abs(level) > MaxReading then MaxReading :=
        abs(level);
                    if (abs(level) < MaxReading) and (MaxReading > 50)
                    then PeakReached := true;
        {}{         Until (level < bias-epsilon) or (level >
        bias+epsilon);}
        {}{         Until PeakReached and (abs(level) <
        CoarseAdjustLim); }
                    Until abs(level) > uplim+1{( bias ) + epsilon};
                    { bicell values negative at bicell top }
                    centertext('Press any key to continue...',8);
                    Repeat
                        DoBeep(100,1000);
                        { delay(50); }
                    Until keypressed;
                    wastekey := readkey;
                    clrscr;
                    centertext('User finished removing resin.',5);
                    CheckLevel;  { to check for too much liquid removed }
                    if not onbicell then begin
                        ClrScr;
                        centertext('Resin level not in acceptable
        range.',5);
                        DoBeep(100,1000);
                        delay(2000);
                        addremoveresin(stopc);
                    end; { if not onbicell }
                    DoFinalAdjustment;

137
    jo/2506
```

PATENT
188/189

```
            Update3DStateFile(ZStagePos,PlungerPos,stopc);
            exit;
        end; { if level too high }

       { LEVEL TOO LOW }

ClrScr;
        centertext('The resin level is too low.',1);
        centertext('Please add resin SLOWLY until the beep
     sounds.',5);
        centertext('Stop adding resin when you hear the
     beep.',6);

PeakReached := false;
            MaxReading := 0;
            Repeat
                HandleKeyboardRequest( wasteKey );
                ActivateWindow(DataWind);
                readbicell('N',level); { need quick read here }
                { delay(10);}
20              ActivateWindow(AlertWind);
                if abs(level) > MaxReading then MaxReading :=
     abs(level);

if (abs(level) < MaxReading) and (MaxReading > 50)
                then PeakReached := true;
        {}{    Until (level < bias-epsilon) or (level >
     bias+epsilon);}
        {}{    Until PeakReached and (abs(level) <
     CoarseAdjustLim); }
                Until abs(level) > uplim+l{( bias ) + epsilon};
``` jo/2506

138

PATENT
188/189

```
              centertext('Press any key to continue...',8);
              repeat
                 DoBeep(100,1000);
                 delay(50);
              until keypressed;
              wastekey := readkey;
              clrscr;
              centertext('User finished adding resin.',5);
              CheckLevel; { to be sure before attempting
        finaladjustment }
              if not onbicell then begin
                 CenterText('Resin level not in acceptable range.',5);
                 DoBeep(100,1000);
                 delay(2000);
                 addremoveresin(stopc);
              end; { if not onbicell }
              DoFinalAdjustment;
              Update3DStateFile(ZStagePos,PlungerPos,stopc);
              exit;
           end; { if not leveladjusted }
           clrscr;
           centertext('Resin level is now adjusted for part
        building.',4);
           delay(2500);
           beep;
        end; { addremoveresin }
        {*********************************************************}
        begin
           leveladjusted := false;
``` jo/2506                                139

```
end.
^Z
```

PATENT
188/189

```
{================================================================
    3D Systems StereoLithography System Software
 ================================================================
```

RECOATER.PAS

SLA-250 Recoater wiper and plunger Control Program

------------------------------------------------------------

Recent History:

9/12/88   Ver 3.30   first released for breadboard testing

10/17/88   Ver 3.301 modified to be utility/initialization for
   final SLA250

11/15/88   Ver 3.31   copied from Recoat1 - use common utl*.inc
   files
        01/11/89   Ver 3.32   remove sweeper forward back --> use move
   move sweeper 01/25/89   Ver 3.33   JFT removed sweeper velocity biasing -->
   pass desired velocity in in/sec to MoveBlade, SweeperForward or
   SweeperBack.  Checks constant SIMULATION to see if we want to run
     this as a simulation (no communication with SLA) (useful for
   running on workstations not attached to SLAs).

01/30/89 JFT merged with Wayne's updated AddRemoveResin
   procedures.

02/01/89 USES Windows.  Move AddRemoveResin to unit UtlAdjus.
USES UtlAdjus.

02/16/89 Adjust Start Position sets new ZPlungeSetPos and
   sends the elevator to that position.

03/07/89   JFT      Added exit proc to forward sweeper.

jo/2506

03/09/89   JFT       Recalibrated sweep periods to account for final compiler options.

03/10/89   JFT       Fixed UtlAdjust so that it may be broken out of.

03/28/89   JFT V3.42 Change sweep period now bullet-proofed to input.

03/30/89   JFT V3.43 Write parameters to machine.prm instead of zstage.prm.

05/25/89   JFT V3.61 Allow user to break out of adjust resin level loops.

06/07/89   JFT V3.61B Make stirring easier to break out of.

06/15/89   JFT V3.61C Better stirring utility (multi-speed).

06/16/89   JFT V3.61D Better bicell check (see UtlAdjust.pas).

06/16/89   JFT V3.61E Fix stir utility by using the indexer's MA (Mode Alternate) command.

07/05/89   JFT V3.61F Single Coil Holding Torque.

07/21/89   JFT V3.62  Changed version #.

07/24/89   JFT V3.63  Fixed adjust resin level (?).
_____}

{ $ M 16384,0,0}

{ $ D-;I+}

{R+} uses Crt,Dos,Utility1,UtlSweep,

UtlZStage,windows,UtlAdjust,Indexer;

{$I product.inc} const

VersionId = '3.63';

Indent    = 19;

PATENT
188/189

```
        epsilon = 1;    { +/- bias variation used in add/remove resin }
        Simulation = false;    { Is this a simulation (no SLA)? } var
        opt,stopc : integer;
        SweepPeriod : real;
        key, junkkey : char;
        level      : integer;
        delaytime  : integer;
        onbicell,leveladjusted : boolean;
        tempstring : string;
        TopWind,BottomWind,IntroWind : wind;
        SaveExit : pointer;

     {*****************************************************}
     {
     Procedure CenterText(tempstring : string;RowNumber : integer);
        begin
           gotoxy(1,rownumber);
           ClrEol;
           if length(tempString) >= (lo(WindMax)-lo(WindMin))
           then gotoxy(1,rownumber)
           else gotoxy(((lo(WindMax)-lo(WindMin)-length(tempstring))
        div 2),rownumber);
           write(tempstring);
        end;  }

{*****************************************************}
     procedure ExitRecoater;
``` jo/2506                             143

```
      begin
         SweeperForward(3,stopc);
         CursorOn;
         ExitProc := SaveExit;
         Halt(0);
      end;
      {*********************************************************}
      procedure DisplayLevel;
      var
         junkStr : string;
         sign : string[1];
      begin
         procReadBiCell(500,true);
      end;
      procedure DefaultWindow2;
      begin
         DefaultWindow;
         window(1,1,80,22);
      end;

procedure ShowPowerMenu;
         var
            i : integer;
            junkStr : string;
      begin
         DefaultWindow2;
         ClrScr;
         FrameWindow(BottomWind);
```

```
        { ActivateWindow(BottomWind);
          DisplayLevel;}
          DefaultWindow2;
          centertext(Product+' Recoater Utility Control Program',1);
          writeln;
          centertext('Version '+VersionId+' Software Release '+Rel_3D,2);
          centertext('Copyright (C) 1989 by 3D Systems, Inc.',3);
          centertext('3D Systems Laser StereoLithography System',4);
          if Simulation then centertext('SIMULATION IN PROGRESS',5);
          for i:=1 to 5 do writeln;
          FrameWindow(TopWind);
          ActivateWindow(TopWind);
          ClrScr;
          writeln('    1. Adjust Resin Level Utility ');
          writeln('    2. Sweep ');
          writeln('    3. Change Sweep Period');
          writeln('    4. Lower Liquid');
          writeln('    5. Raise Liquid');
          writeln('    6. Adjust Building Start Position');
          writeln('    7. Stir Liquid');
          write   ('    X. Exit');
          DefaultWindow2;
          centertext('Please make a selection.',18);
          writeln;
          end;

procedure WriteZStartLevel(NewStartZLevel:real);
       const
          ParamFileName = '\3DSYS\MACHINE.XYZ';
```

PATENT
188/189

```
            NewName       = '\3DSYS\MACHINE.PRM';

var
            IOerr,i,m,n,valcode : integer;
 5          j : longint;
            r : real;
            ParamFileLine, AppendText : str80;

ParamFile,NewFile: text;
            InchDistanceStr   : str80;
            DirInfo           : SearchRec;
            InputLine         : string;
        begin
            OpenParamFile := ParamFileName;
            assign(ParamFile,OpenParamFile);
            rewrite(ParamFile);
            assign(NewFile,NewName);
            reset(NewFile);
20          while not eof(NewFile) do begin
                readln(NewFile,InputLine);
                writeln(ParamFile,InputLine);
            end;
            rewrite(NewFile);
            IOerr := IOresult;
            if IOerr <> 0 then begin
                OpenParamFile := ParamFileName;
                assign(ParamFile,OpenParamFile);
```

PATENT
188/189

```
         reset(ParamFile);
         IOerr := IOresult;
         if IOerr <> 0 then OpenParamFile := ' '
     end; {IO error}
     if IOerr = 0 then begin
         i := 0;
         reset(ParamFile);
         repeat
             readln(paramFile,paramFileLine);
             writeln(newFile,paramFileLine);
         until paramFileLine = 'ZSTAGE.PRM';
         while (not eof(ParamFile)) and (i <= 9) do begin
             for j:=1 to 255 do ParamFileLine[i]:=' ';
             readln(ParamFile,ParamFileLine);
             if i < 7 then writeln(NewFile,ParamFileLine)
             else begin
                 if i = 7 then appendText := '      ZLiquidLevel';
                 if i = 7 then
     writeln(NewFile,NewStartZLevel:12:10,appendText)
                 else writeln(NewFile,ParamFileLine);
             end;
             if (ParamFileLine[1] <> ' ') and (ParamFileLine[1] <>
     '!') and
                 (ParamFileLine[1] <> '"') then inc(i);
         end;
         while not eof(paramFile) do
         begin
             readln(paramFile,paramFileLine);
             writeln(newFile,paramFileLine);
``` jo/2506                                           147

PATENT
188/189

```
            end;
        end;
        ZPlungeSetPos := NewStartZLevel + 0.315;   { 8mm lower than
     Start. }
        close(NewFile);
        close(ParamFile);
     end;

procedure ZSurfacePosition(var ZValue : real);
     const
        ZVSlow = '0.100000';    { Slow speed for setting levels }
     var
        key : char;
        dumbkey,OK : boolean;
        StopCode : integer;
        ZVSetZ  : str10;
     begin
        dumbkey := false;
        ActivateWindow(TopWind);
        clrscr;
        Centertext('Use up and down arrows for positioning,',1);
        Centertext('space to halt,',2);
        Centertext(' S to shift to slow speed,',3);
        Centertext('  and X when at the desired level.',4);
        ZVSetZ := ZVeloc;
        repeat
           OK := false;
           repeat
              key := 'z';
``` jo/2506                                148

PATENT
188/189

```
                HandleKeyboardRequest(key);
                key := upcase(key);
                if dumbkey then key:=' ';
                dumbkey:=false;
                if key in [#72,#80,' ','S','X'] then OK := true; { up
        and down arrows }
            until OK;
            case key of
                #72 : begin
                        if not NegZStage then
        ZFreeMove(ZAccel,ZVSetZ,'UP  ') else ZFreeMove(ZAccel,ZVSetZ,'DOWN');
                        dumbkey := true;
                      end;
                #80 : begin
                        if not NegZStage then
        ZFreeMove(ZAccel,ZVSetZ,'DOWN') else
        ZFreeMove(ZAccel,ZVSetZ,'UP  ');
                        dumbkey := true;
                    end;
                'S': begin
                        ZVSetZ := ZVSlow;   { change to slow speed }
                        Centertext('Shifted to slow speed',6);
                        Centertext(' for final positioning.',7);
                    end;
                'X': begin
{}                      ZValue := -abs(ZStagePos);
``` jo/2506                                  149

PATENT
188/189

```
                exit;
            end;
        end;
        until false;
      end;

procedure AdjustBuildStart;
    var
        instring      : string;
        valcode       : integer;
        junkStr       : string;
        NewStart      : real;
        Temp          : real;
    begin
        StopKey := true;
        Temp := ZLiquidLevel;
        ActivateWindow(BottomWind);
        clrscr;
        Centertext('Moving elevator to current start position...',1);
        GotoZPos(1);
        Centertext('Position the elevator at the desired start
    position.',1);
        ZSurfacePosition(ZLiquidLevel);
        clrscr;
        ActivateWindow(BottomWind);
        clrscr;
        junkStr := concat('A new build starting level has been
    entered.');
        centertext(junkStr,1);
``` jo/2506

PATENT
188/189

```
        ActivateWindow(TopWind);
        clrscr;
        centertext('Accept this new level ?',2);
        repeat
            delay(100)
        until Keypressed;
        if temp <> ZLiquidLevel then begin
            if upcase(readkey)='Y' then WriteZStartLevel(ZLiquidLevel)
            else ZLiquidLevel := temp;
        end;
        StopKey := false;
        GoToZPos(2);    { Go to Check Resin Level position. }
    {}{    ZReadParms;}
    end;
    procedure SetNewDelay;
    var
        instring      : string;
        valcode       : integer;
        junkStr       : string;
        tempReal      : real;
    begin
        ActivateWindow(BottomWind);
        junkStr := concat('Enter sweeper period [now
    ',RealStr(SweepPeriod,2), ' s]: ');
        centertext(junkStr,1);
        cursoron;
        readln(instring);
        if instring <> '' then begin
``` jo/2506                       151

```
        tempReal := RealVal(instring,valcode);
        if (tempReal > maxSweepPeriod) then tempReal :=
     maxSweepPeriod;
        if (tempReal < minSweepPeriod) then tempReal :=
     minSweepPeriod;
       end;
       cursoroff;
       if (valcode = 0) and (instring<>'') then SweepPeriod :=
     tempReal;
       junkStr := concat('Sweeper period now set to
     ',RealStr(SweepPeriod,2),' seconds');
       centertext(junkStr,1);
       delay(3000);
     end;
     procedure GetSelection1;
     begin
       repeat
         ActivateWindow(BottomWind);
         DisplayLevel;
         ActivateWindow(TopWind);
         HandleKeyboardRequest(key);
         key := upcase(key);
         if key in ['1'..'7','X'] then exit;
       until false;
     end;

{**********************************************************}
     procedure DoBeep(freq,time : integer);
```

PATENT
188/189

```
      begin
            sound(freq);
            delay(time);
            nosound;
      end;

{**********************************************************}
      procedure doUpLiquid;
      begin
            ActivateWindow(BottomWind);
            procPlungerDown(true);
            ActivateWindow(TopWind);
      end;
      {**********************************************************}
      procedure doDownLiquid;
      begin
            ActivateWindow(BottomWind);
            procPlungerUp(true);
            ActivateWindow(TopWind);
      end;
      {**********************************************************}
      procedure Stir;
      var
            wasteKey        : char;
            endPos          : longInt;
            endPosStr       : string;
            abortStir,stop  : boolean;
            accel,veloc     : string;
            {---------------------------------------------------------}
```

PATENT
188/189

```
        procedure ElevatorCommand( theCmd : string );
        var
            response          : string;
        begin
            if theCmd <> '' then if SendCmdToIndexer(theCmd+'
        ',zTimeOut) <> 0
            then begin
                beep;
            end
            else if ReadResponseFromIndexer(response,zTimeOut) <> 0
            then begin
                beep;
            end;
        end;
        {----------------------------------------------------}
        begin
            endPos := trunc( zStepsPerInch * (-1) * ( zLiquidLevel -
        0.5 ) );
            Str( endPos , endPosStr );
            ActivateWindow(BottomWind);
            ClrScr;
            Write(' STIR fast/medium/slow (f/m/s) : ');
            repeat delay(100) until keypressed;
            wasteKey := UpCase(ReadKey);
            abortStir := false;
            case wasteKey of
                'S' : begin
                        accel := '0.5';
                        veloc := '1';
``` jo/2506          154

```
              end;
         'M' : begin
                  accel := '5';
                  veloc := '5';
              end;
         'F' : begin
                  accel := '10';
                  veloc := '10';
               end;
         else abortStir := true;
      end;
      if not abortStir then begin
         ClrScr;
         Write( ' STIRRING : press any key to abort...' );
         GoToZPos(2);
         ElevatorCommand( 'E MA A' + accel + ' V' + veloc );
         stop := false;
         ElevatorCommand( 'D' + endPosStr + ' G' );
         repeat
            if KeyPressed then stop := true;
            delay(100);
            if KeyPressed then stop := true;
         until ( stop );
         ClrScr;
         Write( ' Aborting stir operation...' );
         ElevatorCommand( 'K' );
         ZGoHome;
         GoToZPos(2);
      end;
```

```
            ClrScr;
            ActivateWindow(TopWind);
         end;
         {*********************************************************}
         begin { ReCoater }
            TextBackground(Black);
            TextColor(White);
            SaveExit := ExitProc;
            ExitProc := @ExitRecoater;
            DefaultWindow;
            ClrScr;
            DefineWindow(TopWind,Indent-1,7,80-Indent,16,1);
            DefineWindow(BottomWind,10,23,70,25,1);
            DefineWindow(IntroWind,10,7,70,11,2);
            if Simulation then OnBicell := false;
            Read3DStateFile(ZStagePos,PlungerPos,stopc);
            SweepPeriod := DefaultPeriod;
            LevelAdjusted := false;
            delaytime := trunc(SweepPeriod);
            CursorOff;
            FrameWindow(IntroWind);
            ActivateWindow(IntroWind);
            ClrScr;
            CenterText('Elevator moving to check resin level
         position...',2);
            if not Simulation then GoToZPos(2);
            key := ' ';
            DefaultWindow;
```

PATENT
188/189

```
        clrscr;
        repeat
            ShowPowerMenu;
            ActivateWindow(BottomWind);
            ActivateWindow(TopWind);
            GetSelection1;
            case key of
                '1': AddRemoveResin(stopc);
                '2': MoveBlade(SweepPeriod,stopc);
                '3': SetNewDelay;
                '4': doDownLiquid;
                '5': doUpLiquid;
                '6': AdjustBuildStart;
                '7': Stir;
                'X': Halt(0);
            end;
            key := ' ';
        until false;
        CursorOn;
        { We exit through abort... we never reach here.   }
        end.
``` jo/2506                    157

ADDITIONAL IMPROVED BLADE DESIGNS

Several additional embodiments of the subject invention will now be described, where the design of a recoating blade is changed in relation to the conventional blade design shown in FIG. 24a. As discussed previously, it may be advantageous to increase the cross-sectional width 802 of these blades so that it is greater than the width of trapped volumes typically encountered in order to help eliminate the problem of excess resin back-flowing underneath the blade when it is passing over trapped volumes ("flowback"). This problem occurs when the bow wave created in front of the blade creates a pressure head which drives the resin downward and underneath the moving blade. Increasing the cross-sectional width will help reduce or alleviate this problem, but increasing the cross-sectional width too much may introduce lift or drag forces as illustrated in FIG. 24b, in which like reference numerals refer to like elements.

In the Figure, blade 26 is shown moving from left to right (a zero blade gap is shown for simplicity of illustration) over the surface 20 of resin bath 11. When the blade is at position a, it will be moving at a certain velocity, which will induce the resin immediately below it to also move at that same velocity. Resin below the blade but spaced from it more remotely will be induced to move at a velocity uniformly distributed along a gradient over the dimension 800 from the bottom of the blade to the bottom of container 10, with resin directly beneath the blade moving at the blade velocity and resin at the bottom of the container moving at zero velocity.

When the blade has moved to position b, so that it is just moving over part 40, the situation will change dramatically. As before, the resin beneath the blade will also be induced to move at a velocity uniformly distributed along a gradient over the dimension 801 between the bottom surface of the blade and the top surface of the already-formed portion of part 40. Since the dimension 801 over which the velocity must be distributed has decreased so dramatically, the result will be a large sheer force exerted on part 40, which may cause it to rotate around the weakest bending moment. The sheer force which can be exerted is calculated to typically be 1–2 oz., and will increase with the speed of the blade, the use of thinner layers, with the viscosity of the resin, and with an increase in the width of the blade. As a result, in FIG. 24b, the surface of the part may rotate or be distorted from 40 to 40', and the part may even strike the blade, as shown at point 41, thereby stopping or impeding its progress. Additional reference material can be found in Streeter, V. L., *Fluid Mechanics*, McGraw-Hill, New York, 1958, pages 195–197, which is hereby incorporated by reference as though set forth in full herein. As explained therein, thinner layers will result in more sheer forces since they decrease the distance over which the induced velocity must go to zero. As a result, a feedback loop may be created in which a thin layer creates lift forces which pull the already-formed portion of the part 40 towards the blade, which further reduces the distance over which the gradient is distributed, thereby further increasing the lift forces which pull the part even closer etc., until the part actually contacts the blade.

Figure 24A:
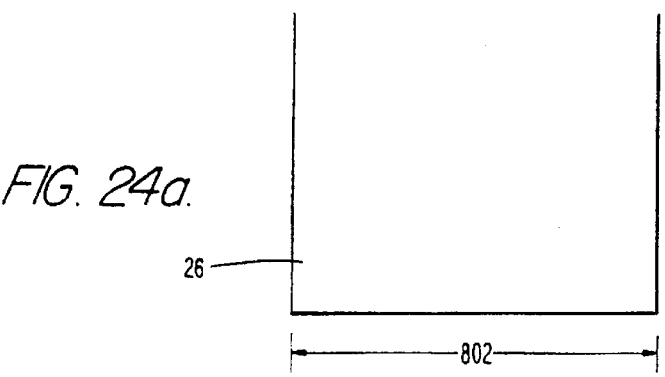
FIGS. 24a, 24b, and 24c illustrate problems encountered with a conventional blade design having a rectangular cross-section.
Figure 24B:
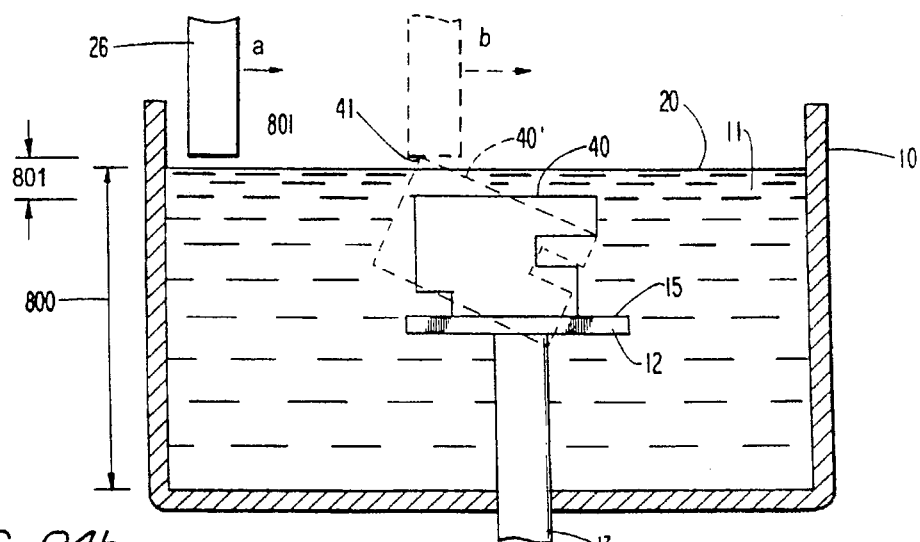

Therefore, the cross-sectional dimension of the bottom of the blade which contacts the resin surface (identified with reference numerals 802 in FIG. 24a should be reduced to avoid the lift problem. It has been found for typical conditions that a cross-sectional dimension greater than about 0.1 in. should be avoided.

Figure 24C:
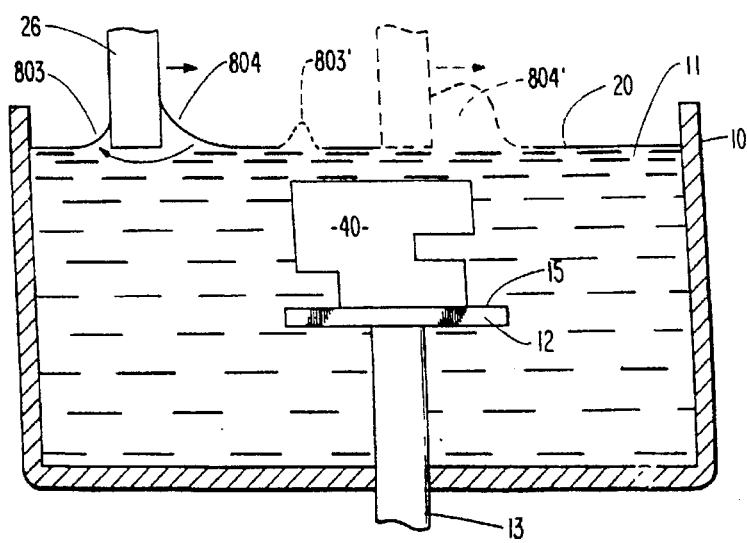

Another problem with this blade configuration is illustrated in FIG. 24c, in which like reference numerals designate like elements.

Again, blade 26 is shown traveling from left to right over surface 20 of resin 11 on container 10. When the blade is located with its bottom surface at or near the surface of the resin, building material may be wicked up the front and rear surface of the blade. Strictly speaking, if the blade is located with its lower surface located above the resin surface then contact between the blade and the resin must be made before any material can wick up the blade. This contact can be made in a number of ways, the most typical of which is the sweeping of excess material from the previous layer of structure. The amount of material wicked up the blade depends on the material the blade is made of, the properties of the resin, and the spacing between the resin and the blade. It has been found that for a blade gap of 25 mils or less a significant amount of material can be held to the back and front sides of the blade. The material 804 that clings to the front of the blade is not felt to induce significant problems since this material simply joins with the large head of material 804' that collects at the front of the blade as it sweeps across the building material. However, the material 803 that creeps up the back of the blade and clings to it can cause a significant part building problem known as "leading edge hump."

When the blade encounters the part, the large increase in sheer force typically causes the small lump of resin attached to the trailing edge of the blade to be deposited on the resin surface at the point where the already-formed portion 40 of the part is encountered. This is represented by identifying numeral 803' in the Figure, which bump is typically about 6–10 mils in height. The blade, meanwhile, has already moved to position c, and the bow wave 804' has continued to form in front of the blade.

The small bump of resin will result in a nonuniform layer which may show up as a distortion in the final part, since gravity may not smooth out the bump sufficiently by the time the synergistic stimulating means has transformed the resin.

This problem may be quite severe. As mentioned earlier, the distortion on a given layer can typically be about 6–10 mils. Since this may occur in the same area over and over again, i.e., at the leading edge of contact between the blade and the part (one side or the other of the part depending on the sweep direction), even a small bump can build up from layer to layer. Additionally, depending on the blade clearance, a growing bump or a bump developed from a single sweep can result in a collision between the part and the blade. In sum, the overall distortion can be many times the distortion of a particular layer.

It has been found that blades having cross-sectional sides which form an angle below 90° with the surface of the resin will help solve the resin deposit problem. This is because the smaller the angle, the greater the horizontal component of the surface tension force holding the resin bump onto the blade, which will act to oppose the sheer force tending to separate the resin bump from the blade.

Figure 25:
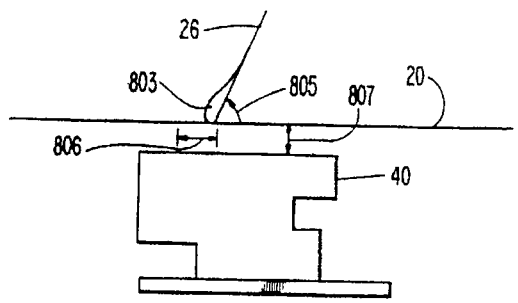
FIG. 25 illustrates how a non-vertical blade side opposite to the sweep direction will reduce the deposit of a resin hump on the leading edge of a part.

This can be explained with the aid of FIG. 25, in which like elements are identified which like reference numerals, which shows the side of blade 26 at an angle Θ (identified with reference number 805) with the surface 20 of the resin, which surface is a distance h (identified with reference numeral 807) above the top—most surface of the already-formed portion of part 40. The sweeping direction of the blade is toward the right. Also shown is the resin bump 803 which has been formed on the trailing edge of the blade. The resin bump has a linear extent b (identified with reference numeral 806).

Assuming the following additional definition of terms,

σ=resin surface tension

μ=resin viscosity, it has been found that the velocity of the blade u* at which the resin lump will separate and be deposited onto the resin surface, can be approximated by the following expression:

$$u^* = \frac{\sigma \Delta h \cos \Theta}{\mu b}$$

Therefore, this expression predicts that for a vertical blade, for which Θ=90°, the separation velocity u* will also be zero, and any finite blade velocity will therefore result in depositing of the resin hump. This prediction matches well with experimental results.

The expression also predicts that u* is proportional to that the separation velocity can be increased by using thicker layers, and that the deposit problem will be worse with thinner layers.

The expression further predicts that the separation velocity is inversely proportional to the resin viscosity, that the separation velocity can be increased by using less viscous resins, and that the deposit problem will be worse with highly viscous resins.

The expression further predicts that decreasing Θ will increase the separation velocity. However, there are safety and fabrication concerns which limit the extent to which Θ can be decreased. It has been found that a Θ of about 30° is a reasonable compromise, particularly since the separation velocity at this angle will be close to its theoretical maximum. At this angle, a decrease in the hump deposited from 10–20 mils to about 1–2 mils is possible.

Still, however, for high viscosity resins and thin layers, even at this angle, the separation velocity will be quite low, and hence, the blade velocity must likewise be kept low in order to avoid the deposit problem. For example, assuming the following values for the above-mentioned parameters, μ=2000 centipoise=20 gram/sec-cm b=0.1 cm.

h=10 mils=0.025 cm

Θ=30°

σ=300 grams/sec.$^2$ (approx. value for XB-5081), then the separation velocity is predicted to be about 1.3 in/sec., which is relatively low. Still, a value of Θ=30° will significantly increase the separation velocity compared to a vertical blade cross-section.

Figure 26:
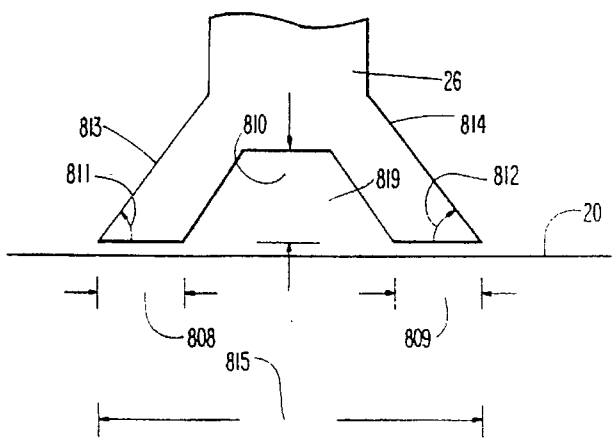
FIG. 26 illustrates a "winged" embodiment of a blade design having two contacting members.

A preferred embodiment of a blade which is designed to reduce the aforementioned problems is illustrated in FIG. 26.

As shown, the preferred embodiment has two wings, identified with reference numerals 813 and 814, having sides which are at angles 811 and 812, respectively, with resin surface 20. Preferably, angles 811 and 812 are about 30°.

Dimensions 808 and 809 should each be less than about 0.060 in., and preferably about 0.030 in. or less, and dimension 810 should be at least 0.010 in. or more, and preferably about 0.030 in. If dimensions 808 and 809 are too large, or if dimension 810 is too small, then layer uniformity is adversely affected. Large values of dimensions 808 and 809, or alternatively, small values of dimension 810, can result in too much blade/resin surface contact, which can induce a lift or drag force on the part, and can lead to blade/part contact for the reasons discussed previously.

Dimension 815 should be greater than 0.375 in., and preferably about 0.5 to 0.75 in.

This embodiment considerably reduces the leading edge deposit problem relative to simple vertical blades, and is also capable of uniform recoating of thin (0.003 to 0.005 in.) layers.

A variant on the embodiment of FIG. 26 is shown in FIG. 27, which is characterized by an additional member 816 between the two outlying members 813 and 814. This variant is advantageous since it performs better on small trapped volumes than the embodiment of FIG. 26, and is known as the "Trident" embodiment, compared to the earlier "winged" embodiment.

Figure 27A:
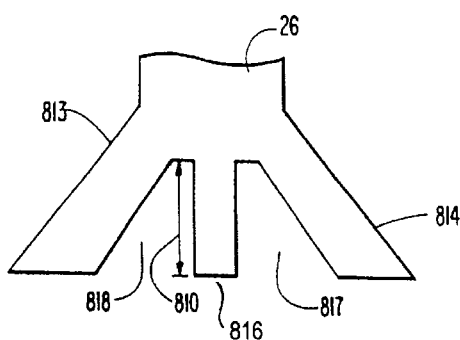
FIGS. 27a and 27b illustrate how a preferred "Trident" embodiment of a blade design having three contacting members can reduce resin flowback and scoopout.
Figure 27B:
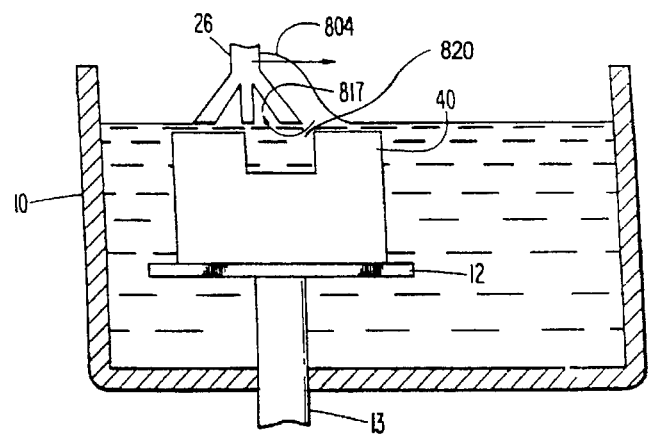

The postulated reason for this is illustrated in FIG. 27(B), in which the blade embodiment 26 of FIG. 27(A) is shown moving from left to right over trapped volume 820 which has a dimension in the sweep direction smaller than the width of the blade.

As shown, bow wave 804 has formed in front of the blade, and as the blade passes over the trapped volume, some of the resin that has built up in the bow wave will have a tendency to flow underneath the blade due to the pressure of the bow wave. The presence of member 816 will impede the backflow, not only by its physical presence, but also because it will increase the air pressure in areas 817 and 818 compared with what the pressure would otherwise be without the member being present. By increasing the air pressure in these areas, less backflow can take place into these areas. Therefore, the member will act to indirectly reduce backflow also. With this embodiment, however, it is important that dimension 810, which is the height of the member, be kept below a maximum so that the air pressure will be kept high enough, but greater than a minimum so that the resin doesn't believe a wide blade is crossing over it. It has been found that an acceptable dimension is about 0.030 in.

Another problem which sometimes occurs in the "scoop-out" or "dragout" problem, whereby backflow over a trapped volume is reduced so much that the blade actually scoops out too much resin from a trapped volume, leaving the remaining resin therein too low.

Figure 28:
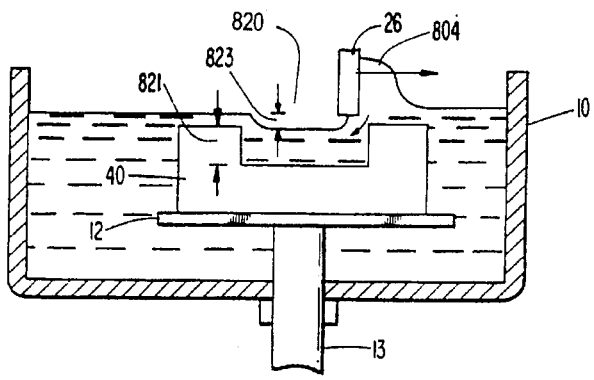
FIG. 28 illustrates the scoopout problem with a conventional blade design.

The problem is illustrated in FIG. 28, in which blade 26 is shown traveling from left to right over trapped volume 820. As shown, a bow wave 804 has formed in front of the blade. However, the small depth 821 of this trapped volume has restricted the backflow from the bow wave, causing too much resin to remain as part of the low wave, and get scooped out of the trapped volume. This, in turn, causes the resin remaining in the trapped volume to be too low by the distance 823.

Scoopout is caused by the blade inducing a shear force on the resin. The induced shear force, in turn, is directly related to the distance over which the induced velocity from the blade will be reduced to zero in a vat of resin having a nearly infinite depth. This distance is defined as the boundary layer depth, and depends on the width of the blade making contact with the resin, the velocity of the blade, and the viscosity of the resin. For a ⅛ in. wide blade traveling at 4 in/sec. in a 3000 cps resin, for example, the boundary layer depth is about 1.8 in. For a ⅝ in. wide blade traveling at 4 in/sec. in a 3000 cps resin, the boundary layer depth is about 4.2 in. Scoopout will be a problem when the depth of the trapped volume is substantially less than the boundary layer depth of the blade, since in this instance, boundary conditions will cause the velocity gradient to be sharper than it would otherwise be over resin having an infinite depth, which will exert a shear force on the resin in the direction of sweep. This will tend to reduce the backflow, which is caused by another force, the pressure from the bow wave. The result is scoopout or dragout. This is similar to dragout that occurs over a flat portion of object when the blade is swept too quickly.

Scoopout can be reduced by lowering blade velocity, but also can be helped through blade design.

Compared to the FIG. 24a embodiment, the embodiments of FIGS. 26 and 27a are effective in reducing scoopout or dragout since the contact area between the resin and blade is still lower. If scoopout still proves to be a problem, recoating could occur in multiple sweeps, with the velocity on the last sweep reduced sufficiently to alleviate the problem.

Compared to the simple vertical blade, these embodiments are also more effective in reducing shear stress on the part, reducing the bump deposited on the leading edge of the part, and in handling trapped volumes. They also provide thinner layers uniformly, to layers as thin as 3 mils. Although the deviation in uniformity (measured by the distance between peaks and valleys) with large trapped volumes was still considerable, more of the deviation was caused by scoopout rather than backflow, which problem is detrimental to part accuracy, but doesn't generally lead to catastrophic collision between the blade and part. The backflow problem, by contrast, can lead to catastrophic failure. Also, the difference in uniformity from large to small trapped volumes is reduced by about 3 fold. Staged sweeping may lead to even more uniform coatings.

Figure 29A:
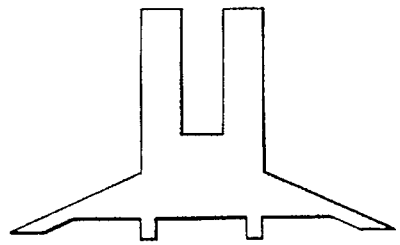
FIGS. 29a, 29b, and 29c illustrate embodiments of blade designs having more than three contacting members.
Figure 29B:
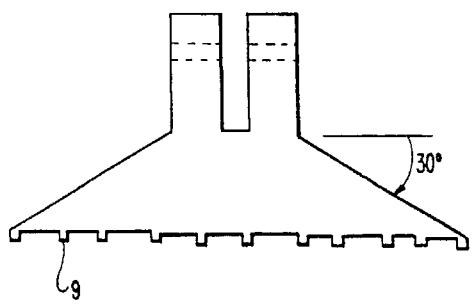
Figure 29C:
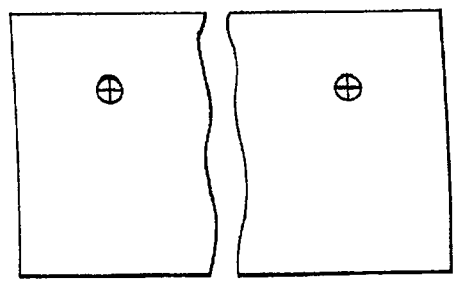

A further refinement of the FIG. 27a embodiment is shown in FIG. 29a, which is characterized by a larger width and two internal members rather than just one. In those occasions where both large and small trapped volumes are typically encountered, the blade shown in FIGS. 29b and 29c can be used. As shown, the blade is characterized by a larger width (2.375 in.) and multiple internal members (9, excluding the two outside members). This blade has achieved a film uniformity of 2 mils over trapped volumes of many different sizes and depths.

ADDITIONAL SLA-250 RECOATING SOFTWARE

Figure 30A:
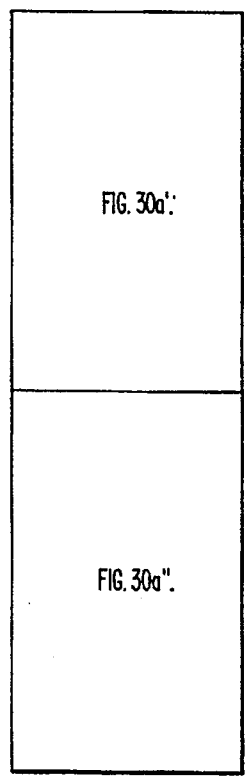
FIGS. 30a and 30c are block diagrams of the flowcharts of the second embodiment of the SLA-250.
Figure 30C:
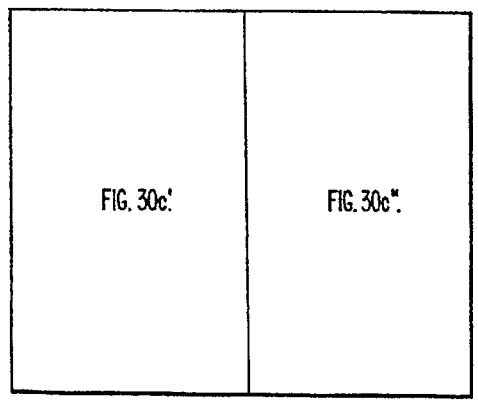
Figure 23A:
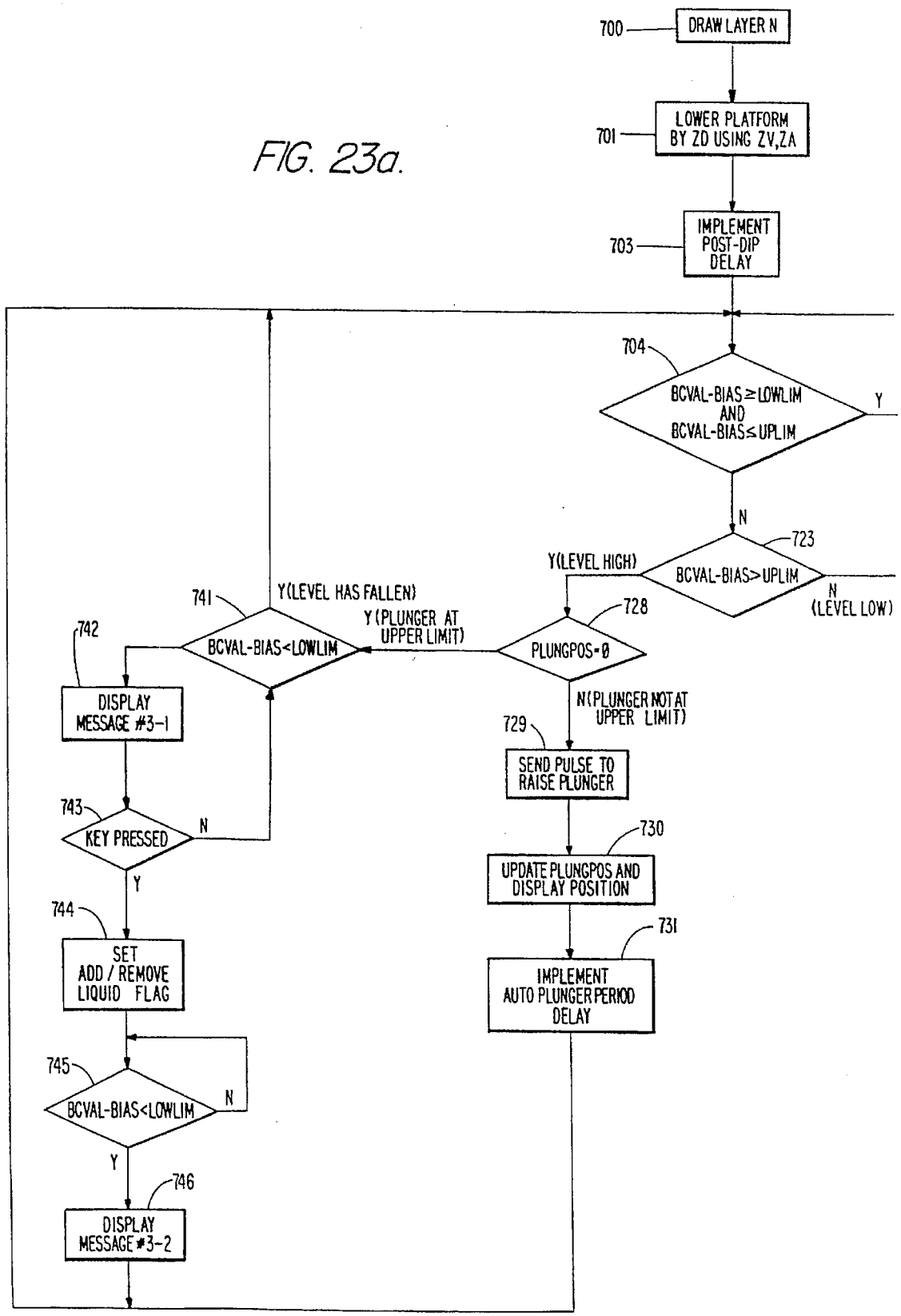
FIGS. 23a, 23b and 23c are the components of the block diagram depicted in FIG. 23.
Figure 23B:
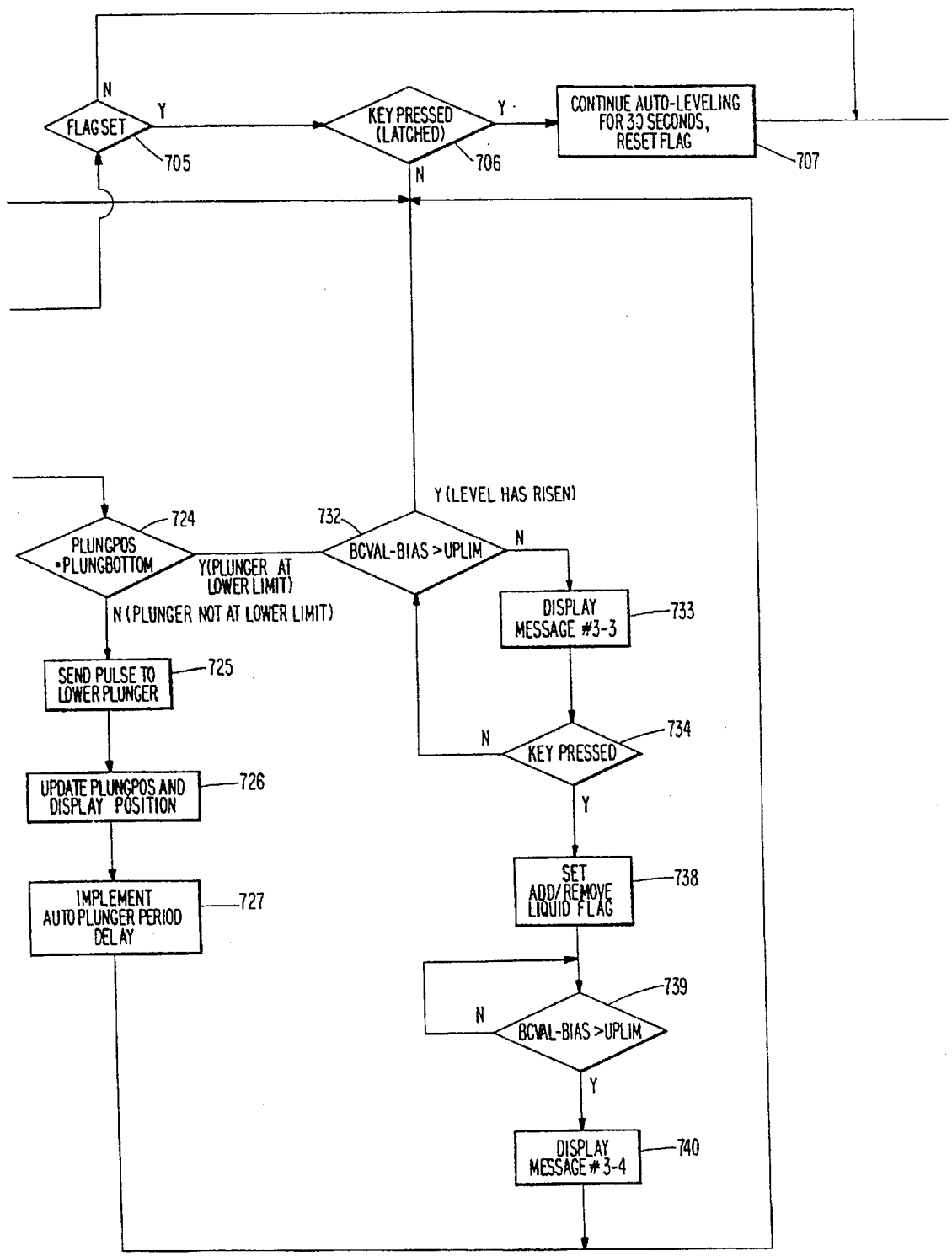
Figure 23C:
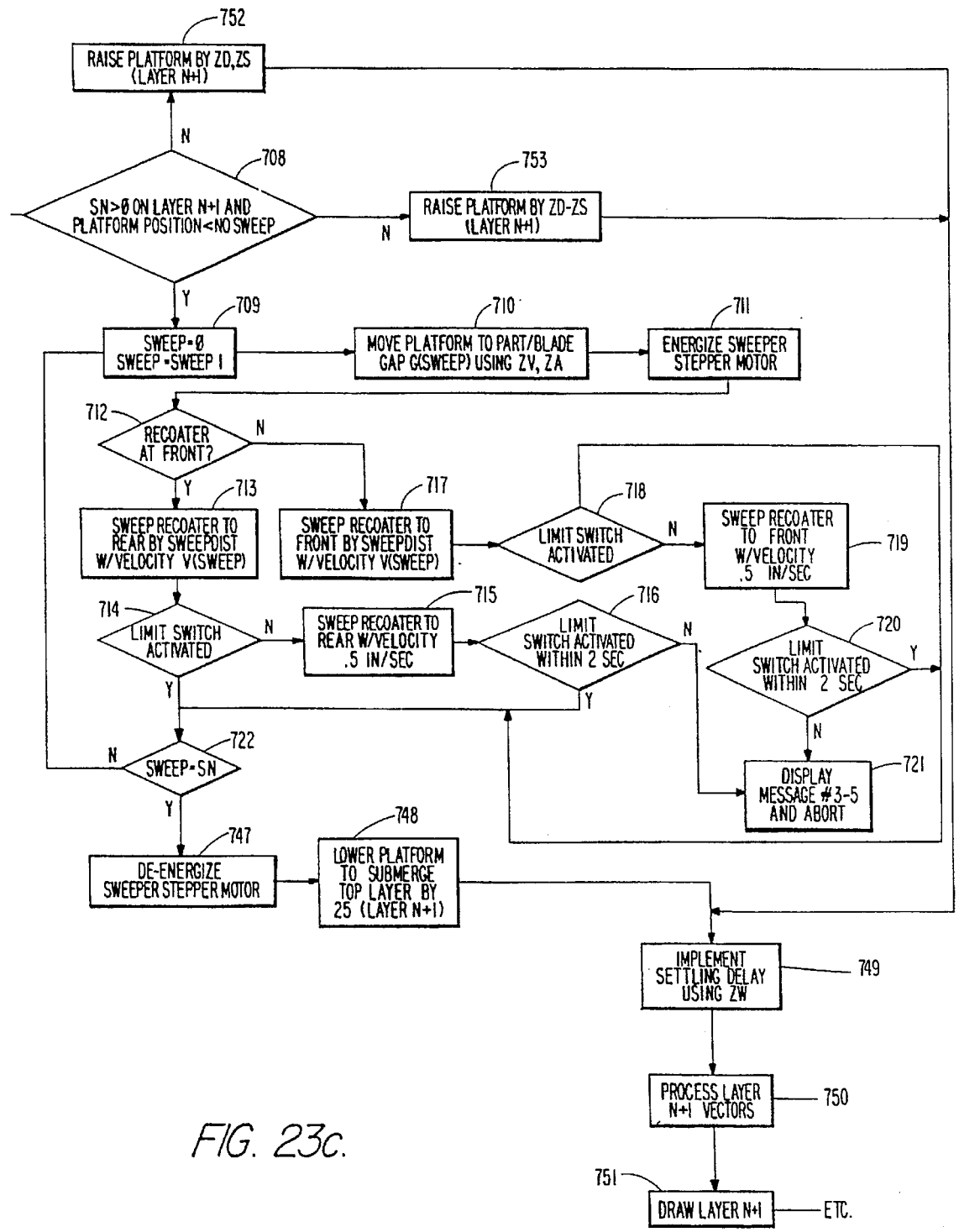
Figure 30C:
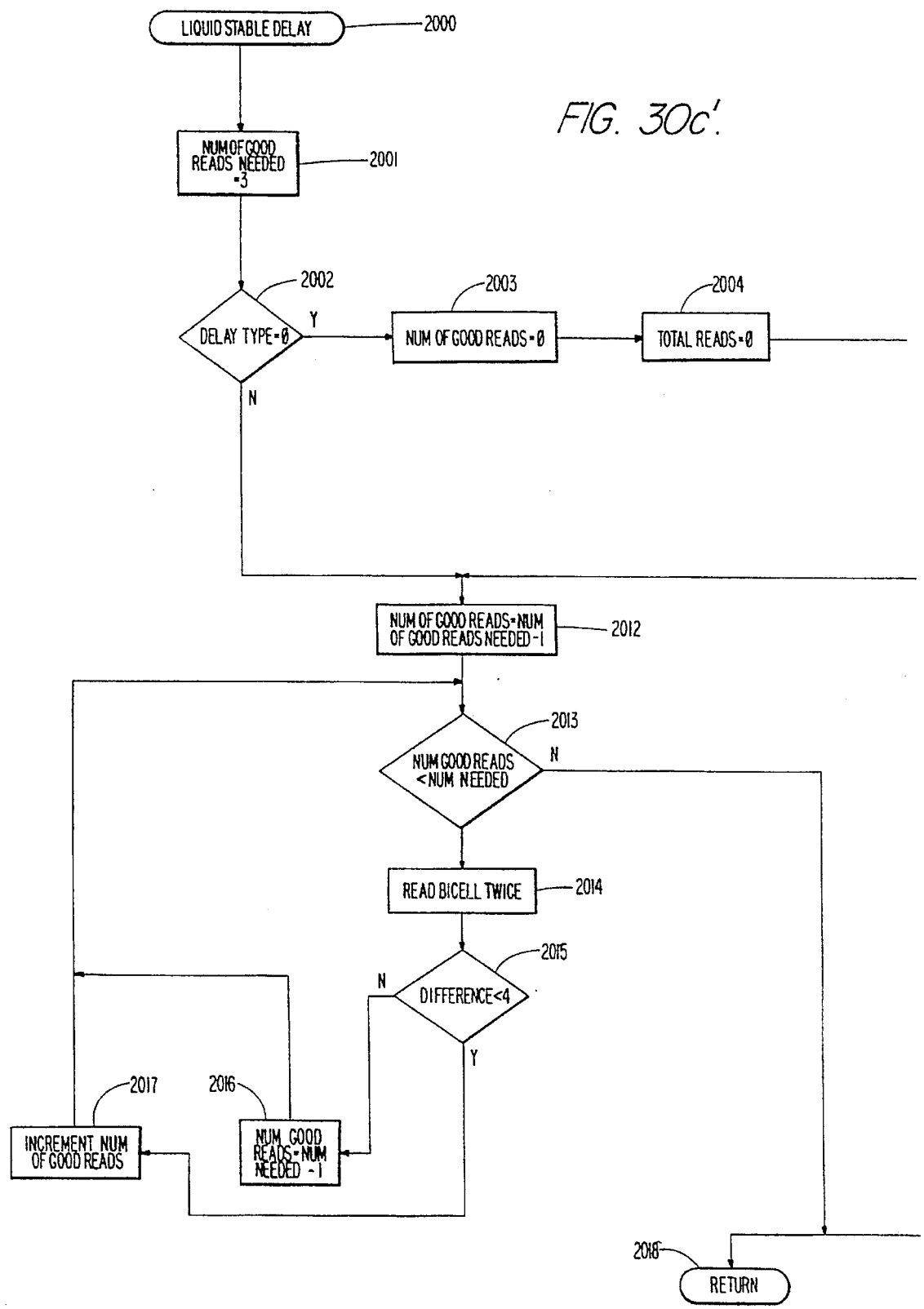
Figure 30A:
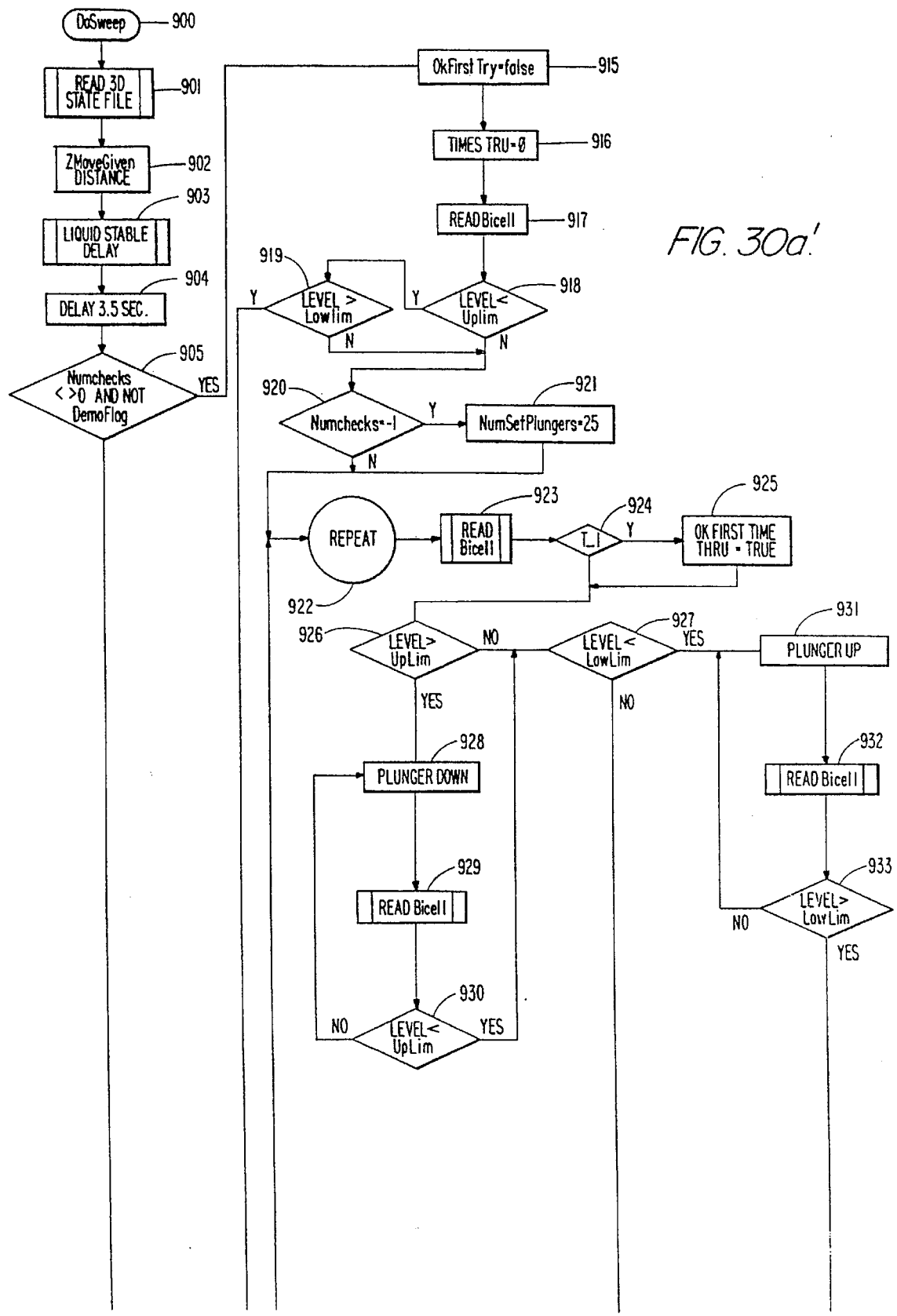
Figure 30B:
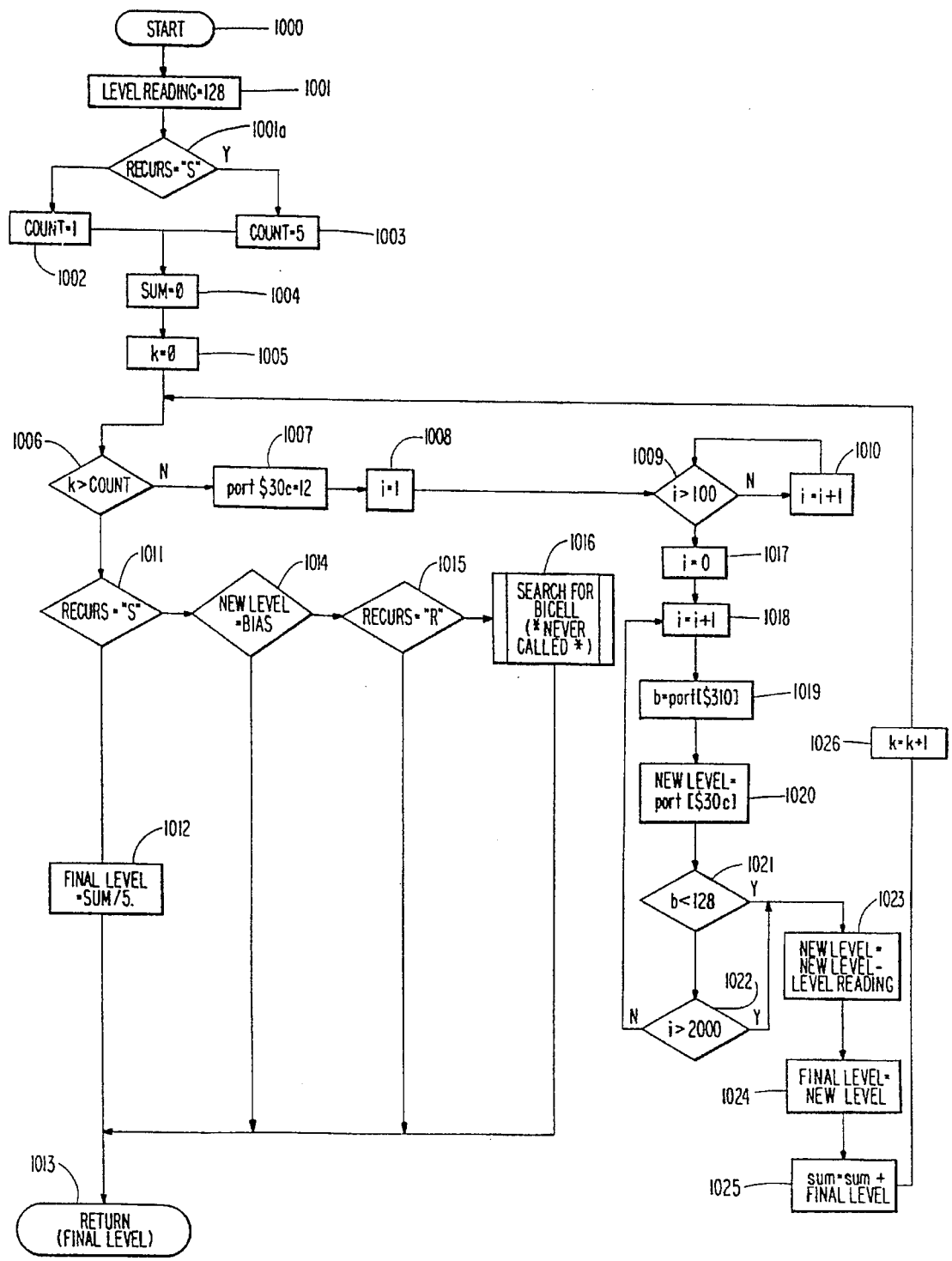

A commercial embodiment of the SLA-250 recoating software is illustrated in the flowcharts of FIGS. 30a, 30b, and 30c. FIG. 30a describes the overall sweeping and leveling process. FIG. 30b describes the subroutine used to read the bi-cell photodetector, and FIG. 30c illustrates a subroutine used to wait a sufficient amount until the resin level is sufficiently stable.

Turning to FIG. 30a, as indicated by step 900, the name of the subroutine which performs the overall sweeping and leveling function is DoSweep. After DoSweep has been called, in step 901, a 3D state file is checked for essentially two parameters: 1) the location of the Z-stage elevator; and 2) the location of the plunger. Updated values for both of these parameters are maintained in the 3D state file. Then, in step 902, the elevator platform is over-dipped below the resin surface in step 903, the subroutine Liquid Stable Delay is called (to be discussed subsequently) to ensure that the liquid surface has settled sufficiently before proceeding. To further guarantee this, in step 904, an additional delay of 3.5 seconds is caused to take place.

In step 905, a decision is made based on the parameters Numchecks and Demoflag. These parameters are defined as follows: the value of Numchecks is usually set to a logical "1," indicating that the fluid level should be checked for each layer. Demoflag is usually set to a logical "0" indicating that a demo is not being run. Therefore, in the usual case, a jump is made to step 915 before proceeding on to step 906. If the Demoflag were a logical "1," indicating that a demo was being run, the resin level would usually not be checked.

If Numchecks equals "0" or Demoflag is set to a logical "1," than step 906 is branched to immediately. In step 906, the parameter NumSweeps is checked, which parameter is the number of sweeps desired for the current layer. If the value of this parameter is less than or equal to zero, or it would not be safe to sweep (such as may occur if the blade could hit the elevator), then in step 907, the elevator is moved so that the net displacement has (step 902 and step 907) has moved the elevator down 1 layer thickness so that the elevator is no longer in the path of the blade. Delays are invoked in steps 912 and 913, and the subroutine returns in step 914.

In step 906, if NumSweeps is greater than 0, and it would be safe to sweep, then in step 908, the counter 908 is initialized, in step 909, the counter value is compared to the value of NumSweeps, and if less, in step 910, a sweep is caused to occur. In step 911, the counter is incremented, and a jump made back to step 909, where the process repeats itself. When all sweeps have been performed, a return is made in step 914. Not shown in between steps 909 and 911 (but existing in the software) are the steps of moving the elevator platform (and part) for staged sweeping.

Turning back to step 905, assuming the conditions indicated there are met, in step 915, the flag OKFirst Try False is initialized to a logical "0," and in step 916 the parameter Times Thru is set to 0. This variable is used to count the number of loops that have been taken through steps 922–939 in the course of checking the resin level. As will be seen, if this value exceeds a certain amount, then the checking of the resin level will cease. In step 917, the value of the bi-cell photodetector is read by calling the routine ReadBicell (to be described subsequently). The value returned will be within the following range:

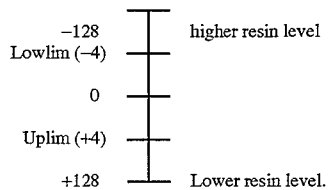

In other words, the more negative the value, the higher the resin level. The highest tolerable resin level for continuing with part building corresponds to a value of −4, which is the lowest value possible (hence the name Lowlim). Conversely, the lowest resin level tolerable for continuing with part building corresponds to a value of +4, which is the highest value possible (hence the name Uplim).

In steps 918 and 919, if the value is within the tolerable range, then a jump is made to step 906 to begin the recoating process.

If the value is outside the tolerable range, then in steps 920 and 921, if the variable Numchecks is a −1 (which is the usual setting), then the variable NumSet Plungers is initialized to 25.

Next, in step 923, the value of the bi-cell detector is read. In step 924, the test T_1 is performed. This test returns a logical "1" if three conditions are satisfied: 1) NumSet Plunger=25; 2) Num times thru≧1; 3) level is between Uplim and Lowlim. If these three conditions are met, this indicates that at least one pass through the loop of steps 922–939 has taken place, and that the resin level is at the correct level. In this case, the flag OK First Time Thru is set to a logical "1," which flag will be used in step 938 to kick out of the loop before the maximum number of 25 loops has been attempted.

In step 926, if the resin level is too low, determined when the value returned is greater than Uplim, in steps 928–930, the plunger is repeatedly lowered until the level is less than Uplim, and therefore within the tolerable range.

In step 927, if the resin level is too high, determined when the value returned is less than Lowlim, then in steps 931–933, the plunger is repeatedly raised until the resin level is greater than Lowlim, and therefore within the tolerable range.

In step 934, the locations of the elevator and plunger are updated in the 3D state file, and in step 935, the variable Times thru is incremented. As indicated earlier, this variable tracks the number of times the steps of 922–939 have been gone through. Next, in step 936, the subroutine Liquid Stable Delay is called in order to allow the resin surface to settle sufficiently, and in step 937, the variable Times thru,is compared with the value of NumSet Plungers, previously set to 25 in step 921. This step checks to see if more than 25 passes through the previous loop (comprising steps 922–937) has taken place, without the resin level being set to a level within the tolerable range. When this occurs, the subroutine Plunger Holding Torque is called in step 939. The plunger is activated by a stepper motor with four coils, and this motor will get extremely hot if all four coils are allowed to remain activated. This routine is called to deactivate one of the coils since the plunger will not be needed anytime soon. When the plunger is next needed, the coil will be reactivated. Then, a jump is made to step 906 in order to sweep the blade the designated number of times.

In step 938, the variable OK First Time Thru is checked, and if a logical "1," indicating that the T_1 test of step 924 has been fulfilled, a jump is made to step 939, where the subroutine Plunger Holding Torque is called. This has been described earlier. If this variable is a logical "0," indicating that the T_1 test of step 924 has still failed, then a jump is made to step 922 to repeat the loop of steps 922–937.

The ReadBicell subroutine is illustrated in FIG. 30b. The subroutine begins in step 1000, and in step 1001, the variable Level Reading is set to 128. In step 1001a, the variable Recurs is checked, which is set to one of the following three values before the subroutine is called:

"R"=recursive
"N"=normal (1 sample)
"S"=5 samples

An explanation of these values is as follows: 1) "R" indicates that the resin level may be so far off, that the bicell detector will not be able to detect the laser light at all. In this case, the subroutine Read Bicell calls itself recursively with a larger allowable step size for movement of the plunger; 2) "N" indicates that one sample is to be taken; and 3) "S" which is the usual case, indicates that an average of 5 samples is to be taken. If Recurs is set to "N" or "R," then the variable Count is set to 1, indicating that only one sample is to be taken; if Recurs is set to "S," then in step 1003, the Count variable is set to 5, indicating that 5 samples are to be taken, and an average used. In step 1004, the variable Sum is set to 0, and in step 1005, the variable k, which will be an internal sample counter, is set to 1.

In step 1006, if k is greater than Count, indicating that all the allowed samples have been taken, a jump is made to step 1011. Otherwise, in step 1007, a reading of a sample is initiated by sending the value 12 to port $30c.

In step 1008, the internal counter i is initialized to 1. This counter is used in steps 1009 and 1010 to loop a sufficient amount (and therefore delay) before reading the bicell value from the A/D converter at port $30c in step 1018, since the A/D converter requires a certain time to perform its conversion.

In steps 1009 and 1010, 100 loops occur, for a total delay of 1000 μsec. Then, in step 1017, the counter is reinitialized to 0. As will be described subsequently, this counter is now used in the process of obtaining a valid reading From the bicell detector. If a valid reading is not obtained after 2000 attempts, to be described subsequently, then no further attempts will be tried. In step 1018, the counter is incremented. In step 1019, the variable b is set to the value of the reading from port $310, which will indicate the status of the reading from port $30c. In step 1020, the bicell level is read from port $30c, assigned to the variable NewLevel, and in step 1021, the status of the reading is checked. If a valid reading has been obtained, indicated by the status indicator having a value less than 128, then in step 1023, the value of New Level is decreased by the value of Level Reading, earlier set to 128 in step 1001. It turns out that the bicell reading is being obtained from an A/D converter which returns a value between 0 and 255, with 128 indicating the median level. Thus, 128 is subtracted in order to provide a range where the median level is 0, and where possible values can range from −128 to +128. Then, in step 1024, the variable Final level is set to the value of New level, and in step 1025, the value of Sum, initialized to 0 in step 1004, is increased by the value of Final level. The value of k is incremented in step 1026, and a jump is made back to step 1006. In the case where only 1 sample has been called for (when Recurs is set to "N" or "R"), a jump is made to 1011, and then to 1014 (since Recurs is not equal to "S"), which further jumps to step 1013 (assuming New level is not equal to bias). In this step, the value of Final level is returned as the bicell reading. In steps 1014 and 1015, if the variable New level is equal to the bias, this indicates that the bicell detector has not detected the laser light at all, and therefore only provides a reading of a bias value. If the variable Recurs is set to "R", indicating that recursion is allowed, then in step 1016, the subroutine recursively calls itself, with a larger allowable value for the plunger stepper motor. When the recursive call returns, the level will be at the correct setting, and a jump then made to step 1013, to return to the initial point of invocation. Back to step 1006, in the case where Recurs has been set to "S," and 5 samples are called for, then the steps 1006–1026 are looped through for a total of 5 times, with the value of the bicell reading added to the variable Sum each time. When these samples have been taken, a jump is made to step 1012, which sets the variable Final level to the average of the 5 readings. Then, step 1013 is invoked, which returns with the value of Final level.

The subroutine Liquid Stable Delay is illustrated in FIG. 30c. The subroutine began in step 2000, and in step 2001, the variable Num of good reads needed is initialized to the value 3. This indicates the number of consecutive reads for resin stability that are required in a more elaborate test (to be described subsequently).

In step 2002, the variable Delay type is checked, and if set equal to 0, indicating that only a more stringent check of the stability of the resin is to be made (in the usual case, the value of Delay type is other than 0), a jump is made to step 2003. If the delay type is not set to 0, a jump is made to step 2012 (the typical case), where a minimal check of resin stability is made. The variable Num of good reads is set equal to the value of Num of good reads needed minus 1, indicating that only one good reading of resin stability is required, this being the less elaborate test. Since the latter is set for 3 in step 2001, the former is set to 2 in this step.

In step 2013, the two are compared, and if the value of Num good reads is less (which is the case here), a jump is made to step 2014. Otherwise, a jump is made to step 2018, where a return is made to the point of invocation, since the number of good reads exceeds the number needed.

Back to step 2014, the bicell detector is read twice, and in step 2015, if the difference in readings is less than 4, indicating that the resin level has achieved a certain amount of stability, in step 2017, the variable Num good reads is incremented, and a jump made back to step 2013. If the difference is not less than 4, indicating that the resin level has not achieved the desired stability, in step 2016, the variable Num good reads is reinitialized to one less than the number needed, and a jump made to step 2013. In the case where one good read has been obtained, a jump is made to step 2018, which returns to the point of invocation. Otherwise, the steps 2013–2017 are repeated until a good read has been obtained.

Back to step 2003, in the case where a delay type of 0 has been specified in steps 2003 and 2004, the variables Num of good reads, and Total reads, are initialized to 0, and in step 2005, the value of Num of good reads compared with the number needed. If less, a jump is made to step 2006, where the subroutine Read Bicell is invoked,.with a value of Recurs set equal to "S" (indicating that an average of 5 samples is to be taken). In step 2007, the variable Total Reads is incremented, and in step 2008, the returned value from the bicell detector is checked. If within the range of ±15, (out of a possible range of ±128), indicating that a certain closeness to the desired level has been achieved, then in step 2009, the variable Num good reads is incremented. If the value is not within this range, indicating that the level is still not very close to the desired level, then in step 2010, the variable Num goods reads is reinitialized to 0. In step 2011, a check is made to see if the value of Total reads exceeds 10, and if so, a return is made in step 2018. These steps therefore require that three consecutive good readings of resin stability occur in order get a no response to 2005 and to proceed with stability checking. In other words, if three consecutive good reads have not been achieved in 10 tries, the routine bails out. If not, a jump is made back to step 2005, which loops through the steps 2006–2011 until three consecutive good reads have been obtained. When this occurs, then a jump is made to step 2012, which invokes the steps discussed earlier (ensuring that two consecutive bicell reads differ in value by less than 4). Then, a return is made in step 2018 to the point of invocation.

While the invention as described herein has been directed to specific embodiments, various modifications thereto can be employed. For example, while excess polymerizable liquid has been described herein as being struck off by a doctor blade, other means for such removal can obviously be employed, such as rakes and the like. As another example, a radiation source and sensor have been described herein as means to detect the level of the upper surface of the bath of polymerizable fluid, whereas a wide variety of mechanical, electronic, pneumatic, and other devices can be used to detect this level. For example, an apparatus using a float has been described. Other modifications and improvements can be used without departing from the scope of the invention. Accordingly, it is not intended that the invention be limited, except by the appended claims.

What is claimed is:

1. A method for stereolithographically forming a portion of a three-dimensional object wherein a subsequent layer of the three-dimensional object is formed over a previously formed layer of the object, comprising the steps:
   a) holding a volume of a building material having a working surface wherein the building material is capable of selective physical transformation upon exposure to prescribed synergistic stimulation;
   b) forming a uniform coating of desired layer thickness over the previously formed layer, including sweeping a smoothing element at least once over the previously formed layer, said smoothing element having a plurality of substantially separate members on a lower surface thereof for contacting the building material; and
   c) applying a prescribed pattern of synergistic stimulation to the building material at the working surface to transform at least a portion of the building material to form the subsequent layer.

2. The method of claim 1 wherein the step of sweeping a smoothing element comprises sweeping a winged blade.

3. The method of claim 1 wherein the step of sweeping a smoothing element comprises sweeping a trident blade.

4. The method of claim 1 further comprising the step of holding a vertical position of the working surface substantially constant.

5. The method of claim 1 wherein the step of sweeping a smoothing element comprises sweeping a smoothing element having at least one of the separate members with a rake-like configuration.

6. The method of claim 1 wherein the step of sweeping a smoothing element comprises sweeping a smoothing element with a rake-like configuration.

7. The method of claim 1 wherein the step of sweeping a smoothing element comprises rake-like sweeping of the smoothing element and wherein the smoothing element has at least one member comprising prongs.

8. An apparatus for stereolithographically forming a portion of a three-dimensional object wherein a subsequent layer of the three-dimensional object is formed over a previously formed layer of the object, comprising:
   a) means for holding a volume of a building material having a working surface wherein the building material is capable of selective physical transformation upon exposure to prescribed synergistic stimulation;
   b) means for forming a uniform coating of desired layer thickness over the previously formed layer, including means for raking at least one smoothing member at least once over the previously formed layer, said smoothing member having a plurality of substantially separate elements on a lower surface thereof for contacting the material; and
   c) means for applying a prescribed pattern of synergistic stimulation to the building material at the working surface to transform at least a portion of the building material to form the subsequent layer.

9. A method for stereolithographically forming a portion of a three-dimensional object wherein a subsequent layer of the three-dimensional object is formed over a previously formed layer of the object, comprising the steps:
   a) holding a volume of a building material having a working surface wherein the building material is capable of selective physical transformation upon exposure to prescribed synergistic stimulation;
   b) forming a uniform coating of desired layer thickness over the previously formed layer, including raking at least one smoothing element at least once over the previously formed layer, said smoothing element having a plurality of substantially separate members on a lower surface thereof for contacting the material; and
   c) applying a prescribed pattern of synergistic stimulation to the building material at the working surface to transform at least a portion of the building material to form the subsequent layer.

10. A method for stereolithographically forming at least a portion of a three-dimensional object comprising a next layer of the three-dimensional object situated over a previously formed layer, said next layer having a desired layer thickness and said previously formed layer having an upper surface, comprising the steps:

a) holding a volume of a building material;

b) applying a coating of building material, said coating including excess material over at least a portion of the upper surface of the previously formed layer of the object;

c) displacing the previously formed layer relative to a desired working surface so that the upper surface of the previously formed layer is positioned to a first level which is less than said layer thickness below said working surface;

d) displacing material of said coating of building material to provide a smooth coating of building material of the desired thickness over the previously formed layer, while the upper surface of the previously formed layer is positioned at said first level;

e) relatively positioning the upper surface of the previously formed layer to be substantially one layer thickness below the desired working surface; and f) applying a prescribed pattern of synergistic stimulation to the building material at the desired working surface in order to transform at least a portion of the building material, whereby the next layer is formed over the previously formed layer.

11. An apparatus for stereolithographically forming at least a portion of a three-dimensional object comprising a next layer of the three-dimensional object situated over a previously formed layer of said object, comprising:

a) a container for holding a volume of a building material capable of selective physical transformation upon exposure to synergistic stimulation;

b) means for forming a uniform coating of desired thickness over the previously formed layer including means for sweeping at least one smoothing member at least twice above the previously formed layer; and c) means for applying a prescribed pattern of synergistic stimulation to the building material at the desired working surface in order to transform at least a portion of the building material, whereby said portion of said three-dimensional object is formed comprising the next object layer formed over the previously formed layer.

12. An apparatus for stereolithographically forming at least a portion of a three-dimensional object comprising a next layer of the three-dimensional object situated over a previously formed layer of said object, comprising:

a) a container for holding a volume of a building material capable of selective physical transformation upon exposure to synergistic stimulation;

b) means for forming a uniform coating of desired thickness over the previously formed layer including means for sweeping a smoothing member at least once above the previously formed layer; and c) means for applying a prescribed pattern of synergistic stimulation to the building material at a desired working surface after waiting for the smoothing member to complete at least a first sweep across the previously formed layer in order to transform at least a portion of the building material, whereby the next object layer is formed over the previously formed layer.

13. A method for stereolithographically forming at least a portion of a three-dimensional object comprising a next layer of the three-dimensional object situated over a surface of a previously formed layer of the object, comprising:

a) holding a quantity of a building material capable of selective physical transformation upon exposure to synergistic stimulation;

b) forming a uniform coating of material over the previously formed layer, including: sweeping a member having a lower edge which sweeps out a plane above a plane of a desired working surface; and c) selectively applying a prescribed pattern of synergistic stimulation to the building material at the desired working surface in order to transform at least a portion of the building material, whereby said portion of said three-dimensional object is formed comprising said next object layer formed over said previously formed layer.

14. An apparatus for stereolithographically forming a portion of a three-dimensional object wherein a subsequent layer of the three-dimensional object is formed over a previously formed layer of the object, comprising:

a) a container for holding a building material having a working surface wherein the building material is capable of selective physical transformable upon exposure prescribed synergistic stimulation b) means for forming a uniform coating of desired thickness over the previously formed layer, including:
a smoothing member having a plurality of substantially separate elements protruding from the lower surface,
means for sweeping the smoothing member over the previously formed layer whereby said elements are raked over the previously formed layer; and c) means for applying a prescribed pattern of synergistic stimulation to the building material at the working surface of the building material to transform at least a desired portion of the building material to form the subsequent layer.

15. The method of claim 14 further comprising the step of holding a vertical position of the working surface substantially constant.

16. The apparatus of claim 14 wherein the smoothing member lower surface comprises a configuration substantially similar to a rake.

17. An apparatus for stereolithographically forming a portion of a three-dimensional object wherein a subsequent layer of the three-dimensional object is formed over a previously formed layer of the object, comprising:

a) a container for holding a volume of a building material having a working surface wherein the building material is capable of selective physical transformation upon exposure to synergistic stimulation;

b) means forming a uniform coating of a desired layer thickness over the previously formed layer, including:
means for sweeping a smoothing member over the previously formed layer,
means for adjusting the vertical position of the smoothing member relative to the working surface, including a plurality of needles attached to the smoothing member for measuring a gap between a lower surface of the smoothing member and the working surface; and c) means for applying a prescribed pattern of synergistic stimulation to the building material at the working surface to transform at least a portion of the building material to form the subsequent layer.

18. A method for stereolithographically forming a portion of a three-dimensional object wherein a subsequent layer of the three-dimensional object is formed over a previously formed layer of the object, comprising the steps:

a) holding a volume of a building material having a working surface wherein the building material is capable of selective physical transformation upon exposure to prescribed synergistic stimulation;

b) forming a uniform coating of desired layer thickness over the previously formed layer, including:

sweeping a smoothing member over the previously formed layer, adjusting the vertical position of the smoothing member relative to the working surface, including measuring a gap between a lower surface of the smoothing member and the working surface using a plurality of needles attached to the smoothing member; and c) applying a prescribed pattern of synergistic stimulation to the building material at the working surface to transform at least a portion of the building material to form the subsequent layer.

19. The method of claim 18, further comprising the step of retracting the needles attached to the smoothing member.

* * * * *